United States Patent
van Graas et al.

(10) Patent No.: US 8,013,789 B2
(45) Date of Patent: Sep. 6, 2011

(54) SYSTEMS AND METHODS FOR ACQUISITION AND TRACKING OF LOW CNR GPS SIGNALS

(75) Inventors: Frank van Graas, Lancaster, OH (US);
Andrey Soloviev, The Plains, OH (US);
Sanjeev Gunawardena, Athens, OH (US)

(73) Assignee: Ohio University, Athens, OH (US)

( * ) Notice: Subject to any disclaimer, the term of this patent is extended or adjusted under 35 U.S.C. 154(b) by 218 days.

(21) Appl. No.: 11/233,531

(22) Filed: Sep. 22, 2005

(65) Prior Publication Data
US 2006/0071851 A1    Apr. 6, 2006

Related U.S. Application Data

(60) Provisional application No. 60/647,543, filed on Jan. 27, 2005, provisional application No. 60/616,445, filed on Oct. 6, 2004.

(51) Int. Cl.
*G01S 19/09* (2006.01)
*G01S 19/26* (2006.01)
*G01C 21/00* (2006.01)

(52) U.S. Cl. ............... 342/357.46; 342/357.65; 701/213

(58) Field of Classification Search ............. 342/357.05, 342/357.06, 357.07, 357.14, 357.395, 357.4, 342/357.46, 357.65; 701/207, 213, 215
See application file for complete search history.

(56) References Cited

U.S. PATENT DOCUMENTS

| | | | |
|---|---|---|---|
| 4,578,678 A * | 3/1986 | Hurd | 342/357.12 |
| 4,701,934 A | 10/1987 | Jasper | |
| 4,789,948 A * | 12/1988 | von der Embse | 714/712 |
| 5,019,824 A * | 5/1991 | Kumar | 342/195 |
| 5,043,737 A * | 8/1991 | Dell-Imagine | 342/358 |
| 5,187,485 A | 2/1993 | Tsui et al. | |
| 5,663,734 A | 9/1997 | Krasner | |
| 5,781,156 A | 7/1998 | Krasner | |
| 5,793,323 A | 8/1998 | Tsui | |

(Continued)

FOREIGN PATENT DOCUMENTS

EP    0545636 A1    6/1993

OTHER PUBLICATIONS

Alaqeeli, Global Positioning System Signal Acquisition and Tracking Using Field Programmable Gate Arrays, Ph.D Thesis, Ohio University, 203 pages (Nov. 2002).

(Continued)

*Primary Examiner* — Dao L Phan
(74) *Attorney, Agent, or Firm* — Calfee, Halter & Griswold LLP

(57) ABSTRACT

A receiver for continuous carrier phase tracking of low carrier-to-noise ratio ("CNR") signals from a plurality of radio navigation satellites while the receiver is mobile. The receiver may have: a radio frequency (RF) front-end that provides satellite data corresponding to signals received from the plurality of radio navigation satellites; an inertial measurement unit (IMU) that provides inertial data; and a processor circuit in circuit communication with the RF front end and the IMU, the processor circuit being capable of using satellite data from the RF front-end and inertial data from the IMU to perform continuous carrier phase tracking of low CNR radio navigation satellite signals having a CNR of about 20 dB-Hz, while the receiver is mobile. The receiver may be a GPS receiver for continuous carrier phase tracking of low-CNR GPS signals.

45 Claims, 27 Drawing Sheets

U.S. PATENT DOCUMENTS

| | | | |
|---|---|---|---|
| 5,877,723 | A | 3/1999 | Fan |
| 5,906,655 | A | 5/1999 | Fan |
| 6,052,081 | A | 4/2000 | Krasner |
| 6,081,228 | A * | 6/2000 | Leimer .................... 342/357.02 |
| 6,133,873 | A | 10/2000 | Krasner |
| 6,148,313 | A | 11/2000 | Freidin et al. |
| 6,150,979 | A | 11/2000 | Tsui |
| 6,195,328 | B1 | 2/2001 | Tsui et al. |
| 6,208,291 | B1 | 3/2001 | Krasner |
| 6,237,014 | B1 | 5/2001 | Freidin et al. |
| 6,256,559 | B1 | 7/2001 | Tsui |
| 6,272,430 | B1 | 8/2001 | Krasner |
| 6,289,041 | B1 | 9/2001 | Krasner |
| 6,313,786 | B1 | 11/2001 | Sheynblat et al. |
| 6,408,245 | B1 | 6/2002 | An et al. |
| 6,542,821 | B2 | 4/2003 | Krasner |
| 6,567,042 | B2 | 5/2003 | Lin et al. |
| 6,633,255 | B2 | 10/2003 | Krasner |
| 6,639,541 | B1 * | 10/2003 | Quintana et al. ................ 342/18 |
| 6,707,422 | B2 | 3/2004 | Sheynblat et al. |
| 6,720,917 | B2 | 4/2004 | Lin et al. |
| 6,721,657 | B2 | 4/2004 | Ford et al. |
| 6,724,807 | B1 | 4/2004 | Krasner et al. |
| 6,725,159 | B2 | 4/2004 | Krasner |
| 6,731,701 | B2 | 5/2004 | Vorobiev et al. |
| 6,744,408 | B1 | 6/2004 | Stockmaster |
| 6,768,451 | B2 | 7/2004 | Akopian et al. |
| 7,110,882 | B2 | 9/2006 | Moser et al. |
| 2002/0089450 | A1 | 7/2002 | Dowdle et al. |
| 2002/0101912 | A1 | 8/2002 | Phelts et al. |
| 2004/0150557 | A1 | 8/2004 | Ford et al. |

OTHER PUBLICATIONS

Kiran, An Inertial Measurement Unit Interface and Processing System Synchronized to Global Positioning System Time, Master of Science Degree Thesis, Ohio University, 109 pages (Aug. 1998).
Miller et al., Just Keep Rolling a Lawn, GPS World, pp. 16-18, 20, 22, 24, and 26 (Sep. 2004).
Soloviev et al., Combining Low-Cost Inertial Systems with GPS—Applications for General Aviation, pp. 38-45 (Mar. 2004).
Kelly et al., A Dynamic GPS Multipath Model for Differential Reference Station Site Evaluation, Proceedings of the 2003 IEEE Aerospace Conference, Big Sky, MT, vol. 4, pp. 1563-1574 (Mar. 8-15, 2003).
Marti, The Effects of the Radio Frequency Front-End onto Signal Estimation, ION GPS/GNSS 2003, Portland, OR (Sep. 9-12, 2003), pp. 2543-2552.
Masters et al., CLPX-Airborne: Airborne GPS Bistatic Radar, http://nsidc.org/data/nsidc-0156.html, printed Jan. 7, 2008, The National Snow and Ice Data Center (NSIDC), University of Colorado, Boulder, CO (2003), 2 pages.
Masters et al., SMEX02 Airborne GPS Bistatic Radar Data, Iowa, http://nsidc.org/data/nsidc-0275.html, printed Jan. 7, 2008, The National Snow and Ice Data Center (NSIDC), University of Colorado, Boulder, CO (2002), 2 pages.
van Graas et al., Comparison of Two Approaches for GNSS Receiver Algorithms: Batch Processing and Sequential Processing Considerations, ION GNSS 18th International Technical Meeting of the Satellite Division, Long Beach, CA (Sep. 12-16, 2005), pp. 200-211.
van Graas et al., Precise Velocity Estimation Using a Stand-Alone GPS Receiver, ION NTM 2003, Anaheim, CA (Jan. 22-24, 2003), pp. 262-271.
Welcome to SiRF Technology, GNSS Platforms, SiRFstarIII GSC3e/LP & GSC3f/LP, www.sirf.com/products/gps_chip.html, printed Feb. 19, 2008, SiRF Technology, Inc., San Jose, CA, 1 page.
Alaqeeli et al., Real-Time Acquistion and Tracking for GPS Receivers, Proceedings of the 2003 International Symposium on Circuits and Systems, Bangkok, Thailand, vol. 4, May 25-28, 2003, pp. 500-504.
coremicro IMU Specification, AGNC-2000CMIMU, American GNC Corporation, Copyright 1986-2004, www.americangnc.com/products/imu_spec.htm printed Jun. 14, 2004, 3 pages.
Farrel, Radical Streamlining of GPS/INS, presented at Institute of Navigation Satellite Division Meeting, Nashville, TN, Sep. 21-23, 1998, pp. 879-884.
Farrell, GPS/INS-Streamlined, Navigation: Journal of the Institute of Navigation, vol. 49, No. 4, Winter 2002-2003, pp. 171-182.
Feng et al., GPS Receiver Block Processing, Institute of Navigation (ION) GPS '99, Nashville, TN, Sep. 14-17, 1999, pp. 307-315.
Gunawardena et al., Real Time Block Processing Engine for Software GNSS Receivers, Institute of Navigation (ION) National Technical Meeting (NTM) 2004, San Diego, CA, Jan. 26-28, 2004, pp. 371-377.
Gunawardena et al., Real Time Implementation of Deeply Integrated Software GPS Receiver and Low Cost IMU for Processing Low-CNR GPS Signals, Institute of Navigation (ION) 60th Annual Meeting/U.S. Air Force Institute of Technology & The U.S. Air Force Research Laboratory, Sensors, Directorate, Dayton, OH, Jun. 7-9, 2004, pp. 108-114.
Gustafson et al., A High Anti-Jam GPS-Based Navigator (ION) National Technical Meeting (NTM) 2000, Anaheim, CA, Jan. 26-28, 2000, pp. 495-503.
Lin et al, A Weak Signal Tracking Technique for a Stand-Alone Software GPS Reciever, Institute of Navigation (ION) GPS 2002, Portland, OR, Sep. 24-27, 2002, pp. 2534-2538.
Phillips et al., GPS/INS Integration, paper presented at the AGARD MSP Lecture Series on "System Implications and Innovative Applications of Satellite Navigation," LS 207, Paris, France, Jul. 1-2, 1996, pp. 9.1-9.18.
Psiaki, Block Acquisition of Weak GPS Signals in a Software Receiver, Institute of Navigation (ION) GPS 2001, Salt Lake City, UT, Sep. 11-14, 2001, pp. 2838-2850.
Soloviev et al., Deeply Integrated GPS/IMU for Low CNR GPS Signal Processing: Flight Test Results and Real Time Implementation, presented at Institute of Navigation (ION) GNSS 2004, Long Beach, CA, Sep. 23, 2004, 21 pages.
Soloviev et al., Deeply Integrated GPS/Low-Cost IMU for Low CNR Signal Processing: Flight Test Results and Real Time Implementation, Institute of Navigation (ION) GNSS, 17th International Technical Meeting of the Satellite Division, Long Beach, CA, Sep. 21-24, 2004, pp. 1598-1608.
Soloviev et al., Implementation of Deeply Integrated GPS/Low-Cost IMU for Reacquisition and Tracking of Low CNR GPS Signals, Institute of Navigation (ION) National Technical Meeting (NTM), San Diego, CA, Jan. 26-28, 2004, pp. 923-935.
U.S. Department of Transportation, DOT Announces Action Plan for Transportation Infrastructure Relying on GPS, DOT 22-02, Mar. 7, 2002, www.dot.gov/affairs/dot02202.htm printed Jun. 14, 2004, 2 pages.
van Graas et al., Precise Velocity Estimation Using a Stand-Alone GPS Receiver, Navigation: Journal of the Institute of Navigation, vol. 51, No. 4, Winter 2004, pp. 283-292.
van Nee et al., New Fast GPS Code-Acqusition Technique Using FFT, Electronic Letters, vol. 27, No. 2, Jan. 17, 1991, pp. 158-160.
Ziedan et al., Bit Synchronization and Doppler Frequency Removal at Very Low Carrier to Noise Ratio Using a Combination of the Viterbi Algorithm with an Extended Kalman Filter, Institute of Navigation (ION) GPS/GNSS 2003, Portland, OR, Sep. 9-12, 2003, pp. 616-627.
Int'l App. No. PCT/US2005/035766, International Search Report, mailed Dec. 12, 2006.
Int'l App. No. PCT/US2005/035766, Written Opinion of the International Searching Authority, mailed Dec. 12, 2006.
"GPS Carrier-to-Noise Density", Northwood Labs LLC, Feb. 1, 2003.
International Search Report for International Application No. PCT/US2008/051920 dated Jul. 25, 2008.
Written Opinion for International Application No. PCT/US2008/051920 dated Jul. 25, 2008.
Abstract, "Assessment of GPS Signal Quality in Urban Environments Using Deeply Integrated GPS/IMU" by Soloviev, eta l., Proceedings of the 2007 National Technical Meeting of the Institute of Navigation, Jan. 22-24, 2007, San Diego, California.
U.K. Pat. App. No. GB0706646.7, Examination Report, dated Nov. 12, 2008.

Masters et al., Airborne GPS Bistatic Radar in CLPX, Colorado Cener for Astrodynamics Research (CCAR), University of Colorado, Boulder, CO, 11 pgs., 2003.

Zavorotny, Bistatic GPS Signal Scattering from an Ocean Surface: Theoretical Modeling and Wind Speed Retrieval from Aircraft Measurements, Cooperative Institute for Research in Environmental Sciences, University of Colorado and National Oceanic and Atmospheric Administration (NOAA) Environmental Technology Laboratory (ETL), Boulder, CO, 10 pages, Jul. 6, 1999.

Response to Examination report dated Mar. 11, 2009 for U.K. Application No. 0706646.7.

* cited by examiner

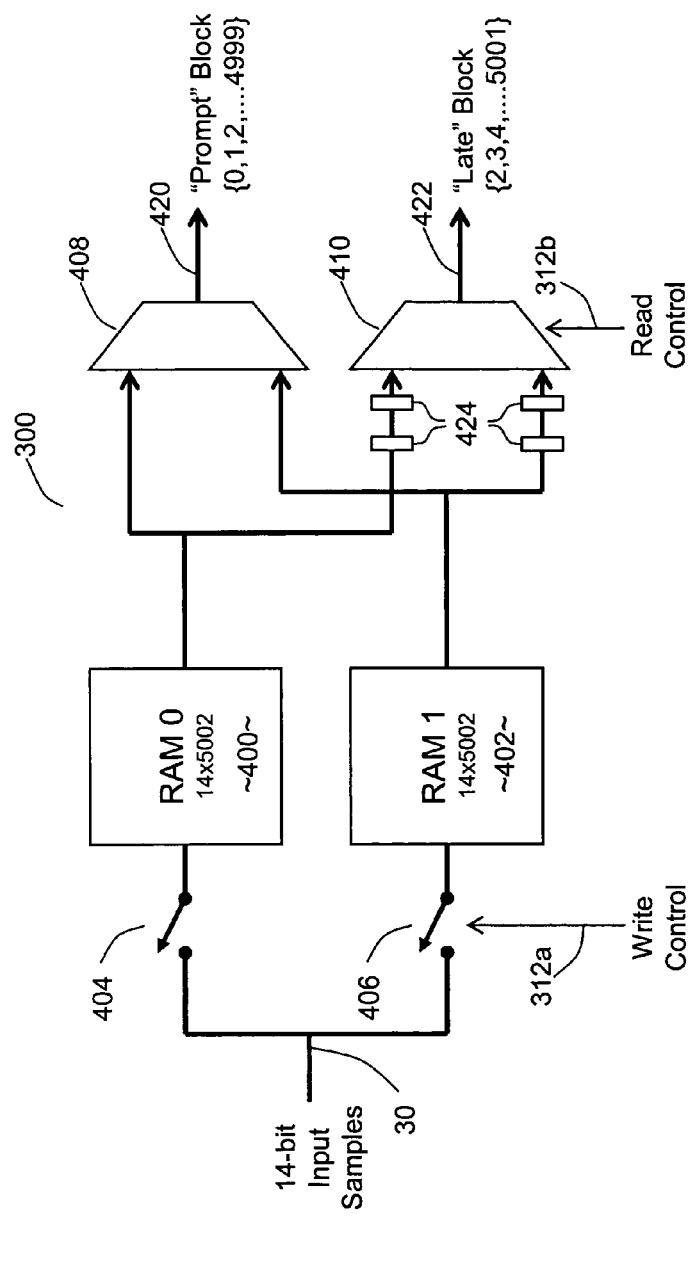
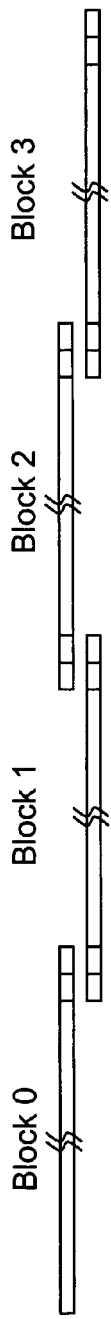
Fig. 4
Fig. 5

SYSTEMS AND METHODS FOR ACQUISITION AND TRACKING OF LOW CNR GPS SIGNALS

CROSS REFERENCE TO RELATED APPLICATIONS

This application claims priority to and any other benefits of U.S. Provisional Application Ser. No. 60/616,445 filed on Oct. 6, 2004, which is entitled DEEPLY INTEGRATED GPS/IMU, and U.S. Provisional Application Ser. No. 60/647,543, filed on Jan. 27, 2005, and which is entitled SYSTEMS AND METHODS FOR ACQUISITION AND TRACKING OF LOW CNR GPS SIGNALS, both of which are incorporated herein by reference in their entireties.

STATEMENT REGARDING FEDERALLY FUNDED RESEARCH

This invention was funded, at least in part, by Federal Aviation Administration Aviation Research Co-Operative Agreement 98-G-002 (Local Area Augmentation System Research and Development). The federal government may have certain rights in this invention.

FIELD OF THE INVENTION

The present invention relates generally to the field of receivers for satellite-based radio navigation systems, e.g., Global Positioning System ("GPS") receivers, and more specifically to receivers for satellite-based radio navigation systems for acquisition and tracking of low carrier-to-noise ratio ("CNR") signals from radio navigation satellites.

BACKGROUND OF THE INVENTION

Receivers for satellite-based radio navigation systems, e.g., GPS receivers, are known in the art. Conventional unaided GPS receivers generally integrate Coarse Acquisition (CA) GPS signals from 10 to 20 ms. As a result, GPS signals cannot be acquired and tracked reliably by such systems if the Carrier-to-Noise Ratio (CNR) is below 32 dB-Hz. This limits the usage of conventional GPS receivers for a number of applications (e.g. indoor applications, precision agriculture applications near trees where the GPS signal is attenuated by the tree branches and foliage, or navigation in the presence of wideband interference).

SUMMARY OF THE INVENTION

In accordance with one aspect of the present invention, a system for acquisition and/or tracking of low carrier-to-noise ratio ("CNR") signals from radio navigation satellites is provided. An exemplary receiver for tracking of low carrier-to-noise ratio ("CNR") signals from a plurality of radio navigation satellites while the receiver is mobile, comprises: a radio frequency (RF) front-end that provides satellite data corresponding to signals received from the plurality of radio navigation satellites; an inertial measurement unit (MU) that provides inertial data; and a processor circuit in circuit communication with the RF front end and the IMU, the processor circuit being capable of using satellite data from the RF front-end and inertial data from the IMU to perform continuous carrier phase tracking of low CNR radio navigation satellite signals having a CNR of about 15 dB-Hz, while the receiver is mobile.

In accordance with another aspect of the present invention, a method of acquisition and/or tracking of low CNR signals from radio navigation satellites is provided. An exemplary method of tracking of low carrier-to-noise ratio ("CNR") signals from a plurality of radio navigation satellites while the receiver is mobile, comprises the steps of: receiving signals from the plurality of radio navigation satellites; providing satellite data corresponding to the signals received from the plurality of radio navigation satellites; providing inertial data from an inertial measurement unit (IMU); and performing continuous carrier phase tracking of low CNR radio navigation satellite signals having a CNR of about 15 dB-Hz, while the receiver is mobile.

BRIEF DESCRIPTION OF THE DRAWINGS

The following detailed description of exemplary embodiments of the present invention can be best understood when read in conjunction with the following figures, where like structure is indicated with like reference numerals and in which:

FIG. 4 is a medium-level block diagram of an exemplary block I/O module;

FIG. 5 is a timeline showing overlap of successive blocks in the block I/O module of FIG. 4;

DETAILED DESCRIPTION

In the accompanying drawings which are incorporated in and constitute a part of the specification, exemplary embodiments of the invention are illustrated, which, together with a general description of the invention given above, and the detailed description given below, serve to example principles of the invention.

Figure 1:
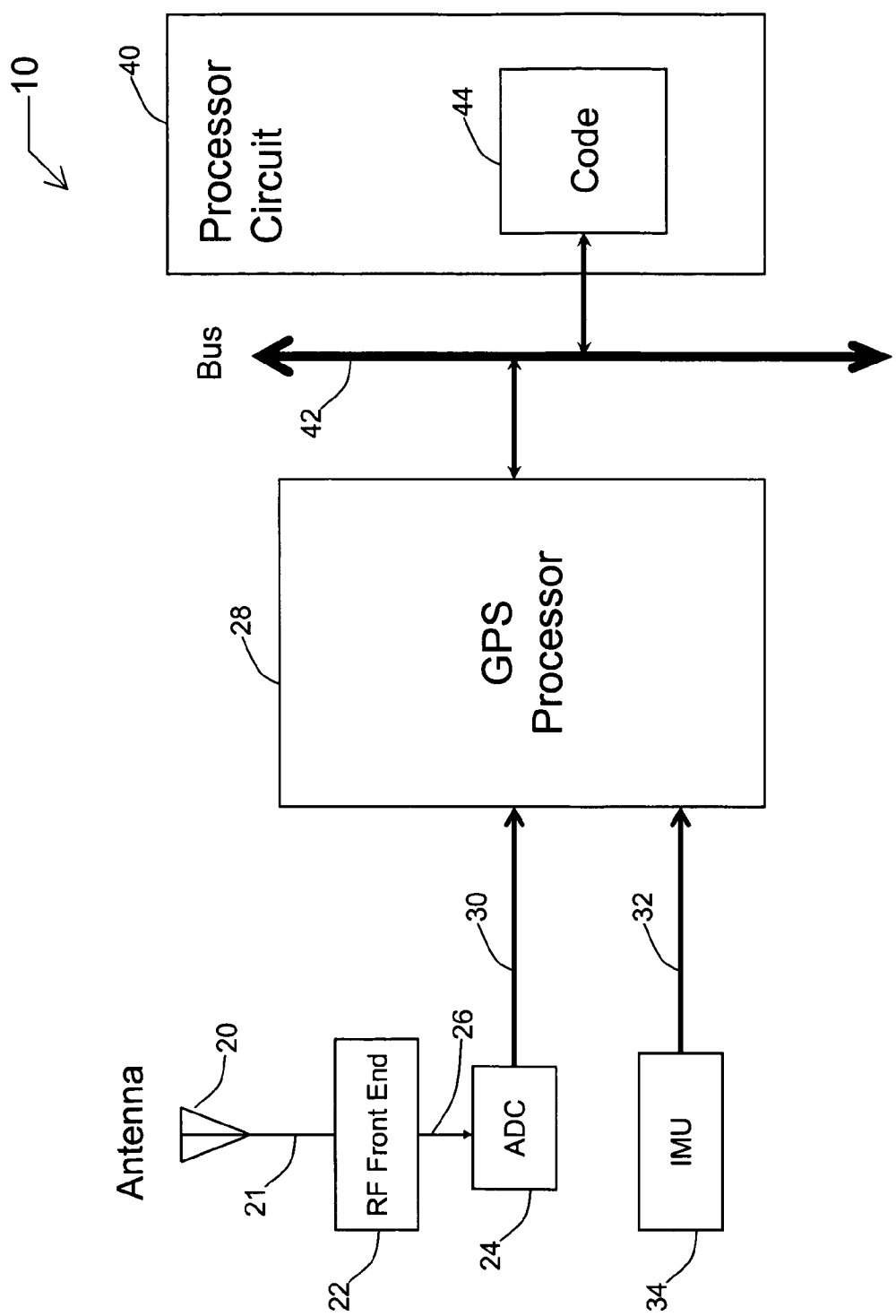
FIG. 1 is a very high-level block diagram of an exemplary receiver for a satellite-based radio navigation system that may be used for acquisition and tracking of low CNR signals from radio navigation satellites.

Referring to the drawings, and initially to FIG. 1, there is shown a first exemplary embodiment of a receiver system 10 for acquisition and/or tracking of low carrier-to-noise ratio ("CNR") signals from radio navigation satellites. Although the embodiments described herein are in the context of receiving GPS signals, the teachings of this disclosure may have equal applicability to other satellite-based radio navigation systems. The exemplary receiver 10 may be a hand-held receiver or may have one or more fixture components, e.g., one or more rack-mounted components. The exemplary receiver 10 may be for real-time acquisition and/or tracking of low CNR signals from radio navigation satellites, or post-processing acquisition and/or tracking of low CNR signals from radio navigation satellites, or a hybrid of real-time and post-processing acquisition and/or tracking of low CNR signals from radio navigation satellites.

A software radio approach may be used to sample incoming satellite (e.g., GPS satellite) signals. If a software radio approach is used, the exemplary receiver 10 may comprise an antenna 20 in circuit communication with a radiofrequency ("RF") front end 22, which is in circuit communication with an analog-to-digital converter ("ADC") 24 to digitize the signal 26 from the RF front end 22. The ADC 24 may be in circuit communication with a GPS processor 28, which does initial processing of the digitized GPS data signal 30 from the ADC 24. The GPS processor 28 is in circuit communication with a processor circuit 40 via a bus 42. The processor 40 executes code 44 to determine various data from received GPS signals, as explained below. The exemplary receiver 10 shown also preferably includes a source of inertial information 32 corresponding to movements of the antenna 20, such as an inertial measurement unit ("IMU") 34 in circuit communication with the processor 40, e.g., an IMU 34 in circuit communication with the processor 40 via the GPS processor 28. The processor circuit 40 may be in circuit communication with other devices (not shown), e.g., (a) a display for displaying information (e.g., position) determined from the received satellite signals, (b) another processor system to which the processor circuit 40 transmits information determined from the received satellite signals.

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication. Also, as used herein, voltages (also referred to as just "signals") and values representing digitized voltages are considered to be equivalent for the purposes of this application, unless expressly indicated otherwise, and thus the term "voltage" as used herein refers to either a signal, or a value in a processor representing a signal, or a value in a processor determined from a value representing a signal.

The antenna 20 may be virtually any antenna suitable for receiving signals from radio navigation satellites of the particular radio navigation system desired, e.g., a NovAtel Pin-Wheel brand antenna Model No. GPS-600 for receiving and amplifying GPS signals. It is desirable to incorporate amplification with the antenna if the circuit communication 21 in combination with the antenna 20 results in a noise figure of greater than 2.5 dB. It is desirable in the GPS context to have an antenna with a noise figure of less than 2.5 dB, low (e.g., no more than about 10 dB) gain variation from elevation angles varying from 10 to 90 degrees, and a sharp gain cutoff below 5 degrees of elevation. The RF front end 22 amplifies the received GPS signal and downconverts (frequency mixes) the received GPS signal to baseband (i.e., converts GPS signal to intermediate frequency (IF)). The nominal intermediate frequency of the downconverted signal 26 is 21.27 MHz. The nominal IF of the signal 30, after 26 is sampled by the ADC 24, at a rate of 5 MSPS, is 1.27 MHz. The ADC 24 may be a 14Z-bit ADC that samples the downconverted signal 26 at a rate of 5 million samples-per-second (MSPS). Such 14-bit processing may help avoid the need for automatic gain control ("AGC") circuitry and may also provide a high interference margin for the receiver. Other ADC resolutions and sample frequencies may be used in accordance with the teachings herein. A suitable front end including both an RF front end 22 and an ADC 24 is described in Akos, D. M., *A Software Radio Approach to Global Navigation Satellite System Receiver Design*, Ph.D. Dissertation, Ohio University, August 1997, which is incorporated herein by reference.

The GPS processor 28 performs the functions of serial (i.e., time domain) correlation and block (i.e., time and/or frequency domain) correlation. The GPS processor 28 may also perform sensor interfacing and system reference timekeeping. An exemplary embodiment of the GPS processor 28 is set forth in more detail below.

Many types and models of IMUs may be used. They may or may not have the ability to be referenced to an external reference clock (1108 in FIG. 11). The IMU 34 may be a relatively low-cost IMU with microelectromechanical systems (MEMS), e.g., a coremicro® brand IMU from American GNC Corporation ("AGNC"). The above AGNC IMU is a relatively small unit with physical dimensions specified as 5 cm (length), 8 cm (width), and 2.8 cm (height). The table below summarizes the main sensor characteristics of the AGNC IMU, which were verified using collected IMU measurements.

| Parameter | Value observed |
| --- | --- |
| Gyro bias | 0.1 deg/s (sigma) |
| Gyro noise | 0.07 deg/√s (sigma) |
| Accelerometer bias | 2 mg (sigma) |
| Accelerometer noise | 1 mg (sigma) |
| Axis misalignment | ~1.5 deg |

The processor circuit 40, also referred to herein as just processor 40, may be one of virtually any number of processor systems and/or stand-alone processors, such as microprocessors, microcontrollers, and digital signal processors, and may have associated therewith, either internally therein or externally in circuit communication therewith, associated RAM, ROM, EPROM, EEPROM, clocks, decoders, memory controllers, direct memory access ("DMA") controllers, bus interface circuits, and/or interrupt controllers, etc. (all not shown) known to those in the art for implementation of a processor circuit. The processor circuit 40 may include the functionality of ADC 24 and the GPS processor 28 integrally therewith, in which case separate devices would be unnecessary. The processor circuit may be a so-called personal computer (PC) executing a common operating system, e.g., the WINDOWS® XP operating system.

The GPS data 30 and IMU data 32 are preferably very deeply integrated to permit the receiver 10 to acquire and continuously track low CNR GPS signals, while maintaining carrier tracking performance at the cm-level or even the mm-level. By "deeply integrated," it is meant that the GPS samples are combined with the IMU samples at the earliest point in the GPS processing chain, that is, inside the GPS correlators. In effect the processor 40 uses IMU data 32 to make the GPS antenna 20 appear to be stationary, permitting an GPS signal integration time on the order of one (1) second, e.g., 0.6 seconds or 1.2 seconds. Acquisition and tracking can be performed for 15 dB-Hz GPS signals without requiring knowledge of navigation data bits. Test results have demonstrated the feasibility of the deeply integrated GPS/IMU system described herein.

Figure 2:
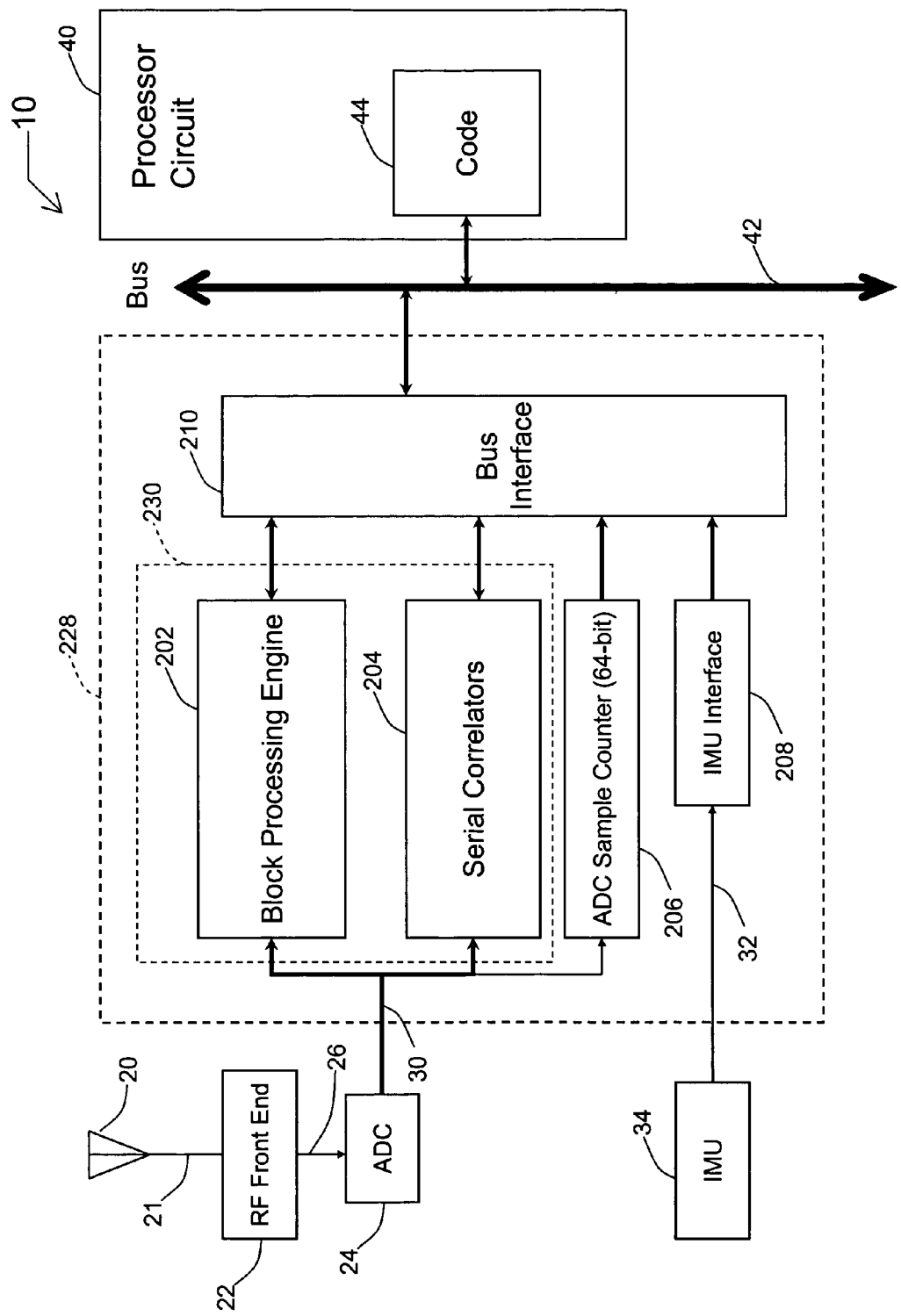
FIG. 2 is a high-level block diagram of the exemplary receiver of FIG. 1, showing additional information about an exemplary GPS processor including an exemplary block processing engine.

Referring now to FIG. 2, some additional details about an exemplary GPS processor 228 are shown in the context of the exemplary receiver of FIG. 1. The exemplary GPS processor 228 includes a real time block processing engine 202, serial correlators 204, and a sample counter 206, all of which are in circuit communication with the ADC 24 for receipt of the digitized GPS data 30. The real time block processing engine 202, serial correlators 204, and a sample counter 206, are also in circuit communication with a bus interface circuit as shown in FIG. 2. The sampled GPS data 30 are sent to the GPS processor 228 for initial processing. Within the GPS processor 228, there are two main pipelines: the block processing engine 202 for block processing and the serial pipeline 204 for serial processing. The serial pipeline consists of replica code and carrier generators and time domain correlators. As discussed below, the real time block processing engine 202 performs the well known FFT-based circular convolution operation that yields correlation outputs for all possible replica code offsets at once. The exemplary GPS processor 228 combines frequency domain GPS processing techniques and time domain processing techniques and, therefore, can be considered to be a hybrid "block-serial receiver." The block-serial receiver is implemented using a combined hardware-software approach. The block-serial receiver hardware 230 may be implemented using a Field Programmable Gate Array (FPGA), such as a Xilinx XC2V8000 device. The re-configurability of FPGAs allows reasonable flexibility and substantial time and cost savings as compared to custom designed Application Specific Integrated Circuits (ASICs). Most of the computationally intensive functions such as the FFTs and serial correlators are implemented in the block-serial receiver hardware 230. Once the data rate is reduced, i.e., once certain GPS information has been determined by the block-serial receiver hardware 230, the more decision-based calculations that largely define application specific algorithms are performed in software 44, as discussed below. This way, many of the benefits of the software-defined radio (SDR) concept are retained. The bus interface unit 210 provides an interface between the bus 42 and the block processing engine 202, the serial correlators 204, and the sample counter 206. The exemplary GPS processor 228 of FIG. 2 also includes an IMU interface 208 in circuit communication with the bus interface circuit (BIC) 210. The IMU interface 208 provides an interface for exchange of IMU data 32 from the IMU 34, as might be required if the IMU 34 communicates via a communications protocol other than those native to the processor circuit 40 and the bus 42.

Figure 3:
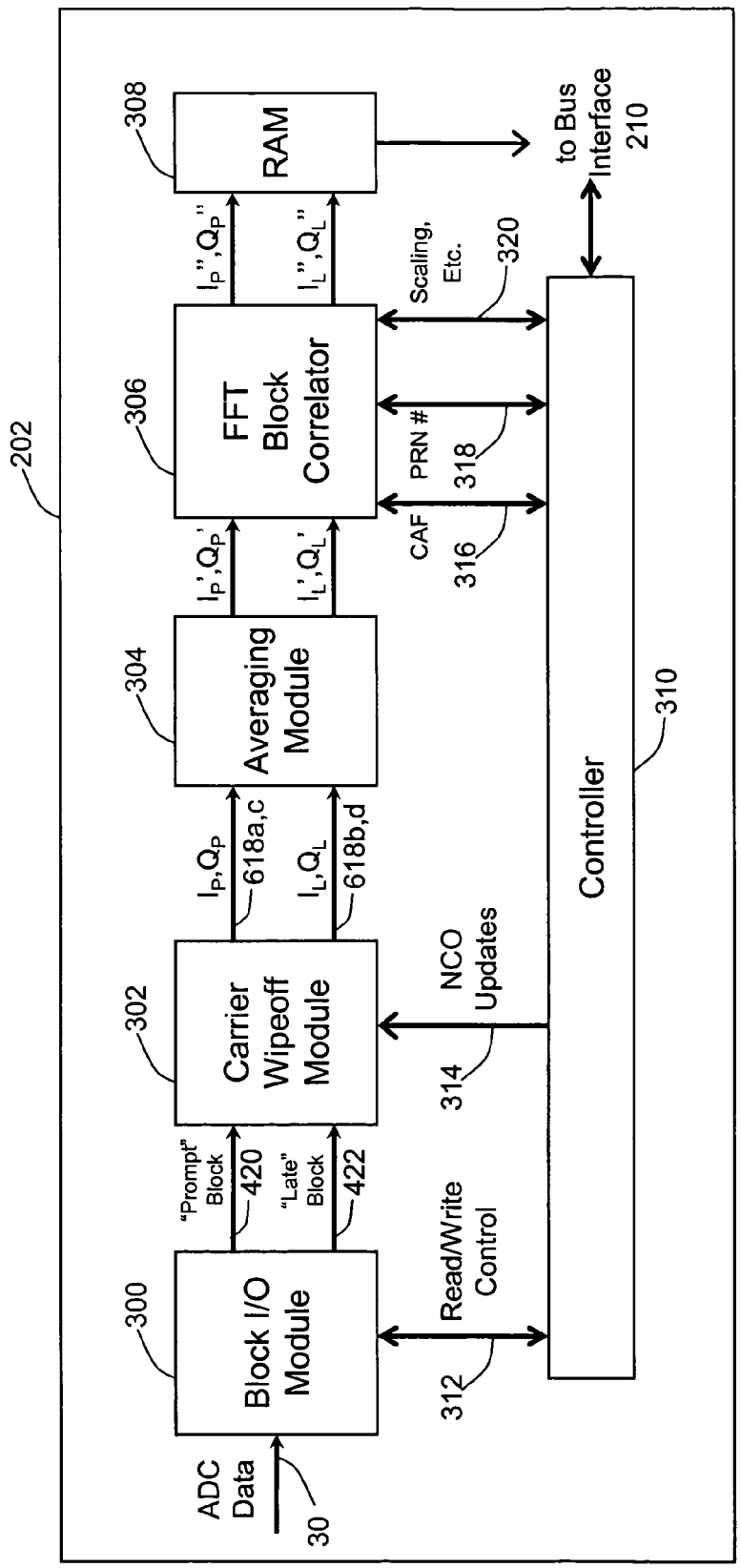
FIG. 3 is a high-level block diagram of the exemplary block processing of FIG. 2.

The high level architecture of the block processing engine 202 is presented in FIG. 3. In this exemplary embodiment, the fundamental time frame (FTF) of the receiver 10 is one (1) millisecond. Thus, incoming ADC data 30 are packed into 1-millisecond blocks by a block I/O module 300. At each FTF epoch, the block I/O module 300 outputs previously collected "prompt" and "late" data blocks in a continuous burst, as explained below in connection with FIGS. 7 and 8. There are several downstream modules: a carrier wipe-off module 302, an averaging module 304, and an FFT block correlator 306. These downstream modules 302, 304, 306 operate on the "prompt" and "late" data blocks bursts and yield the prompt and late block correlations which are stored in RAM 308 and sent to the software 44 on the next FTF epoch. The RAM 308 and a controller 310 are in circuit communication with the bus interface circuit 210 (FIG. 2). The controller 310 is responsible for proper timing, decoding and feeding the uploaded data from the software 44 via read/write control lines 312, numerically controlled oscillator ("NCO") update lines 314, conjugated FFT of the C/A code (CAF) data/control lines 316, CAF RAM index number control lines 318, FFT/IFFT scaling schedule control lines 320, etc.

FIG. 4 shows additional details about the exemplary block I/O module 300. The block I/O module 300 comprises a first 14×5002 RAM block 400 and a second 14×5002 RAM block 402 in circuit communication with the 14-bit digitized GPS data 30. Even though each block of GPS data in this example comprises 5000 samples of 14-bit GPS data, the two RAMs 400, 402 are each sized to collect 5002 samples of GPS data. In short, one RAM block 400, 402 collects GPS data while the other RAM block 402, 400 transmits stored GPS data in response to processing requests from processor 40 via BIC 210 and via controller 310. These processing requests are implemented via write control lines 312a in circuit communication with switches 404, 406 and read control lines 312b in circuit communication with multiplexers 408, 410. The alternating blocks overlap each successive block by two samples, as shown schematically in FIG. 5. When a filled RAM 400, 402 is read out, two 5000-sample data paths 420, 422 are created with one path 422 being delayed by two clock cycles by clocked flip-flops 424. The separate prompt data path 420 and late data path 422 enable both blocks to be processed in parallel in some of the downstream modules 302, 304, 306 of block processing engine 202 (FIG. 3). The block I/O module 300 permits the RAM block 400, 402 that is set to transmit a stored block of GPS data to transmit that block of stored GPS data multiple times for processing during each FTF, with different control inputs from controller 310. An implementation of the exemplary GPS processor 28 in a XILINX brand Model No. XC2V8000 FPGA functions fast enough that this data burst operation can be performed in less than about 15 microseconds. This allows that implementation the block processing engine 202 to be used multiple times during each one-millisecond GPS C/A code period (e.g., with different NCO values and/or different satellite PRN numbers), which permits such operations as fast GPS signal acquisition, weak GPS signal acquisition, and satellite vehicle (SV) anomalous event monitoring.

Figure 6:
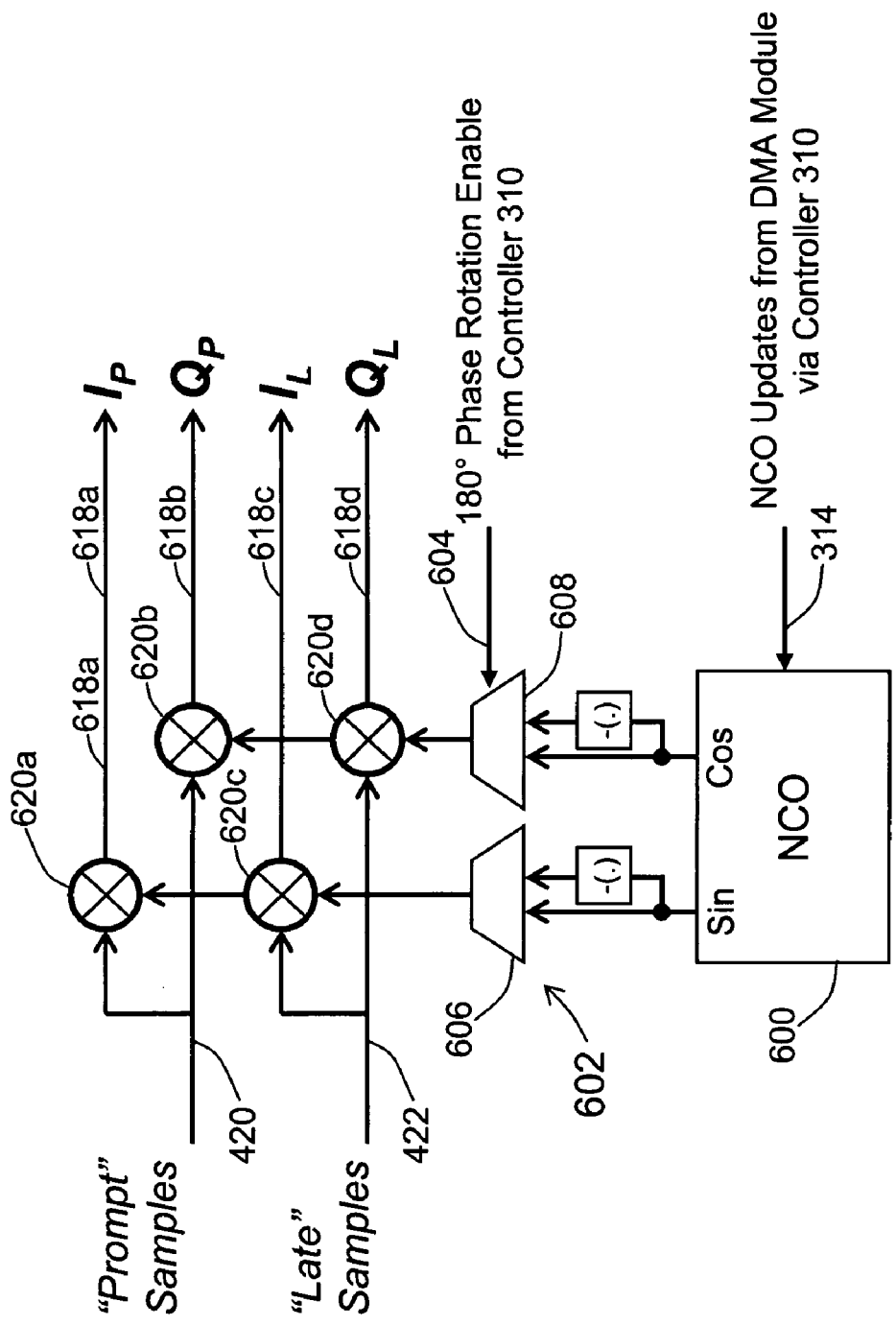
FIG. 6 is a medium-level block diagram of an exemplary carrier wipe-off module.

Referring back to FIG. 3, the prompt data block stream 420 and the late data block stream 422 pass through a carrier wipe-off module 302 where quadrature downconversion to baseband occurs. FIG. 6 shows an exemplary carrier wipe-off module 302. The exemplary carrier wipe-off module 302 uses an NCO 600 with 32-bit phase resolution and 3-bit amplitude resolution implementing amplitudes of +1.0, +0.5, 0.0, −0.5, and −1.0. The NCO 600 may be set to values corresponding to a satellite signal Doppler shift determined by the software 44 (FIG. 2). In addition, a 180° phase rotation feature 602 is included in the carrier wipe-off module 302 for navigation data wipe-off purposes, which permits coherent integration across data boundaries. The 180° phase rotation feature 602 is implemented with a 180° phase rotation enable line 604 from controller 310 in circuit communication with two multiplexers 606, 608 in circuit communication with sine and cosine outputs of the NCO 600. In-phase (I) streams 618a, 618c and quadrature-phase (Q) streams 618b, 618d for both prompt and late streams 420, 422 are generated by four multiplications 620a-620d. The four 14×3-bit multiplications 620a-620d are performed using a shift-multiplex technique in this exemplary embodiment.

Figure 7:
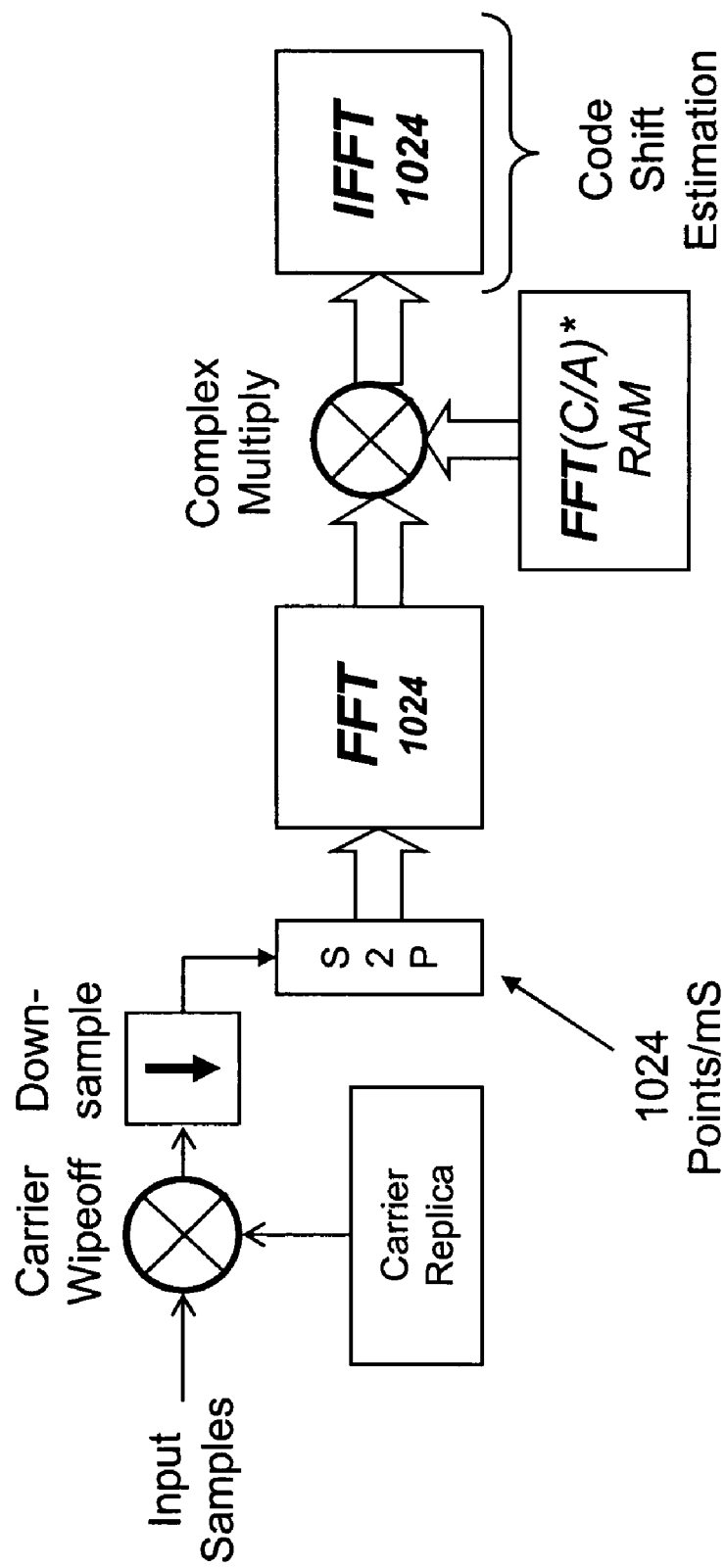
FIG. 7 is a high-level simplified diagram showing an exemplary block estimator of the present invention.

Referring back to FIG. 3, the signals from the carrier wipe-off module 302 are eventually processed by the FFT block correlator 306. Rapid advances in FPGA technology have made it possible to compute large FFTs in a few microseconds. However, this capability does not come at low cost. Therefore, it may still be beneficial to limit the size of the FFT in the FFT block correlator 306 to reduce resource usage and lower costs for implementations. For the exemplary implementation of the block-serial receiver 228, it was decided to use the lowest possible radix-2 FFT size that would still yield acceptable signal observability over all possible GPS code states, which is a 1024-point FFT. The FFT size needed for certain prior art parallel code correlators is determined by the number of samples per code period. For example, the 5 MSPS sample rate of ADC 24 would require 5000-point FFTs, and would give correlator bins spaced approximately 0.2 chips apart. Since the signal bandwidth can be reduced after carrier wipeoff, down-sampling can be performed to limit the FFT size, as illustrated schematically in FIG. 7. Down-sampling comes at the price of increased correlator spacing between bins and thereby limits the resolution of the correlation peak. Since the C/A code has 1023 chips, it is desirable to have at least a C/A chip of resolution per FFT bin. This requirement sets the minimum FFT size to 1023. The exemplary implementation uses the next largest radix-2 FFT size of 1024. FIG. 7 also illustrates the fact that only a pair of FFTs is needed when the conjugated FFT of the C/A code (CAF) is stored in memory.

Figure 8:
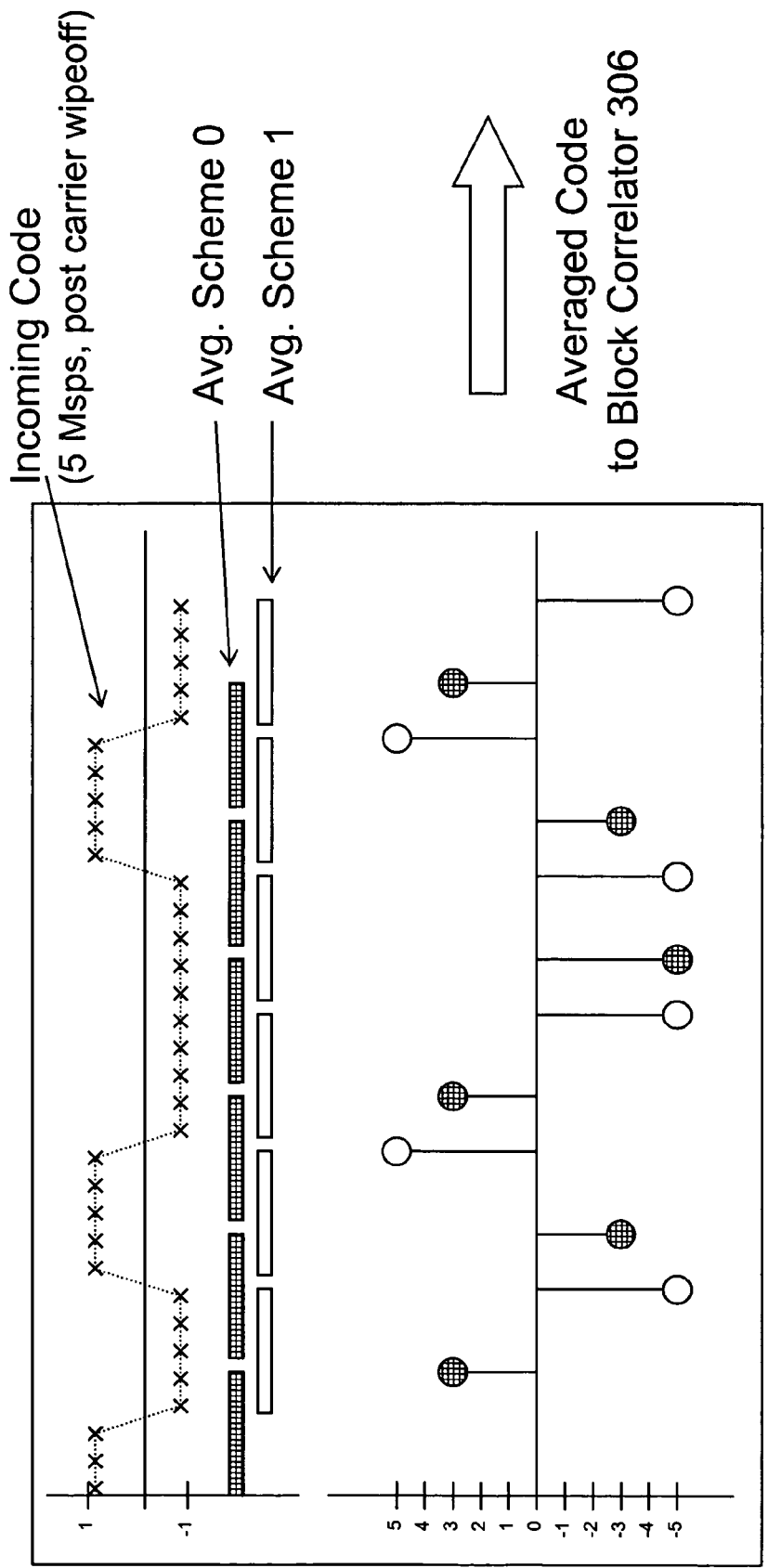
FIG. 8 is a timeline showing two exemplary averaging schemes.

FIG. 8 shows an exemplary averaging illustration in connection with the averaging module 304 of FIG. 3. Down-sampling illustrated in FIG. 7 can be performed by accumulating groups of samples together, which can be considered to be essentially the same as averaging. FIG. 8 illustrates an exemplary procedure. Five possible averaging schemes exist when down-sampling 5000 samples to 1024 samples. Two of these are depicted in FIG. 8. The averaging scheme that lines up with the incoming C/A chip boundaries produces the maximum energy. Techniques exist to re-combine correlation outputs from each of the five averaging schemes to arrive at the original 5000-point correlation output with minimal signal loss. For the exemplary implementation described herein, two of the five possible averaging schemes (spaced two samples apart) were selected. The resulting combined correlation output has bin spacing of approximately 0.5 chips. Since this is analogous to how the early, prompt, and late correlators are formed in a traditional GPS receiver, the corresponding data blocks are referred to herein as prompt and late blocks, discussed above.

Figure 9:
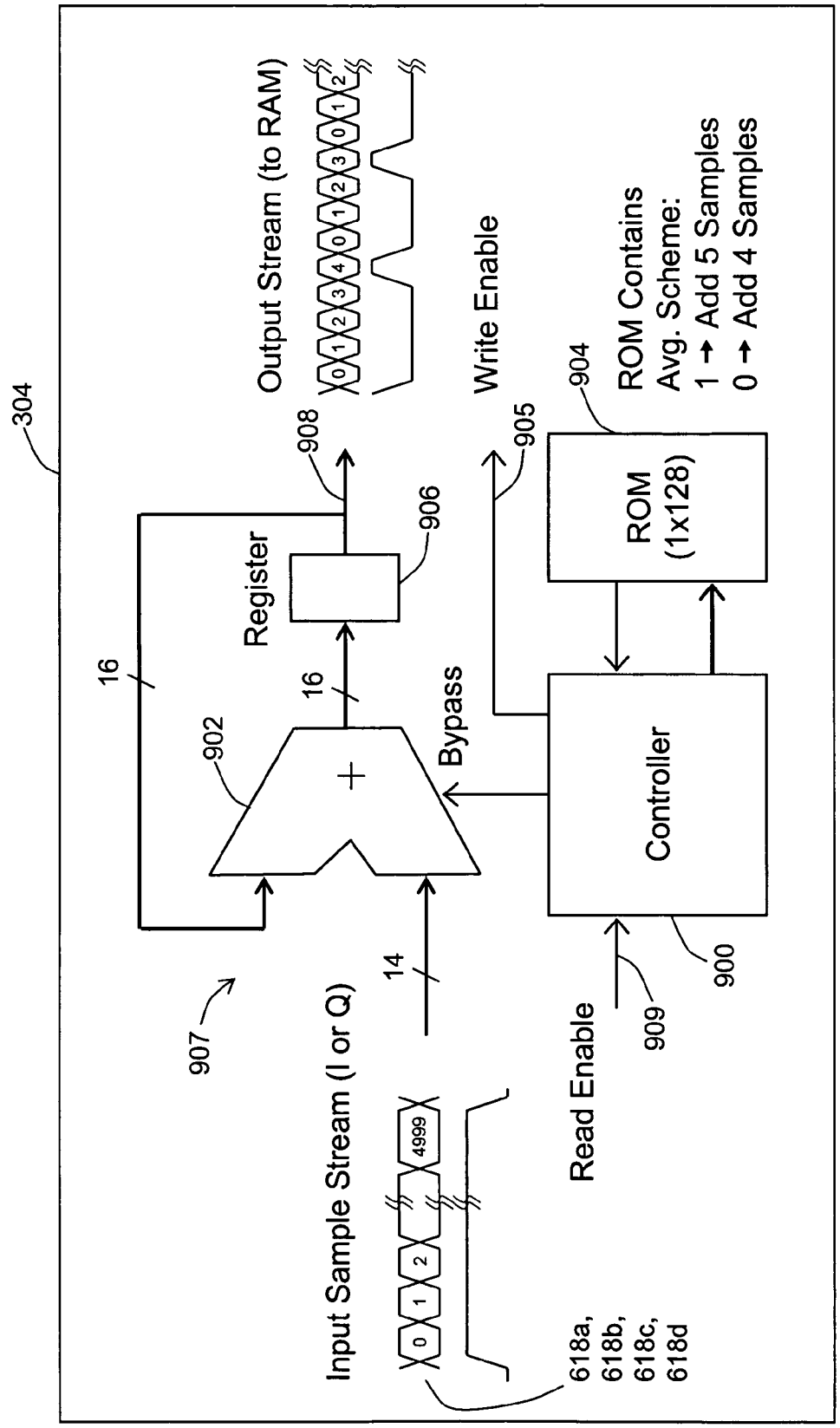
FIG. 9 is a medium-level block diagram of an exemplary averaging module.

With the above introduction to averaging, FIG. 9 shows an exemplary averaging module 304. As discussed above, after carrier wipe-off the averaging module down-samples the 5000-sample blocks to 1024-sample blocks suitable for the FFT block correlator 306. In this particular implementation, groups of five samples and four samples are accumulated to form averaged samples. The ratio of the groups of five to groups of four is 113 to 15, as shown below:

$$5000=[(\bullet 113)+(\bullet 15)]\cdot 8$$

In order to maximize correlation energy, the groups of four may be distributed as evenly as possible within the groups of five. The specific grouping sequence used in the exemplary averaging module 304 is shown below:

$$5000=\{[((\bullet 8)+\bullet+(\bullet 7)+\bullet)\cdot 7]+(\bullet 8)+\bullet\}\cdot 8$$

FIG. 9 is a medium-level block diagram of the exemplary averaging module 304. The averaging module 304 comprises an averaging controller 900 in circuit communication with a signed adder 902, and a register 906, which together form an accumulator 907 and a one-bit by 128-bit ROM 904. The grouping sequence set forth immediately above is stored in the 1×128 ROM 904. A '1' in ROM 904 corresponds to 'add 5 samples' and a '0' in ROM 904 corresponds to 'add 4 samples.' The controller 900 resets the accumulator 907 based on the binary instruction from the ROM 904 and generates the proper write enable pulse 905 to be used by a downstream RAM (1002, 1004 in FIG. 10). A read enable 909 is generated as follows: As discussed above, the block I/O module 300 fills up one memory bank 400 and then fills up the next bank 402. Note that this filling process occurs at the sampling rate (i.e. 5 MSPS in the exemplary embodiment), but there is a system clock (not shown) having a clock rate that is much higher (~150 MHz in the exemplary embodiment). One goal of this embodiment is to process the current block 400, 402 (the one that was completely filled during the last FTF) as quickly and as many times as possible before the other block 402, 400 is filled and ready for processing. So the averaging module 304 is clocked with new data on every system clock cycle. Hence its read enable 909 is a continuous '1' (i.e., ON) for as many blocks as needed (i.e. total cycles=X blocks*5000 samples per block). This read enable 909 comes indirectly from the controller 310 (FIG. 3). The controller 310 determines how many times to process the block and generates the "Read/

Write Control" control signal 312. The averaging module read enable 909 is effectively the Read/Write control signal 312, which has been delayed by the number of cycles that corresponds to the latencies in the modules 300 and 302. Note also that the number of times the block is processed is limited by the amount of memory available in the RAM 308 to store the processed results. As for the write enable signal 905, as the Output Stream of FIG. 9 indicates, the write enable signal 905 writes the partial sums (the sum of 5 samples or the sum of 4 samples) to the downstream RAM 1002, 1004. This process continues until the entire 5000-bit sample of data has been down-sampled to 1024 samples. This entire process is repeated twice—once for each of the two averaging schemes discussed above and shown in FIG. 8. The result is a pair of 1024-bit "averages," both of which are stored in the downstream RAM 1002, 1004. The stored values are actually partial sums and not really averages (they would have to be divided by 5 (somewhat expensive to do in hardware) or by 4 to make them true averages). It has been found that using the partial sums has very little impact on performance; not dividing is effectively adding some amplitude modulation to the downstream samples and GPS signal structure is largely insensitive to such amplitude variations.

The accumulator 907 of the averaging module is repeated four times to process the corresponding four data streams from the carrier wipe-off module. However, the control for all four accumulators is the same. This results in the processing of two complex pairs of averages (AVG0 and AVG1 in FIG. 10A). The two averaging schemes AVG0 and AVG1 correspond to the prompt and late averages of the prompt and late blocks from the block I/O module, respectively. Refer to FIG. 8 for how the AVG0 and AVG1 correspond to the prompt and late block averages respectively.

Figure 10A:
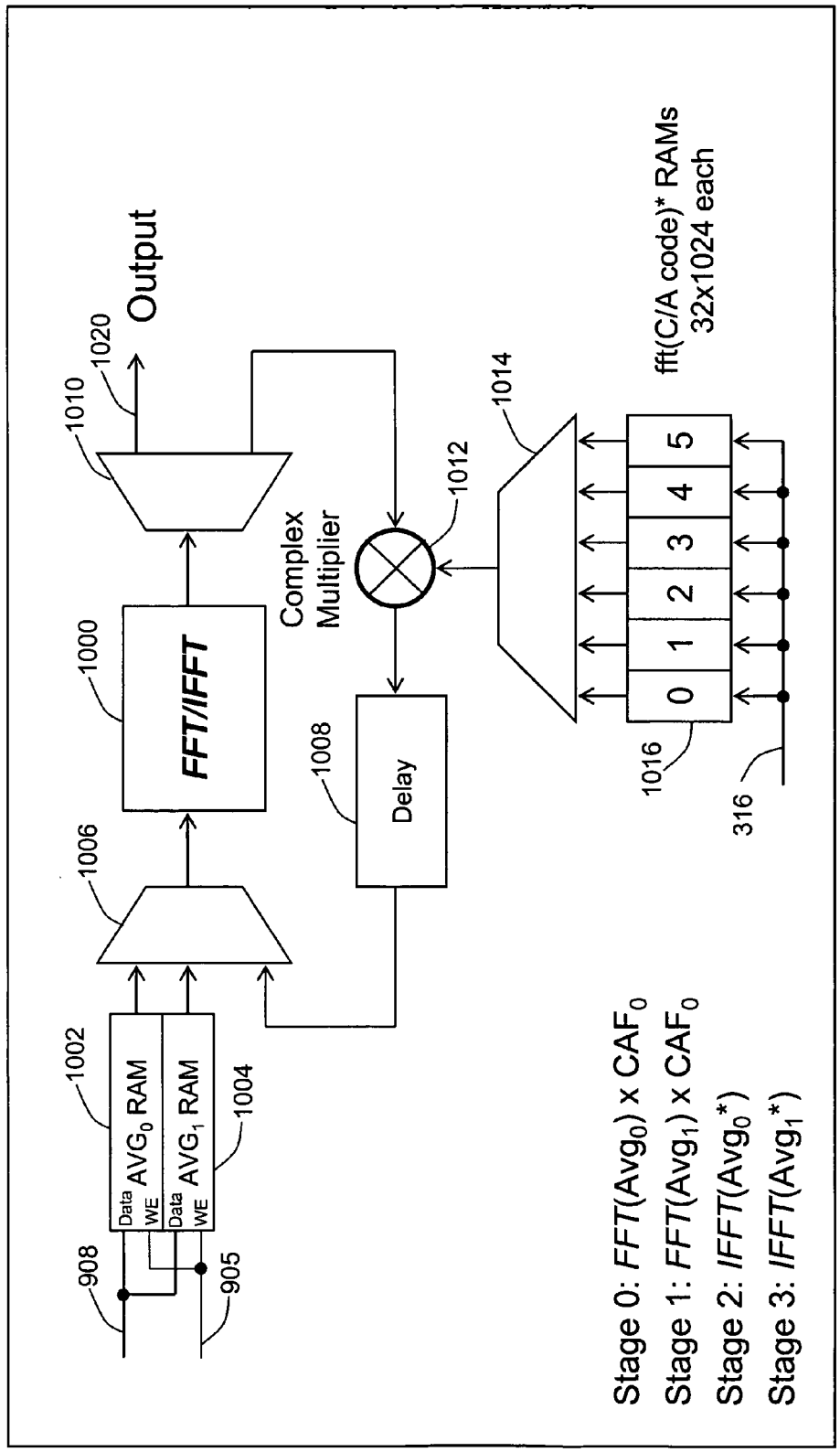
FIG. 10A is a medium-level block diagram of an exemplary FFT block correlator module.

Referring back to FIG. 3, the FFT block correlator 306 is downstream of the averaging module 304. The FFT block correlator 306 is the workhorse of the block processing engine and an exemplary architecture is presented in FIG. 10A. Referring now to FIG. 10A, the exemplary FFT block correlator module 306 shown is based around a 1024-point, 16-bit, complex FFT/IFFT core 1000 in circuit communication with the average RAMs 1002, 1004; multiplexer 1006, a delay 1008, a de-multiplexer 1010, a complex multiplier 1012, and a plurality 1016 of RAMs for storing conjugated FFT of the C/A code (CAF RAMs 1016). The core 1000 used in the exemplary implementation was developed by Xilinx and is available from the LogiCORE core library within the Xilinx ISE FPGA design suite and is capable of performing back-to-back FFTs (or IFFTs) in 1024 clock cycles. The FFT block correlator 306 performs correlations for the prompt and late blocks using four successive passes through the FFT core. On the first pass (Stage0 in FIG. 10), the FFT of the prompt block is computed. As this result arrives out of the core 1000 (after some latency), it is complex multiplied with one of six selectable CAFs. Similarly Stage1 performs the FFT of the late block immediately following Stage 0. The delay 1008 is used to present the multiplied results of Stage 0 and Stage 1 to the core 1000 on the cycle after Stage 1 is completed. Stage2 and Stage3 compute the IFFT of the prompt and late blocks, respectively. The correlated outputs 1020 are then stored in the RAM 308 and sent to the processor 40 on the next FTF. Certain scaling parameters 320 (FIG. 3, not shown in FIG. 10) maybe applied to the core 1000 in order to optimize use of the available 16-bit resolution and/or to prevent numerical overflow.

Figure 10B:
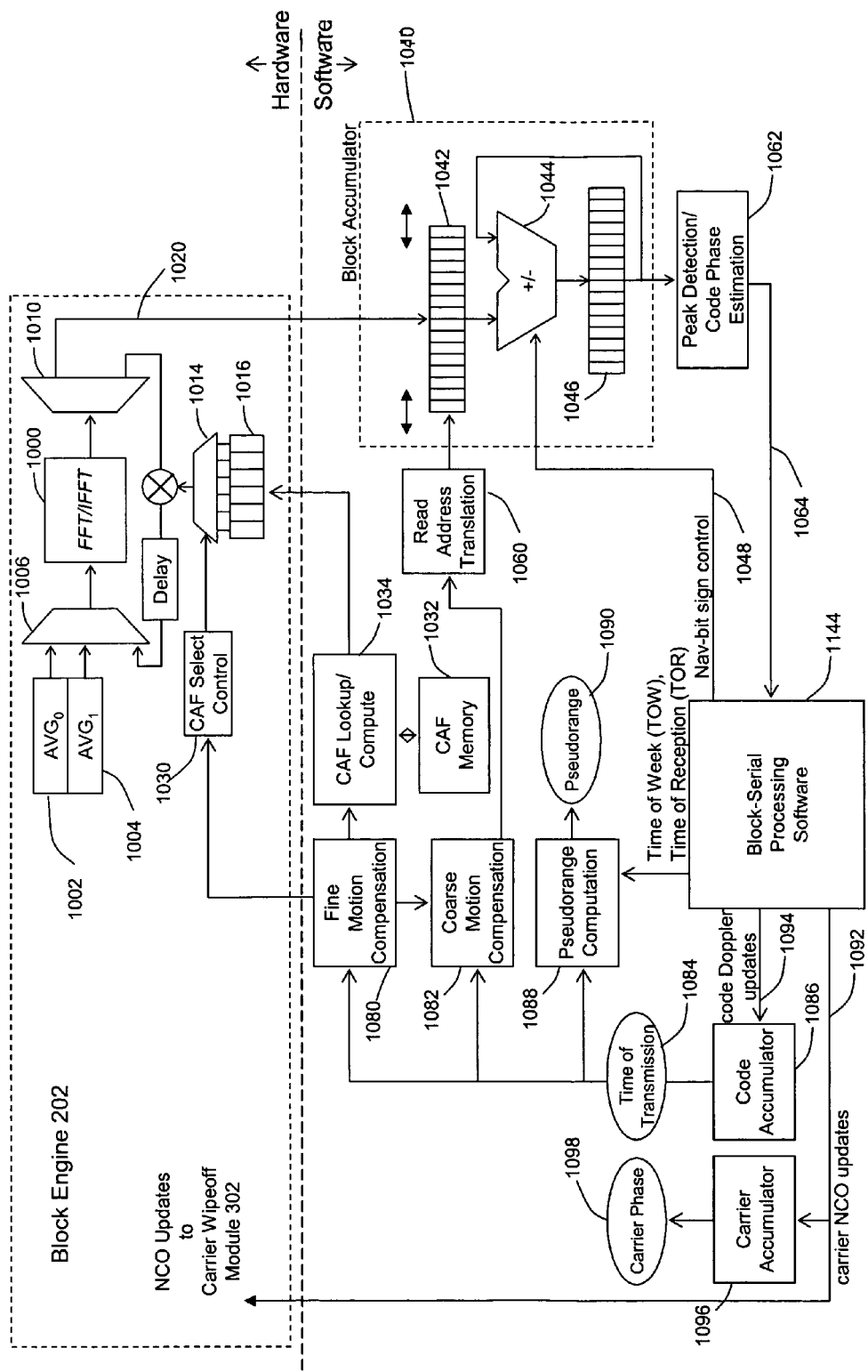
FIG. 10B is a block diagram showing an exemplary code Doppler compensation method in the frequency domain-based circular correlation operation.

The frequency domain based circular correlation operation described above provides the correlation output for all possible code offsets in parallel. The resolution (i.e., equivalent correlator spacing) is determined by the number of points used in the FFT/IFFTs. In general, this algorithm requires two FFT operations and one IFFT operation to compute a single block correlation. If the FFT of the local code is stored in memory, the requirement can be reduced to one FFT and one IFFT. However, since the transform of the local code stored in memory is now fixed at the nominal code frequency, and the incoming code has a slightly higher or lower frequency (e.g., due to code Doppler shift), the correlation peak moves along the code bins at a rate proportional to the code Doppler. This peak motion is detrimental for the block accumulation (e.g., block addition methods) used for low-CNR signal processing. The peak motion causes the block-accumulated peak to be smeared (i.e., the peak width is widened and net amplitude reduced). This section describes, and FIG. 10B shows, an efficient method of compensating for that motion of the peak. Two primary features of this method include: it does not use any additional realtime FFT operations, and it uses storage of pre-computed C/A code FFT conjugates in memory. However, this storage is done in the host computer 1140 (FIG. 11) where storage cost is relatively low or in the generic processor circuit 40, where storage costs will vary, depending on the storage media used.

Referring now to FIG. 10B, this figure illustrates the peak motion compensation method in relation to the other major processing blocks within an exemplary low-CNR capable receiver. For clarity, the time domain processing blocks and the hardware-software DMA blocks are not shown. The method is comprised of two steps: 1) fine peak motion compensation, and 2) coarse peak motion compensation.

Fine motion compensation involves matching the conjugated FFT of the local C/A code (CAF) vector in the Block Engine 202 as closely as possible to the corresponding code offset of the incoming signal. This is done by switching in one of a few pre-computed CAF vectors stored in CAF bank 1016 using controller 1030. The number of CAF vectors needed per satellite is no more than the averaging ratio used in Averaging Module 304. For example, in the present embodiment the averaging ratio is 5000/1024; hence, no more than 5 CAFs per satellite are required. A CAF update is only required after a few hundred milliseconds (for modest code Doppler). Therefore, the next required CAF can either be retrieved from CAF memory 1032 (which may be part of system memory of host computer 1140), or computed as needed in software. If the next CAF is computed as needed, two methods are available: 1) complete the next CAF entirely for the next code offset, 2) compute the next CAF from the current CAF or the base CAF (i.e. CAF corresponding to nominal code frequency) by multiplying by a complex exponential function. The management of CAFs is performed by a CAF Lookup/Compute unit 1034 which may send the needed CAFs to the Block Engine 202 using DMA transfers. Fine motion compensation corrects for the sub-bin energy fading that occurs due to code Doppler. After fine motion compensation, most of the signal energy is concentrated in a given bin. However, the peak may also hop from one bin to an adjacent bin at a rate proportional to code Doppler. This effect is corrected using a coarse peak motion compensation method.

Coarse peak motion compensation may be performed inside the Block Accumulator 1040 of the low CNR capable receiver, where multiple 1 ms blocks are added coherently bin-by-bin. In the exemplary embodiment, the block accumulator 1040 is implemented in software in the host system 1140. The block accumulator consists of an input memory array 1042, an adder/subtractor 1044, and an output memory array 1046. During accumulation, Nav data wipeoff is performed via bit sign control 1048 from the block-serial processing software 44, 1144. When the output of the block engine 1020 is read into the host system 1140, it is stored in the block accumulator input memory array 1042. Coarse motion compensation corrects for the bin-to-bin hopping of the correlation peak (after it is fine motion compensated) by reading-in the input memory array in a translated order that compensates for the peak hop. A read address translation block 1060 controls the reading of input memory 1042. Consequently, the output of the block accumulator coherently combines all the energy of a block correlation into the same bin, thereby eliminating the peak motion associated with code Doppler. The accumulated output vector contained in 1046 is processed by a peak detection/code phase estimation block 1062 that sends the estimated code phase 1064 to the processing software 44, 1144.

The exemplary fine peak motion compensation method and coarse peak motion compensation method described above are controlled by fine motion compensation 1080 and coarse motion compensation 1082 blocks respectively. These blocks represent the time of transmission 1084 estimated by the code accumulator 1086, in units of modulo-CAF-index (for fine motion compensation) and modulo-bin-index (for coarse motion compensation). The code accumulator block 1086 is present in virtually any GPS receiver and is used for computation 1088 of pseudorange 1090. The processing software 44, 1144 may employ the carrier NCO updates 1092 to derive the code Doppler updates 1094 if the code phase is not being tracked explicitly. When this is the case, the software 44, 1144 may also contain methods to compensate for code-carrier divergence that may occur in the long term. The carrier NCO updates may also be used by a carrier accumulator 1096 for carrier phase updates 1098.

Figure 19A:
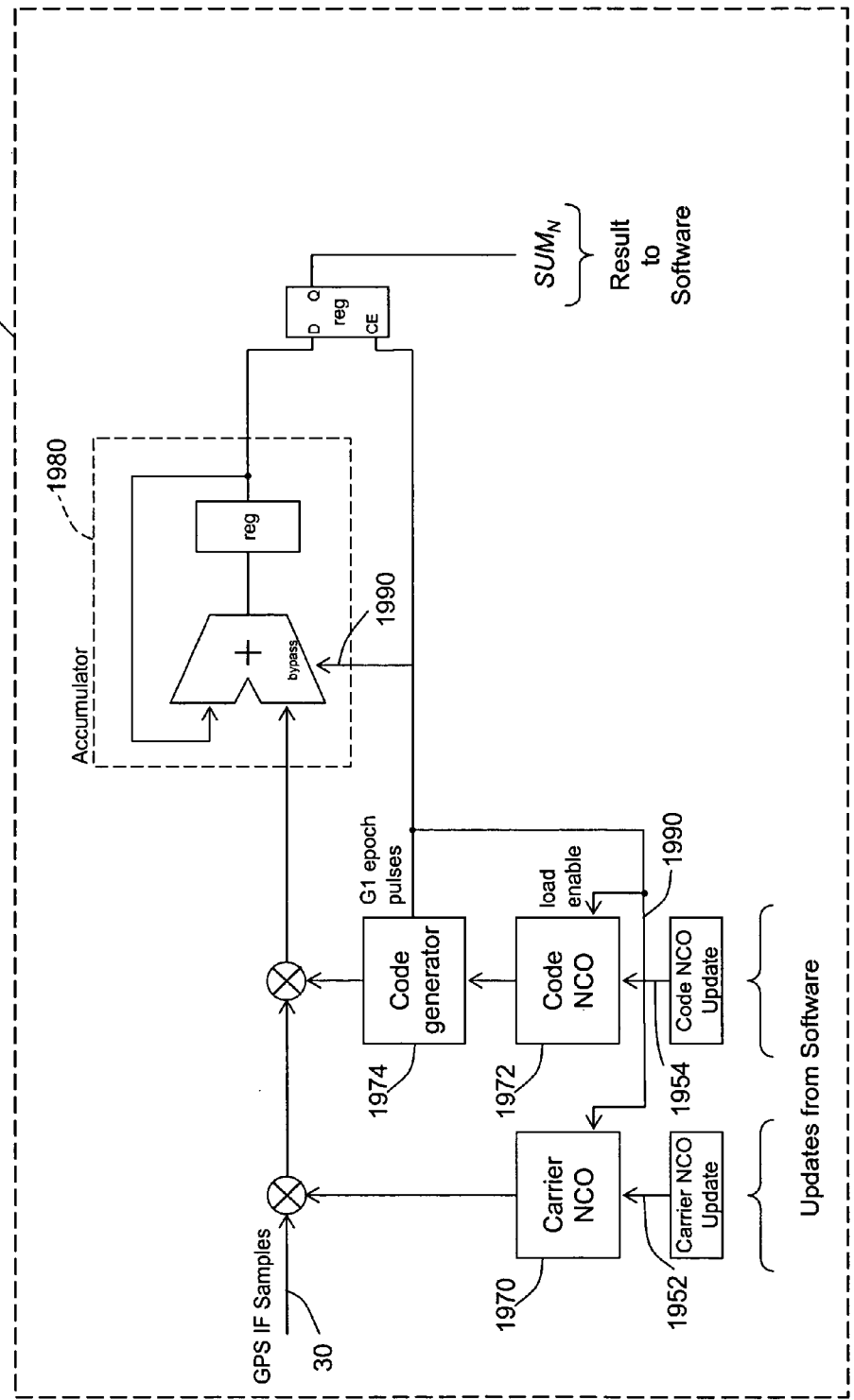
FIG. 19A is a schematic block diagram showing an exemplary prior art correlator.
Figure 19B:
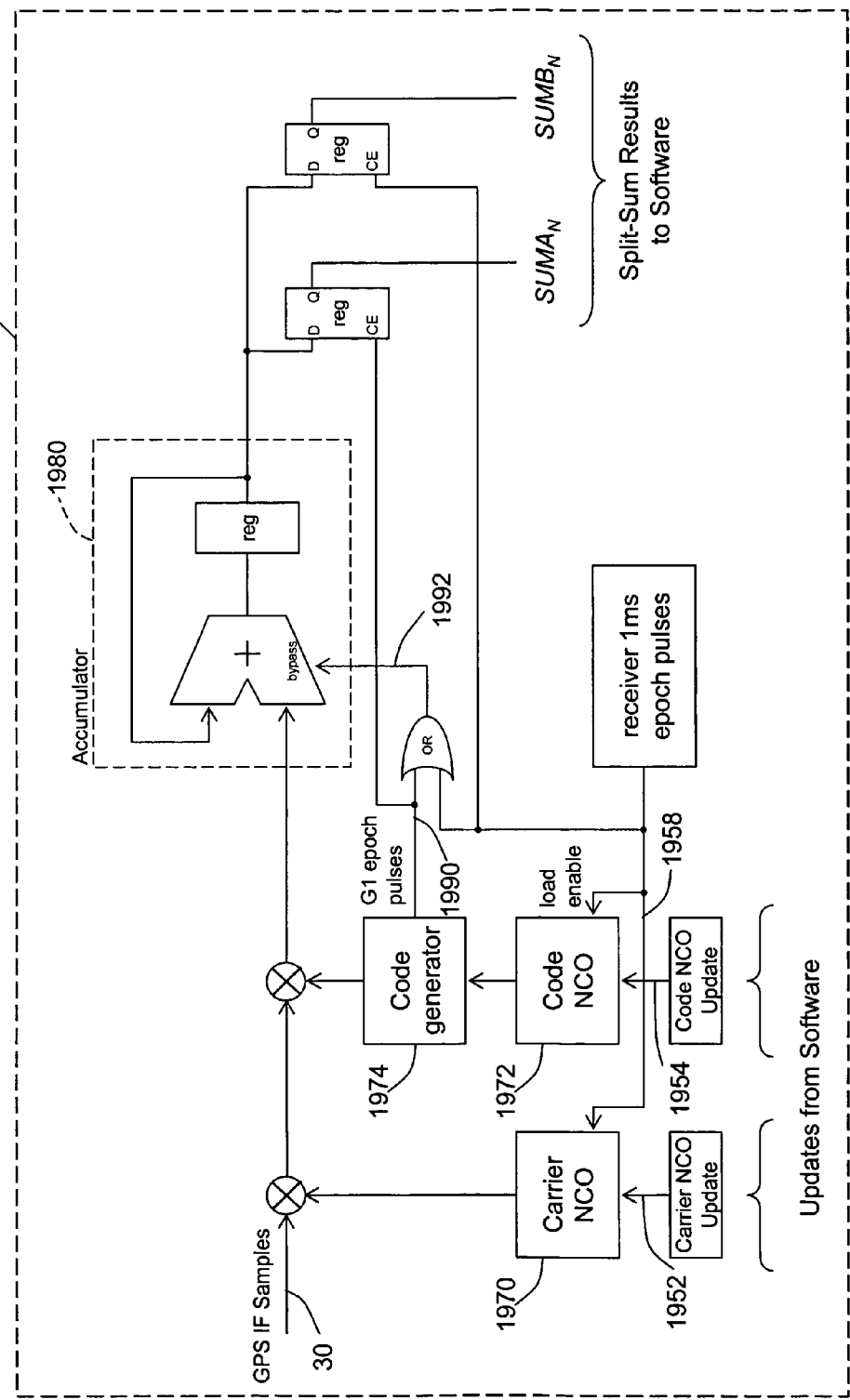
FIG. 19B is a schematic block diagram showing an exemplary split-sum correlator.

Referring back to FIG. 2, exemplary GPS processor 28 also comprises a serial pipeline 204 having a plurality of serial correlators. In this exemplary embodiment, the serial pipeline 204 consists of pluralities of carrier and code generators and 288 time domain (serial) correlators. FIG. 19A shows the basic architecture of a single serial correlator of a typical prior art system. Its architecture is similar to that of most traditional GPS receivers and is therefore not detailed (except for the description of a split-sum correlator circuit in, e.g., FIGS. 19B and 19C and accompanying text). FIG. 19B shows the architecture of a split-sum correlator in the current exemplary embodiment, which is discussed in the text accompanying FIGS. 19B and 19C. The serial pipeline 204 can be configured to process up to 16 separate receiver channels.

In addition to the main processing pipelines 202, 204, the GPS processor 28 shown also has a 64-bit sample counter 206 and an IMU interface 208. The sample counter 206 is used to synchronize the receiver 10 to GPS time, i.e., it keeps track of time in units of GPS samples. Different IMUs have different communications protocols and physical layers (e.g., RS485, proprietary, source synchronous, etc). The IMU interface 208 receives data from the IMU and presents it to the rest of the system. In the exemplary embodiment, the IMU interface 208 receives data at an update rate of 2000 Hz from the American GNC coremicro® MEMS IMU 34. If the IMU 34 is different, the interface 208 could be different.

The exemplary GPS processor 28 may be implemented in a programmable device, such as a XILINX brand Part No. XC2V8000FPGA. An actual implementation of the architecture of FIGS. 1-10 in a XC2V8000 FPGA running at a system clock rate of 140 MHz performs a single block correlation in 14.6 microseconds. At this performance rate, and using additional memory resources for RAM 308, up to 68 parallel code correlations can be performed per FTF using this architecture. In the alternative, the exemplary GPS processor 28 may be implemented in an application specific integrated circuit (ASIC).

The exemplary receiver system 10 of FIGS. 1-10 (with or without the IMU 34) may be used for various applications, depending on the specific code 44 executed by the processor 40. For example, exemplary receiver system 10 of FIGS. 1-10 may be implemented in a hand-held GPS receiver to display position determined from GPS signals. As another example, the exemplary receiver system 10 of FIGS. 1-10 may be used as part of a system for acquisition and/or tracking of low carrier-to-noise ratio ("CNR") signals from radio navigation satellites, e.g., a GPS receiver for acquisition and/or tracking of low carrier-to-noise ratio ("CNR") GPS signals from GPS satellites, as set forth in more detail below.

Figure 11:
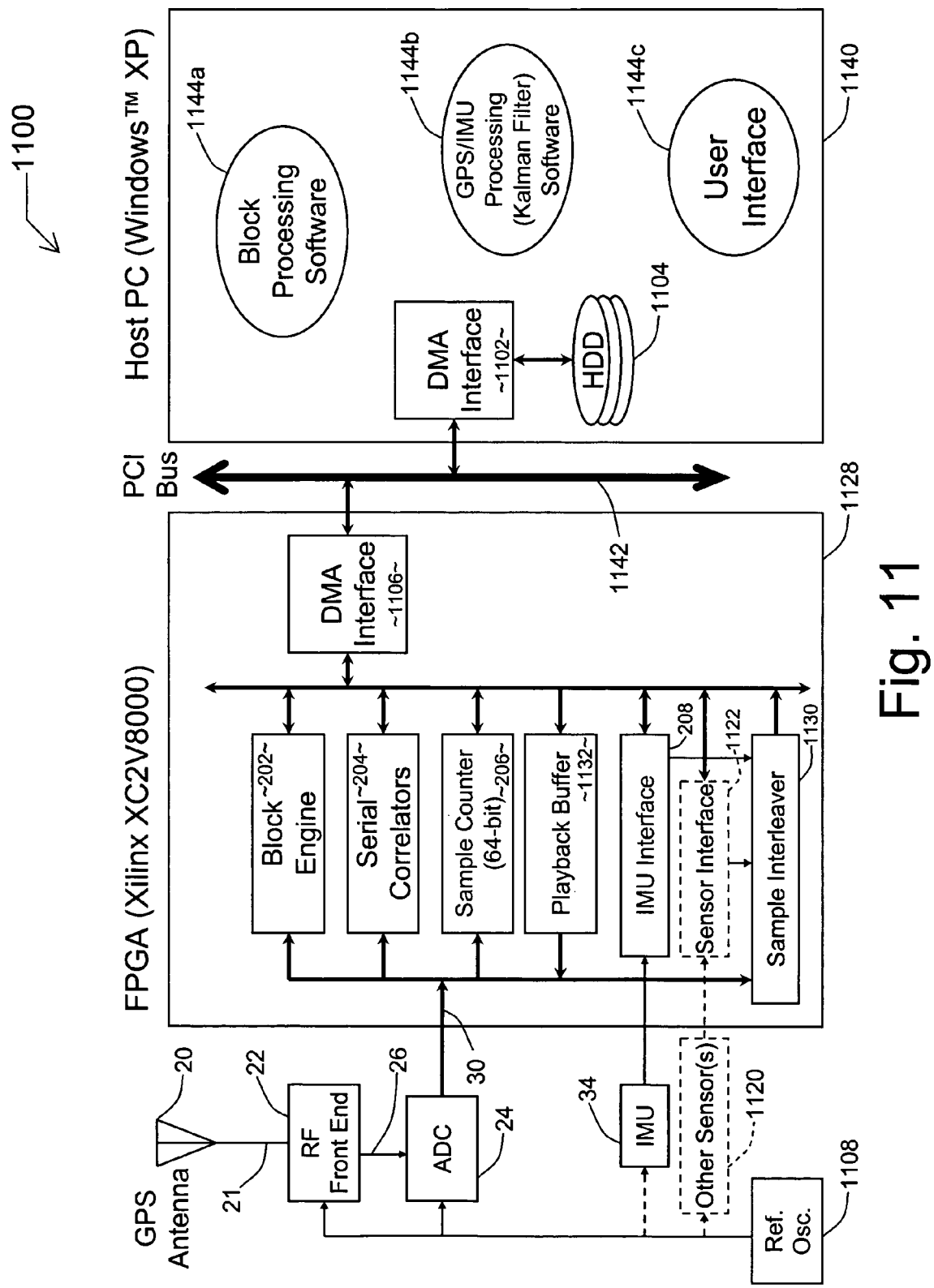
FIG. 11 is a very high-level block diagram of another exemplary receiver for a satellite-based radio navigation system that can be used for acquisition and tracking of low CNR signals from radio navigation satellites.

FIG. 11 shows another exemplary receiver 1100 that is very similar to receiver 10 of FIGS. 1 and 2, except the processor circuit 40 is a PC computer system 1140 (having a PCI bus DMA interface 1102 in circuit communication with a hard disk drive ("HDD")), the bus 42 is a PCI bus 1142 of the PC 1140, and the BIC 210 is a PCI DMA interface 1106. The PC 1100 may have block processing software (code) 1144a, GPS/IMU processing software 1144b, and user interface software 1144c, as discussed in more detail below. The receiver 1100 has a GPS processor 1128 that is substantially as described above with respect to GPS processor 28, except the GPS processor 1128 may have a reference oscillator 1108 in circuit communication with the RF front end 22, the ADC 24, and perhaps the IMU 34. The GPS processor 1128 may be implemented in a FPGA that is placed in circuit communication with the PCI bus via a PCI add-in card (not shown). The reference oscillator 1108 may be the master clock for the entire system 1100. All other needed frequencies (such as inside the RF front end, ADC sampling clock, etc.) are locked to this clock 1108. It may be desirable to have all sensors used in the system 1100 to be locked to one common clock 1108. Additionally, the receiver 1100 may have additional sensors 1120 in circuit communication with a sensor interface 1122 and perhaps the reference oscillator 1108. These other sensors 1120 could comprise RADAR, LIDAR, LORAN, etc. The sensor interface 1122 may be in circuit communication with the DMA interface 1106. Finally, the receiver 1100 may also have a sample interleaver 1130 in circuit communication with the ADC 24 for receipt of the digitized GPS signal 30 and in circuit communication with the DMA interface 1106. All data exchanges between hardware 1128 and software 1144 may occur via fast DMA transfers using the PCI bus 1142 of the host computer 1140. Hardware-software synchronizing may occur via hardware-generated interrupts. The interrupts may occur every millisecond (the receiver's fundamental time frame (FTF)). Since the interrupt rate is low enough to be handled by modern general-purpose microprocessors, the software 1144 need not be overly optimized.

Figure 12:
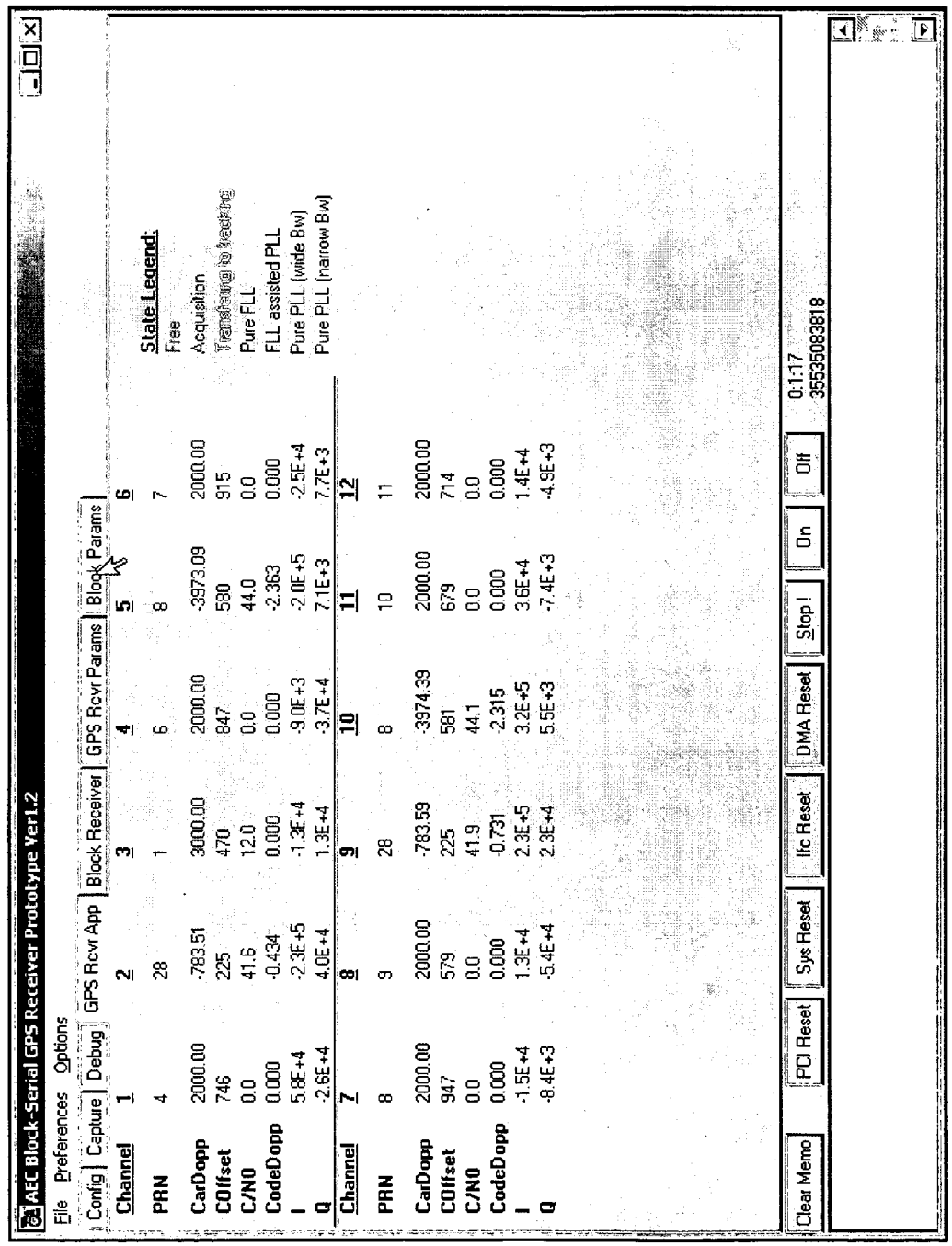
FIGS. 12-14 are screenshots of exemplary software.
Figure 13:
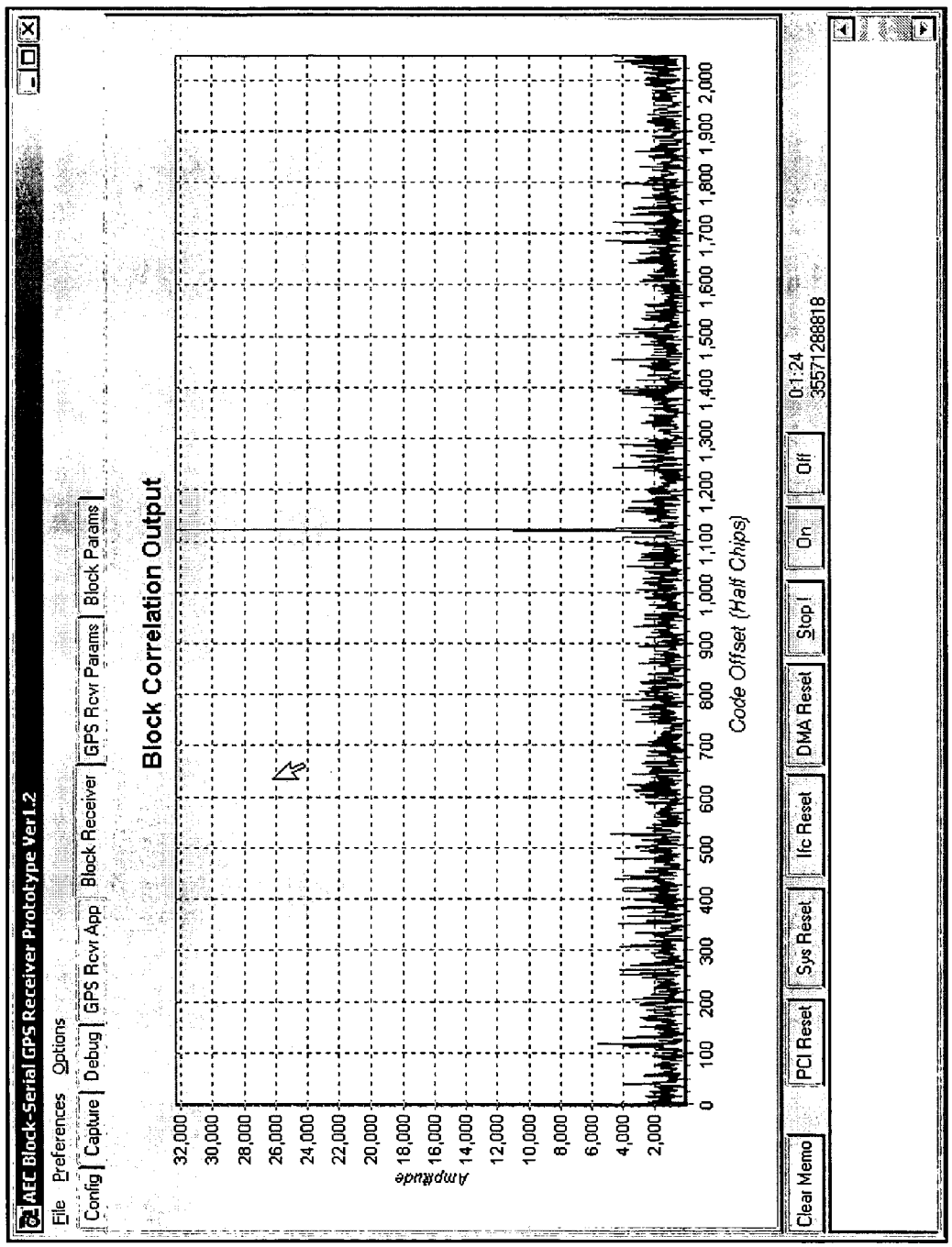
Figure 14:
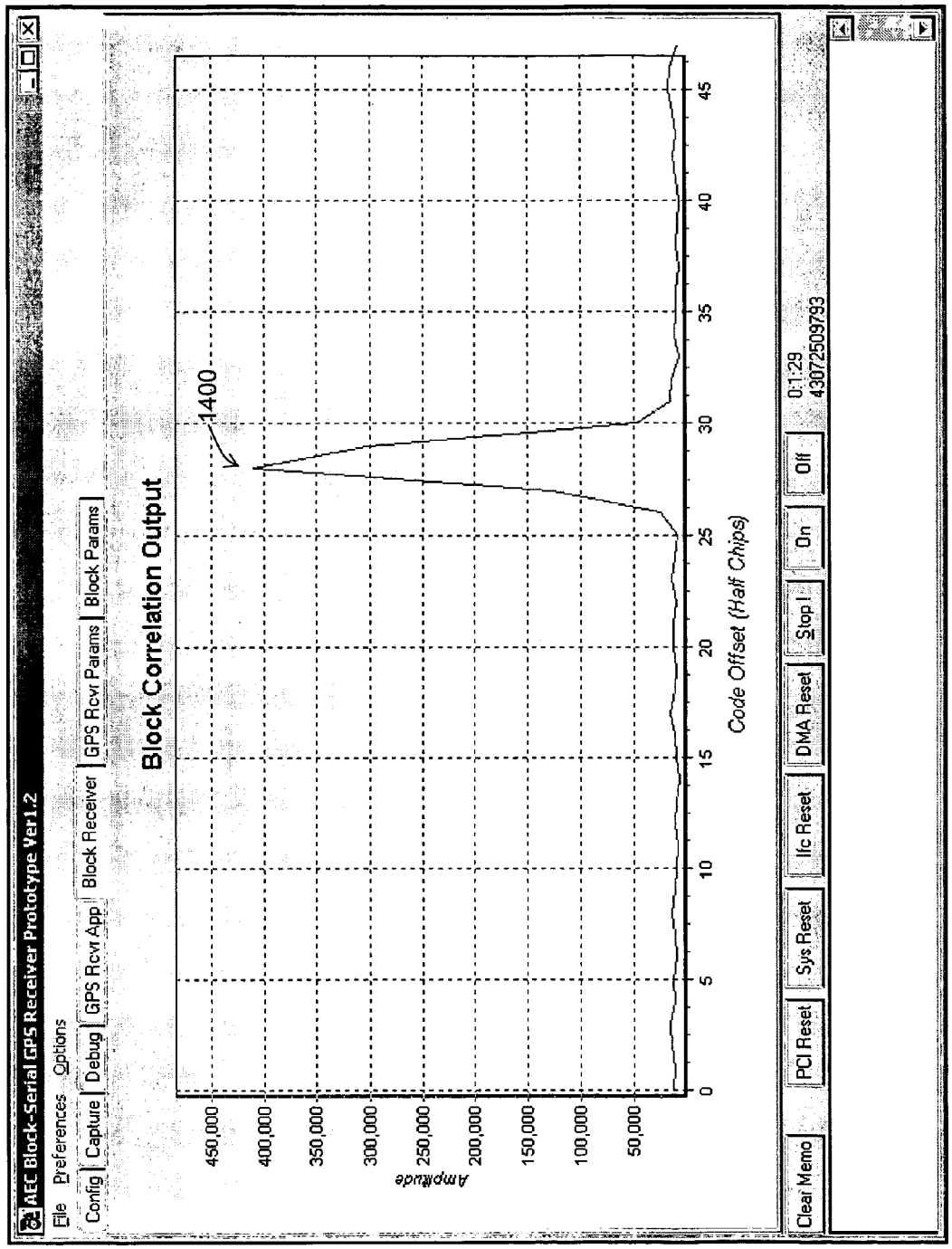

Exemplary code 44, 1144a runs on the Windows XP™ operating system. An exemplary version of the software includes a 12-channel traditional GPS receiver to test and verify the serial component. FIG. 12 shows a screenshot of the serial component in operation. This component may perform serial acquisition and carrier phase tracking with 20 millisecond signal integration. The receiver 10, 1100 goes through serial acquisition, frequency-locked-loop, bit synchronization, and frequency-assisted phase-locked-loop states before attaining phase-locked-loop operation with 20 millisecond integration. The exemplary block processing software component can display the real time parallel code correlation output. The block processing engine's carrier NCO and CAF index may be set using the parameters from a serial channel that is tracking a satellite. FIG. 13 shows the real time parallel code correlation output from the exemplary block processing pipeline 202. In this display, the prompt and late correlation outputs are combined to form a 2048-point parallel code correlation function. FIG. 14 shows a zoom-in of the correlation peak 1400.

FIGS. 12, 13, and 14 demonstrate the real-time operation of the block-serial GPS receiver 230. Thus, a parallel code based block processing technique has been successfully implemented and demonstrated in real-time for a GPS receiver. Also, a real-time block-serial processing GPS receiver has been successfully implemented and demonstrated.

When performing positioning, attitude determination, flight control, especially using multiple sensors, depending on the application, it may be very important to determine very accurately the time in which the sensor measurements were received so that a blended-solution algorithm can process the sensor updates optimally. Accordingly, the exemplary system 1100 also has a sample interleaver 1130, which interleaves GPS samples with data from other samples, e.g., interleaves GPS samples with data from the IMU 34. By doing so, the traditional time stamping of data is avoided (a time source is not used to tag any GPS data or sensor data) while still providing the ability to determine when sensor data arrived. With interleaved data, the exact time (or the exact time interval) when the sensor samples arrived can be computed when data is processed. Processing can be done in real time or post processed. Note that this technique is not limited to GPS and IMU data, but can be extended to include data from the other sensors 1120. The interleaved multi-sensor data may be stored in the hard drive 1104 of the host system 1140 for post processing. This stored data may also be played back through the system via a playback buffer 1132. During playback, the playback buffer 1132 presents data to the block engine 202 and the serial correlators 204 as though the data were coming from the ADC 24 and perhaps one or more sensors 34, 1120. Thus, the rest of the system does not know whether sampled GPS data (and perhaps other data) is being presented in real time or stored and played back. Hence, for the system 1100 the processing of real time data and playback processing is identical.

More specifically, the sample interleaver 1130 interleaves samples from the IMU 34 or other sensors 1120 onto a stream of digitized signals from radio navigation satellites (generically Global Navigation Satellite System (GNSS), e.g., GPS, GLONASS, Galilleo, etc.). In the context of GPS, the sample interleaver 1130 interleaves samples from the IMU 34 or other sensors 1120 onto a stream of digitized GPS receiver digital IF samples. The relative resolution of the time where the sensor measurement occurred can be computed to within the period of one GPS IF sample (e.g., 200 ns for a 5 MHz GPS IF sample rate). The time at which the sensor samples actually occurred is determined when the GPS samples are processed. This may occur in real time, or in a post processing mode, as discussed above. Many other receivers that receive signals from radio navigation satellites and other data may benefit from adding thereto an interleaver according to the present invention, whether or not such receivers use any of the other teachings herein. For example, prior art GNSS receivers that time tag the sensor samples may be modified in accordance with the teachings herein to interleave such data with received GNSS signals removing the need for time-tagging.

Figure 15:
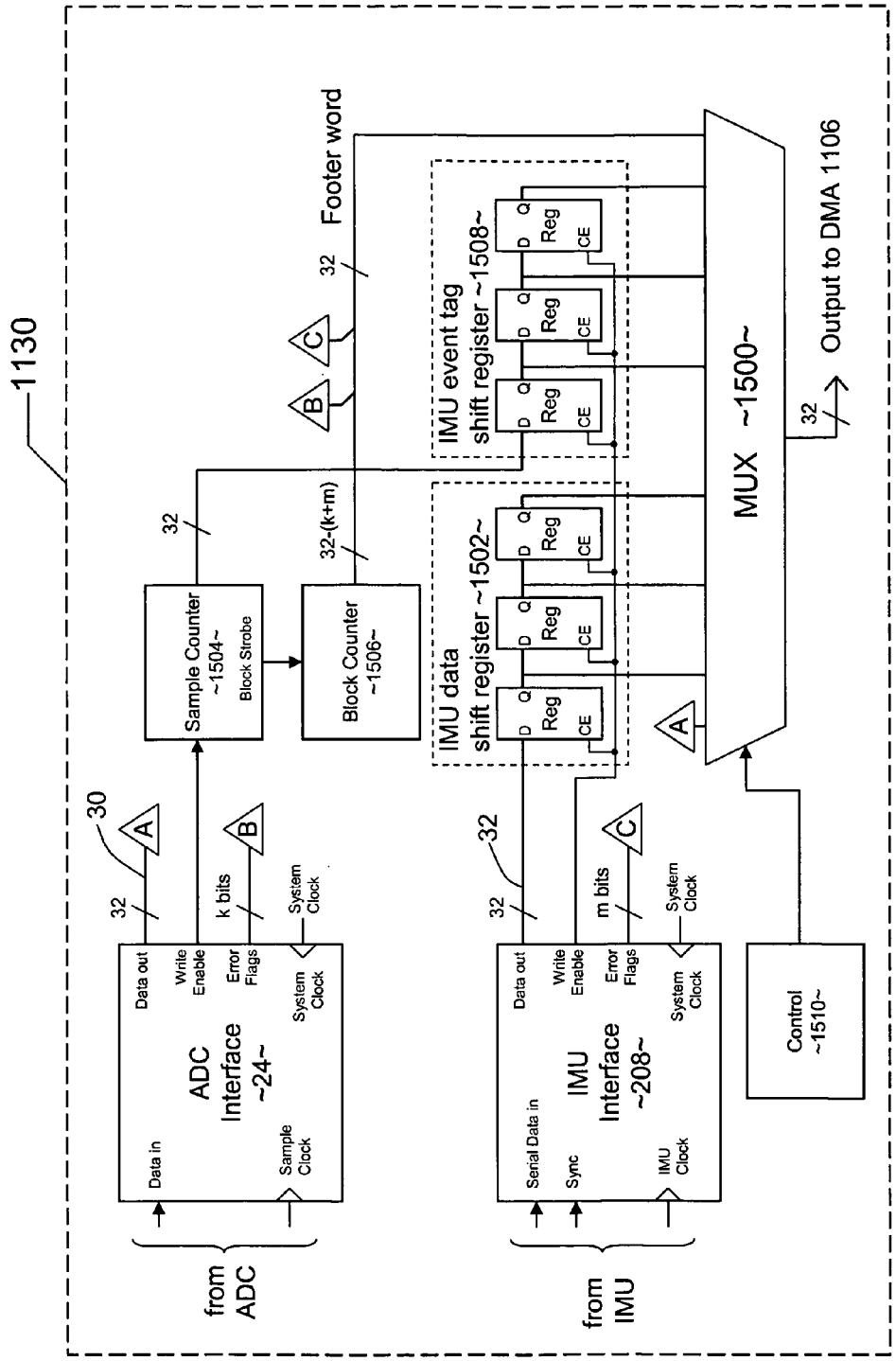
FIG. 15 is a schematic block diagram showing an exemplary data interleaver.
Figure 16:
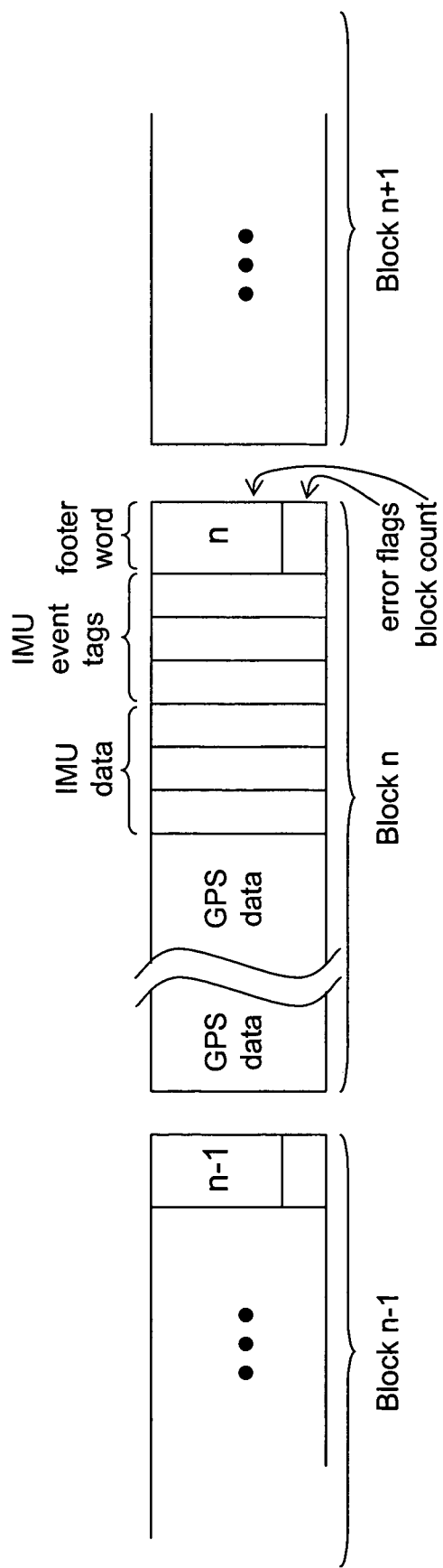
FIG. 16 shows an exemplary data interleaving format.

FIG. 15 shows a block diagram of an exemplary interleaver 1130 and FIG. 16 shows an exemplary format used to interleave sensor samples with GNSS samples. The format comprises a series of data blocks as shown in FIG. 16. All samples (GNSS samples and Sensor samples) that occurred during a predetermined time interval are stored as one block. The GNSS ADC data stream is in circuit communication with a multiplexer 1500 that interleaves the sensor samples with GNSS samples. For ease of processing, this time interval is selected based on the GNSS signal structure. For GPS, the time interval is selected to be 1 ms since this is the nominal period of the C/A code (i.e. 5000 samples if the sampling rate is 5 MHz). The GNSS samples may be packed into 32-bit words. The number of GNSS samples packed into a word depends on the desired quantization. Immediately following the GNSS samples, the sensor samples that occurred during the time interval are appended. Sensor samples are stored in a first shift register 1502 in circuit communication with the IMU interface 208 and also in circuit communication with the multiplexer 1500 that interleaves the sensor samples with GNSS samples. Next, 32-bit counts corresponding to the GNSS sample number where the sensor sample event occurred is recorded from a sample counter 1504 in circuit communication with the multiplexer 1500. Each block is terminated by a 32-bit footer word that includes a block ID number (block count from block counter 1506) and sensor error condition flags, which are stored in a second shift register 1508 in circuit communication with the MUX 1500. The expected sequence of the block ID number is used to check for data integrity. The error flags represent any errors that were reported by the respective interface modules during that block interval. Error flags may include, but are not limited to: ADC overflow errors, IMU checksum/CRC errors, and physical interface/comm. protocol errors. An interleaver controller 1510 controls the order of the interleaved data blocks. Again, this technique is not limited to GPS and IMU data, but can be extended to include data from any of the other sensors 1120 via their respective interfaces.

The interleaver 1130 can also handle and interleave non-synchronous sensor events. The navigation sensor(s) 34, 1120 used may or may not have the ability to be locked to an external reference clock 1108. If the sensor 34, 1120 is not locked to a clock 1108, its samples will arrive asynchronously with respect to the GNSS samples. For example if an IMU sensor has a measurement rate of 2 kHz and the block interval is 1 ms, two IMU samples will be generated nominally per block interval. However due to clock drift, during certain block intervals, there might be one or three IMU samples per block interval depending on whether the IMU clock is slightly slower or faster than the GNSS clock. To account for this, the data interleaver 1130 may be configured to always pack three IMU samples from the IMU sample shift register. By comparing the event tags, the processor 1140 can ignore the duplicate samples.

The sample interleaver and interleaving method are able to tag sensor samples at a relative precision of one GNSS sample interval. Latency may be introduced from the IMU interface 208 and pipeline delays. However, since both the GNSS and IMU interfaces exist in the same hardware, these latencies can be determined accurately and accounted for in the downstream processing. This is a significant advantage compared to certain prior art methods.

The serial correlators 204 of the exemplary systems 10, 1100 may also use a split sum correlator that permits the NCOs corresponding to all space vehicles ("SVs"; i.e., satellites) being tracked to be updated at the receiver epoch rather than waiting for the next SV epoch. All GNSS SV signals are synchronized to transmit their PRN codes at the same time epoch. However, since the satellites are moving with respect to the user's receiver, each SV's time epoch is skewed with respect to each other and skewed with respect to the receiver.

Figure 17:
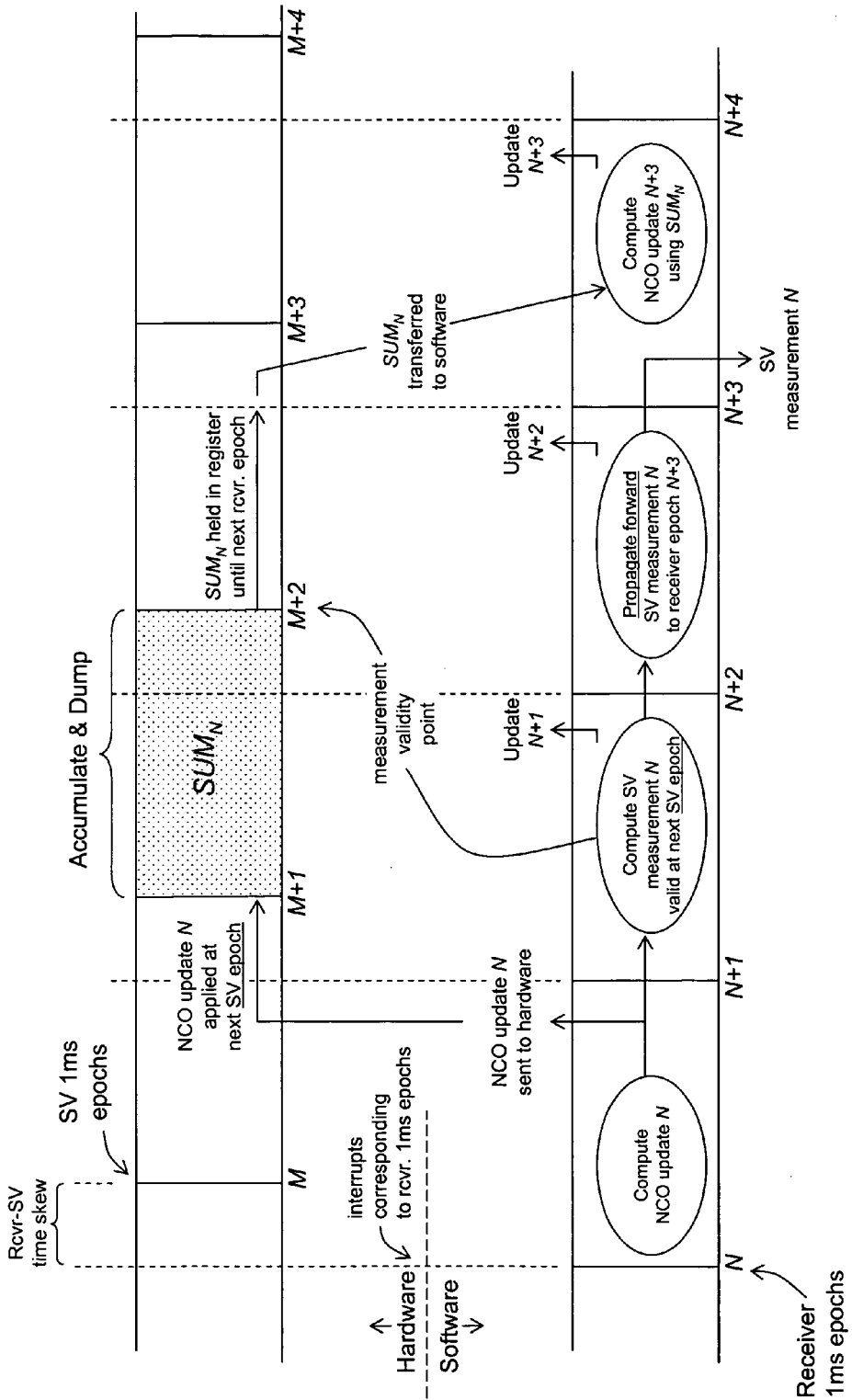
FIG. 17 shows schematically the interaction of hardware and software to affect numerically controlled oscillators (NCOs) in typical prior art systems.

Thus, the receiver must be able to handle this dynamically changing time-skew, and, while doing so must compute range measurements to all SVs at a common reference epoch (i.e. the receiver's time epoch). In many typical prior art systems NCO updates are applied to each receiver tracking channel at SV time epochs, as shown in FIG. 17. Similarly, accumulation is also performed between SV epochs in those systems. When a range measurement, based on the accumulated NCO updates is made, it is valid at the last SV epoch. Thus, the measurement must be converted (propagated forward) from SV time epoch to receiver time epoch, which may lead to measurement error.

Figure 18:
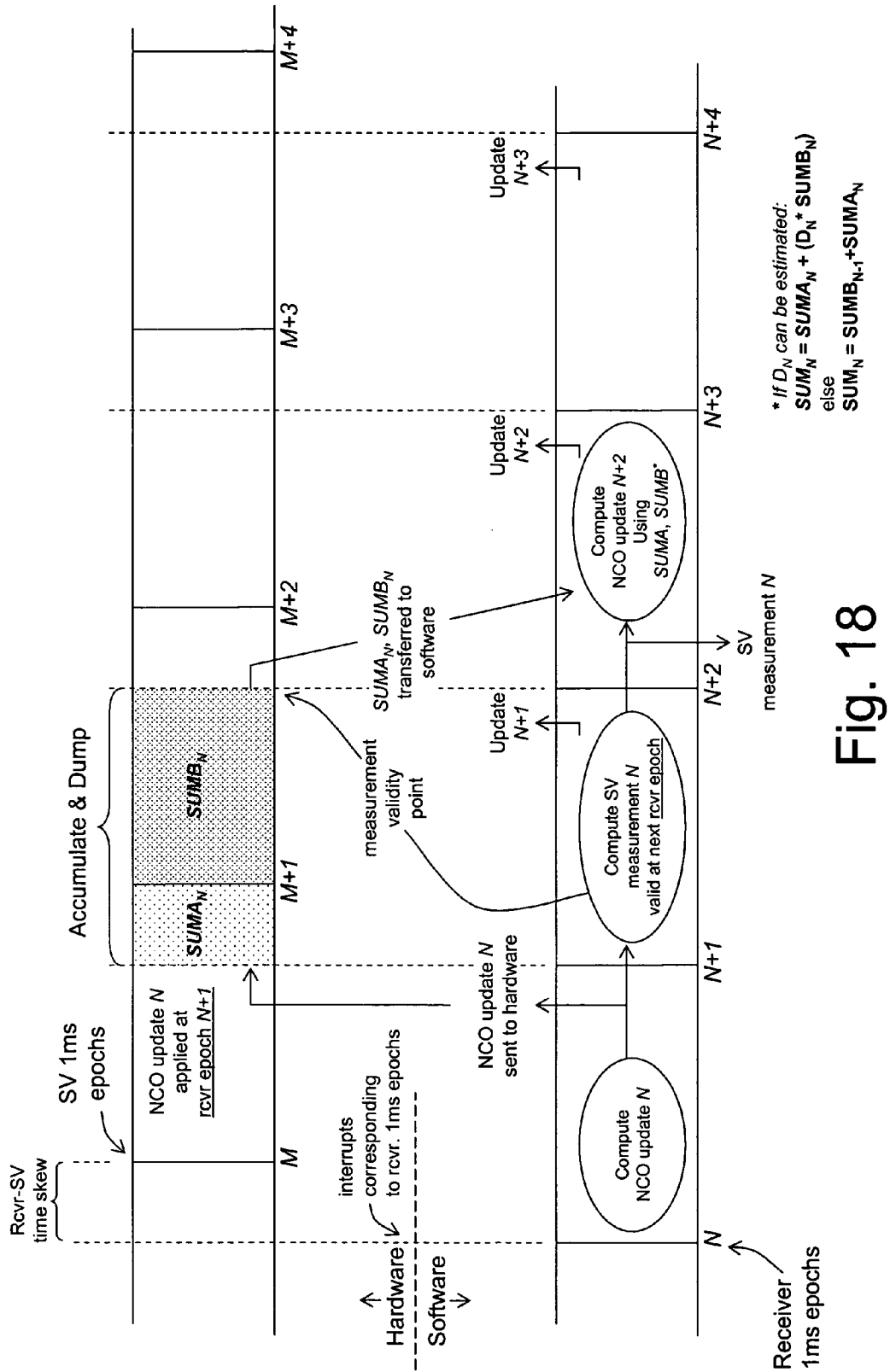
FIG. 18 shows schematically the interaction of hardware and software to affect numerically controlled oscillator (NCO) updates with an exemplary split-sum correlator.

FIG. 18 shows schematically the interaction between software 44, 1144 and hardware 28, 1128 with an exemplary split-sum correlator according to the present invention. For the split-sum correlator, the NCOs of all SVs being tracked are updated at the receiver epoch. Hence all SV measurements are inherently valid at the receiver epoch and no "propagation forward" step is needed. As shown in FIG. 18, each SV epoch is effectively divided into two intervals: an "A" interval between the beginning of each receiver epoch and the beginning of the following SV epoch and a "B" interval between the beginning of each SV epoch and the beginning of the following receiver epoch. As also shown in FIG. 18, each NCO update (determined at the end of each receiver epoch) is immediately applied to the next "A" interval, rather than waiting for the beginning of the next SV epoch as in FIG. 17. To avoid integrating over data bit boundaries, each accumulation is split into two components, SUM_A and SUM_B, both of which correspond to the same time interval between receiver epochs. Both components are sent to the baseband processing software (44 in FIG. 1) which calculates NCO updates. The baseband processor can use two techniques to combine the split-sums, depending on whether the databit sign is known or not, as shown in FIG. 18.

Figure 19C:
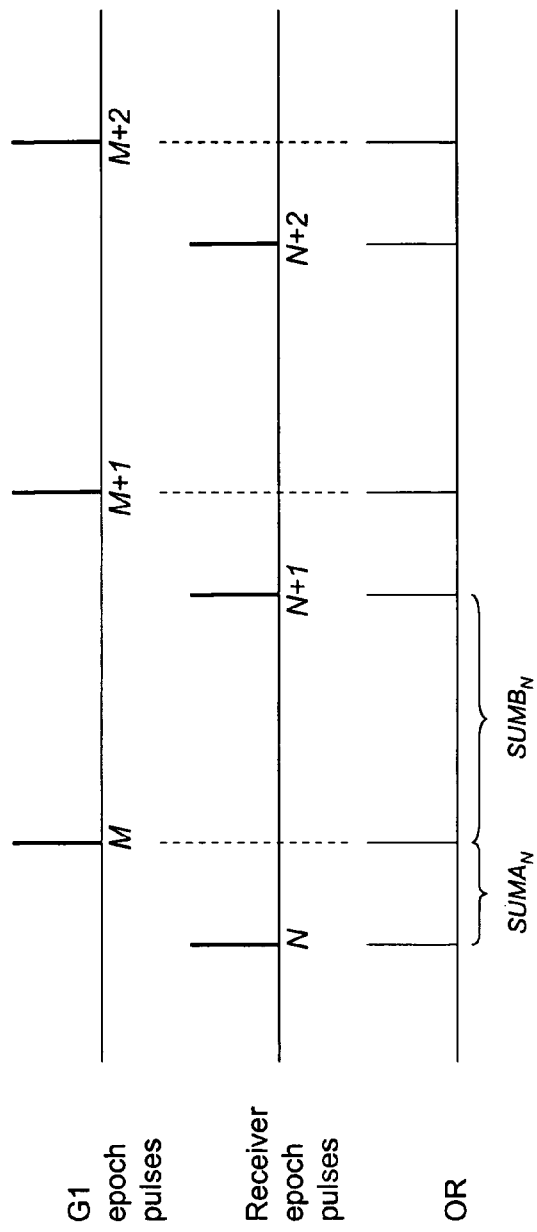
FIG. 19C is a timing diagram showing formation of accumulator dump cycles from the G1 epoch and the receiver epoch of the exemplary split-sum correlator of FIG. 19B.

A schematic block diagram of a prior art correlator 1900 is shown in FIG. 19A and an exemplary split-sum correlator 1950 according to an exemplary embodiment of the present invention is shown in FIG. 19B. The serial pipeline 204 may have dozens if not hundreds of such correlators 1950. The exemplary split-sum correlator 1950 accepts GPS IF samples 30, a carrier NCO update signal 1952, a code NCO update signal 1954, and a receiver epoch pulse signal 1958. The carrier NCO update signal 1952 controls a carrier NCO 1970 and the code NCO update signal 1954 controls a code NCO 1972, which controls a replica code generator 1974. The GPS IF samples are multiplied by the output of the carrier NCO 1970 and the output of the code generator 1974 and the result is accumulated with accumulator 1980. The code generator 1974 generates GI epoch pulses 1990 which are OR'ed with the receiver epoch pulses 1958 to generate an accumulator dump control signal 1992. These pulses and the relationship to SUM_A and SUM_B are shown in FIG. 19C. For a C/A code only receiver, a typical method to sense the SV epoch is to use the initial state (i.e. all 1's state) of the $G_1$ register of the C/A code generator 1974. This method allows the SV epoch to be sensed independent of the PRN code being generated by Code generator 1974. As shown in FIG. 19b, the NCOs 1970 and 1972 of the split-sum correlator 1950 are updated (using their load enable lines) at receiver epochs 1958. This is in contrast to prior art systems (refer to FIG. 19A), where the NCOs are updated at SV epochs 1990. The split-sum correlator does not add much complexity as compared to a standard correlator design; the split sum correlator 1950 only requires one extra register in terms of hardware and twice the Hardware to Software data bandwidth. Additionally, the availability of SumA and SumB from the split-sum correlator 1950 enables data-wipeoff to be performed easily in software (for long/deep integration). By contrast, in the prior art correlator 1900 of FIG. 19A, only the $G_1$ epoch pulses 1990 are used as a control signal to cause accumulator 1980 to output its sum (not a split sum) to software.

As mentioned above, the exemplary systems above may be used to implement an exemplary deeply integrated GPS/IMU system of the present invention capable of acquiring, re-acquiring, and tracking GPS signals with a very low carrier-to-noise ratio (CNR). The exemplary system provides continuous carrier phase tracking of such very low CNR GPS signals without requiring the knowledge of navigation data bits. Continuous carrier phase tracking is important for some applications because carrier phase tracking is required to complete a precision approach and landing operation. Flight data with a 90-degree turn were applied to demonstrate re-acquisition and continuous carrier phase tracking GPS signals at the 15 dB-Hz level. Real-time re-acquisition of low CNR GPS signals without external aiding was demonstrated using a GPS antenna located inside a steel/concrete building.

Conventional unaided GPS receivers typically integrate GPS signals from 10 to 20 ms. As a result, GPS signals cannot be acquired and tracked reliably if the CNR is below 32 dB-Hz. This limits the usage of conventional GPS receivers for a number of applications (e.g. indoor applications, precision agriculture applications near trees where the GPS signal is attenuated by the tree branches and foliage, or navigation in the presence of a wideband interference). The exemplary deeply integrated GPS/IMU system of the present invention employs inertial aiding of the GPS signal integration to significantly increase the GPS signal integration time interval (on the order of one second) as compared to conventional unaided receivers. As a result, GPS signals with CNR considerably below 32 dB-Hz can be acquired and tracked.

To permit continuous carrier phase tracking of such very low CNR GPS signals the exemplary deeply integrated GPS/IMU system of the present invention preferably uses an IMU and a system clock that are accurate to within about 1 cm/second for consistent carrier phase tracking of 15 dB-Hz GPS signals. Processing of GPS signals at the 15 dB-Hz level requires integrating the incoming GPS signal 30 over a time interval of approximately one second. Simply put, the inertial data 32 from the IMU 34 are used to make the antenna 20 appear to be stationary, even though the antenna 20 may be under high-velocity flight dynamics and substantial flight vibrations. Accordingly, dynamic reference trajectory provided by the IMU 34 to aid the GPS signal integration should be accurate at the cm-level over this period to maintain consistent tracking of the GPS signal carrier phase. Thus, the IMU 34 preferably has an accuracy of at least 1 cm/s under the conditions expected, e.g., in the aircraft environment an accuracy of at least 1 cm/s under high-velocity flight dynamics and substantial flight vibrations. An exemplary implementation of a deeply integrated GPS/IMM system of the present invention using the configurations of FIGS. 1-19 and having a low-cost coremicro® brand IMU 34 from AGNC is capable of processing GPS signals at the 15 dB-Hz level.

Similarly, the stability of the receiver internal clock 1108 needs to be maintained at the same level of about 1 cm/second, preferably without the use of costly atomic oscillators. For reliable carrier phase tracking of 15 dB-Hz GPS signals, a frequency offset of the receiver clock oscillator should not exceed a frequency equivalent of 1 cm/s, which is about 0.05 Hz. Accordingly, the exemplary implementation of a deeply integrated GPS/IMU system of the present invention uses a Wenzel Associates, Inc., 10 MHz SC Streamline Crystal Oscillator 1108 as the system internal clock.

Additionally, because the signal integration time of about 1 second exceeds the 20-ms duration of navigation data bits, navigation data bits must be wiped-off to avoid energy loss due to bit transitions that occur during the GPS signal integration. Knowledge of navigation data bits cannot reliably be used to perform the data wipe-off for continuous carrier phase tracking due to the presence of reserved bits (e.g. in page 25 of sub-frames 4 and 5) that are unknown. In principle, data corresponding to the reserved bits can be stored in advance (e.g. when normal-strength GPS signals are available). The use of stored bits is however unreliable: there is no guaranteed time interval within which data bits would remain unchanged. For high-accuracy, high-integrity, or high-continuity applications (e.g., aviation), unexpected loss of carrier phase lock is not acceptable.

Figure 20:
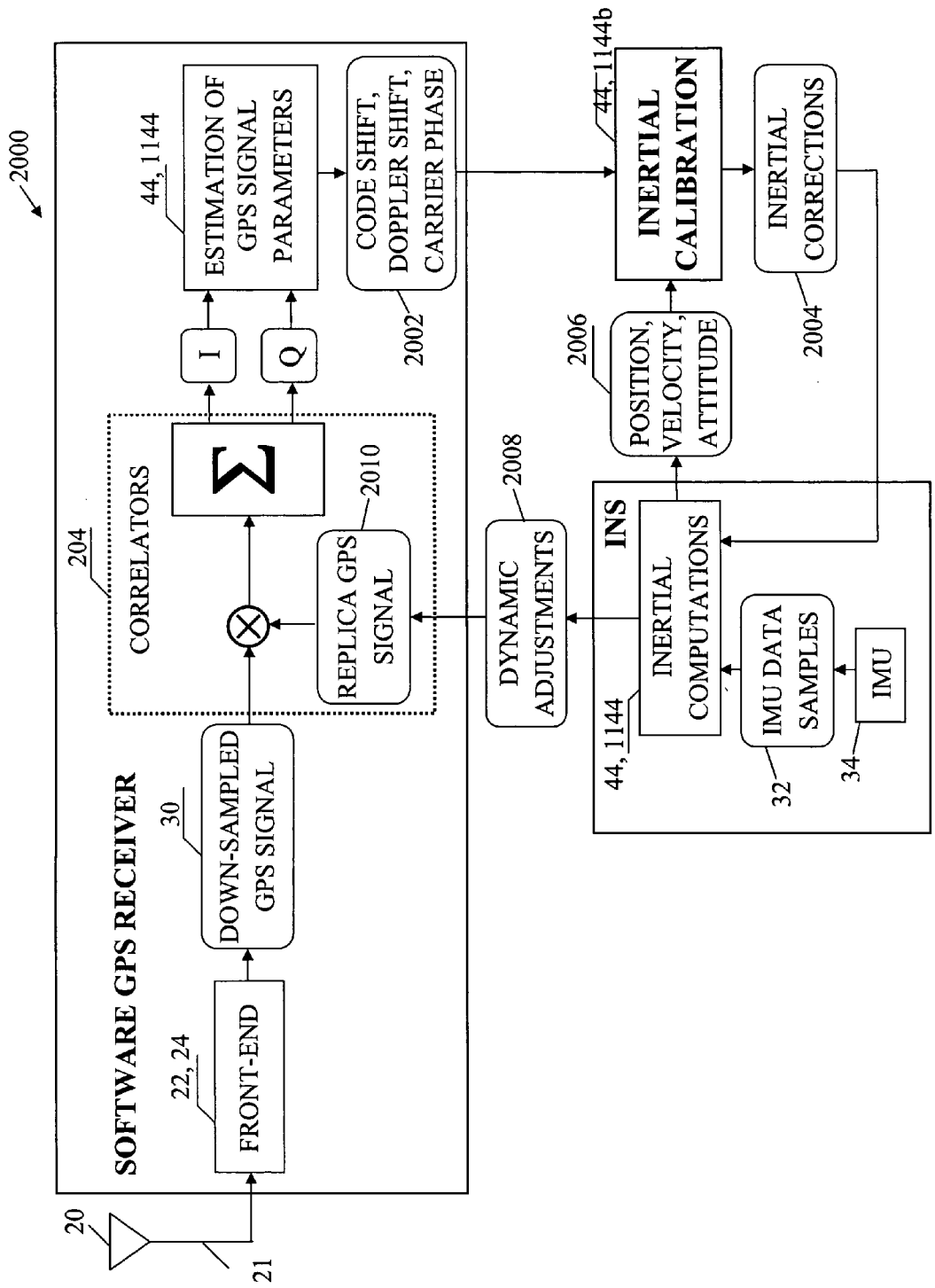
FIG. 20 is a high-level data flow diagram of an exemplary deeply integrated GPS/IMU system.

FIG. 20 is a high-level block diagram of the exemplary deeply integrated GPS/IMU system embodiment 2000 of the present invention, which utilizes the deep integration concept in order to significantly increase the GPS signal integration time. The deep integration approach used eliminates conventional tracking loops and starts combining GPS data and inertial data at the earliest processing stage possible by combining RF GPS samples with sampled inertial measurements. Inertial data provide the dynamic reference trajectory for the GPS signal integration inside GPS receiver correlators. Particularly, parameters of the internally generated replica GPS signal are adjusted for dynamic changes using the inertial aiding. Correlator outputs are used to estimate GPS signal parameters that include code shift, carrier Doppler frequency shift, and carrier phase. Block estimators are used herein for the signal parameter estimation instead of conventional GPS tracking loops. Estimated GPS signal parameters are applied to periodically calibrate the inertial system in order to maintain a sufficient accuracy of the inertial dynamic aiding of the GPS signal integration.

As discussed above, a software radio approach is employed to sample incoming GPS signals. The Akos software GPS receiver front-end discussed above is used as the front end 22, 24 in this exemplary embodiment. As discussed above, the receiver front-end provides a digital version of the incoming GPS signal 21 downconverted to a digital IF of 1.27 MHz and sampled at 5 MSPS. Other RF front ends 22 and ADCs 24 may be used. FIG. 20 also shows the interaction between various software modules 44, 1144 and the IMU 34 and the serial correlators 204, as discussed below. Additionally, FIG. 20 shows various data (rounded boxes) being passed between the various hardware and software components. More specifically, the front end 22, 24 provides down-sampled (or digitally downconverted) GPS data to the correlators 204, which provide inphase and quadrature correlation outputs to the processor 40, 1140 for the estimation of GPS signal parameters 2002, e.g., code shift, Doppler shift, and carrier phase via block processing software 1144a. These estimated GPS signal parameters 2002 are used by an inertial calibration routine 1144b (a Kalman filter in this implementation), which generates inertial correction data 2004 used by an inertial computation routine 1144b. The IMU 34 provides IMU data 32 to the inertial computation routine 1144b, which generates inertial parameters 2006, e.g., position, velocity, and attitude, for the inertial calibration routine. The inertial computation routine 1144b also generates dynamic adjustments 2008, which are used to adjust replica GPS signals 2010 in the correlators 204.

In the system of FIG. 20, the deep integration approach starts the fusion of GPS and inertial data at the earliest processing stage possible by combining RF GPS samples with sampled inertial measurements. GPS signals are received by the antenna 20 and amplified in the front-end 22, 24. Next, the signals are sampled directly or are sampled after a single analog down-conversion. The sampled GPS signals are then processed for each of the satellites. Replica signals are generated for each of the satellites. These replica signals are adjusted for dynamic changes of the vehicle using inertial navigation system (INS) data. After adjustment for the dynamic changes, the GPS signal processor operates on the data as if it were obtained from a stationary vehicle. Complex correlators that process In-Phase (I) and Quadrature-Phase (Q) signals are used to estimate GPS signal parameters that include C/A code shift, carrier Doppler frequency shift, and carrier phase. Block estimators (e.g., Feng, G., Block Processing Techniques for the Global Positioning System, Ph.D. Dissertation, Ohio University, November 2003) are used for the signal parameter estimation instead of conventional GPS tracking loops. The INS data are obtained from the IMU, which typically contains a minimum of three accelerometers and gyroscopes. IMU data samples are converted to the GPS measurement domain to create the dynamic adjustments. Estimated GPS signal parameters are applied to periodically calibrate the INS to maintain a sufficient accuracy of the inertial dynamic aiding of the GPS signal integration.

The exemplary deeply integrated GPS/IMU system embodiment 2000 of the present invention described herein offers several advantages over existing methods, any one or more of which may be taken advantage of by the teachings herein, including: 1) continuous C/A code and carrier phase tracking which preserves full navigation capability including cm-level surveying processing and carrier-smoothed C/A code processing; 2) low-grade inertial measurement unit (IMU) aiding for dynamic applications including aircraft, which results in a significant cost reduction compared to systems that rely on tactical or navigation grade inertial aiding; 3) no need to co-locate the IMU 34 with the GPS antenna 20 (e.g. the IMU could be co-located with the GPS receiver processing function 28); 4) frequency-domain processing as opposed to massive parallel hardware correlators, which reduces the number of mathematical operations; 5) no aiding from external signals; 6) signal tracking without knowledge of the GPS navigation data bits, which enables continuous tracking during periods of time where unknown navigation data bits are broadcast by the satellites.

Low CNR Signal Reacquisition and Acquisition

As mentioned above, the exemplary deeply integrated GPS/IMU system 2000 can acquire, re-acquire, and track very weak GPS signals, e.g., 15 dB-Hz GPS signals. The acquisition methodology is perhaps best understood by first presenting a reacquisition methodology, which assumes the availability of relatively strong GPS signals (e.g., typical 32 dB-Hz GPS signals) for the initialization phase, during which phase the GPS receiver has acquired the GPS signals, initialized the receiver clock, estimated the receiver clock frequency offset (or clock drift), computed satellite ephemeris, and the inertial measurement unit (IUU) has been aligned. Following the initialization phase, the GPS signal carrier-to-noise ratio (CNR) is reduced to the 15 dB-Hz level. This low CNR GPS signal is reacquired by the exemplary deeply integrated GPS/IMU system 2000 using techniques disclosed herein.

The reacquisition procedure assumes that the GPS time is known within 2 ms and the receiver position is known within 2 km and the Doppler shift sub-search space is [−2 Hz, 2 Hz]. In short, a sequential frequency sub-search is applied and a full CA-code search is implemented. The CA-code may be searched in parallel in the frequency-domain using any of various techniques, e.g., the approach described in van Nee D.

J. R., and Coenen, A. J. R. M., "New Fast GPS Code-Acquisition Technique Using FFT," Electronic Letters, Vol. 27, No. 2, January 1991, which is hereby incorporated by reference. The signal integration for the low CNR GPS signal reacquisition is aided by the dynamic reference trajectory 2006 which is computed using IMU measurements and satellite ephemeris data.

Figure 21:
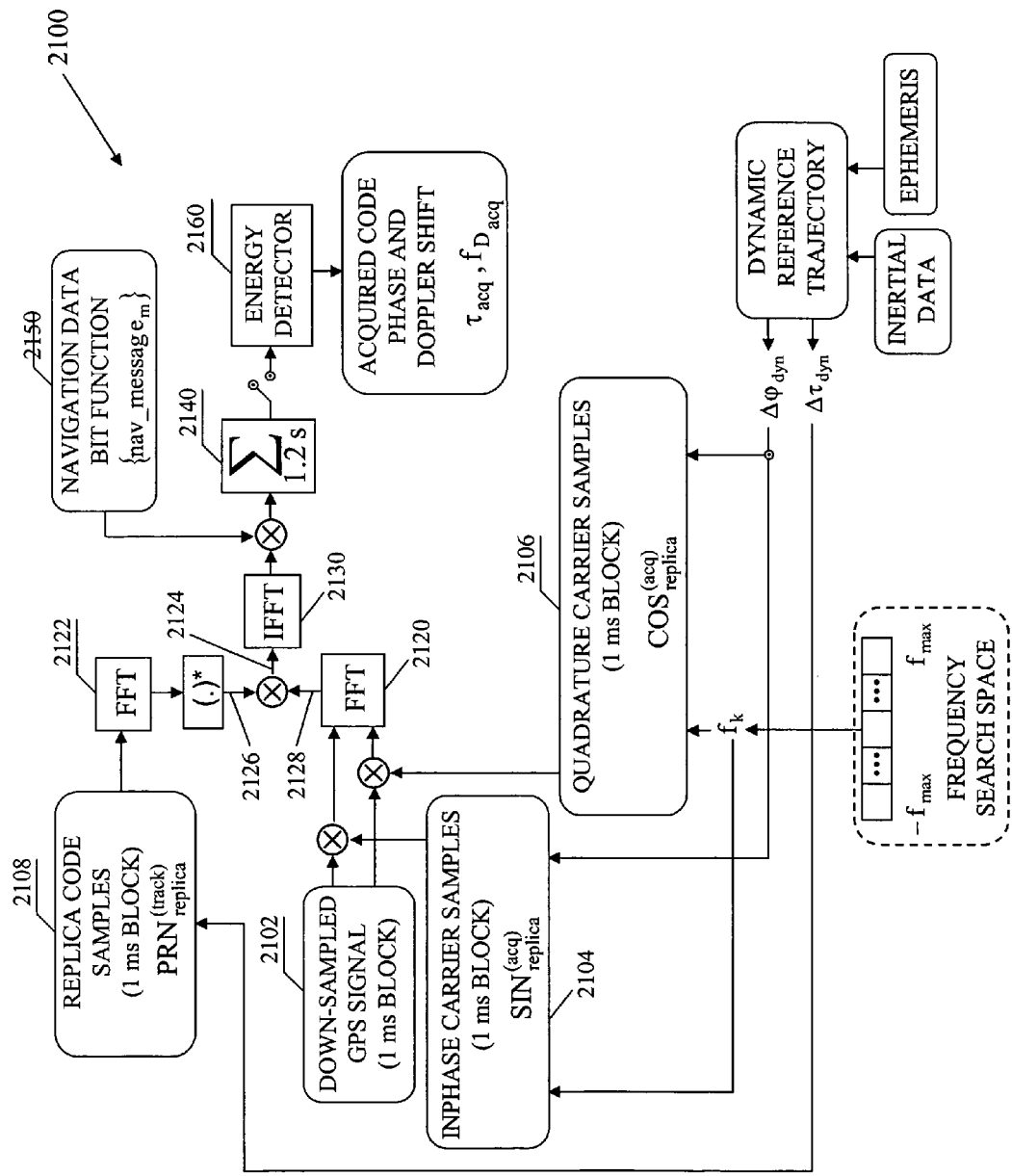
FIG. 21 is a high level data flow diagram showing exemplary low CNR signal re-acquisition and acquisition methodologies.

FIG. 21 illustrates the low CNR signal reacquisition method 2100 used in the exemplary deeply integrated GPS/IMU system 2000. The reacquisition routine operates with 1-ms blocks 2102 of the down-converted GPS signal. 1 ms blocks of in-phase signals 2104 and 1 ms blocks of quadrature signals 2106 are formed by multiplying a 1-ms block of the downsampled incoming GPS signal by corresponding 1-ms blocks of in-phase (SIN) and quadrature (COS) replica carrier samples that are computed as follows:

$$SIN_{replica}^{(acq)}(t_n) = \sin(2\pi \cdot (f_{IF} + f_k) \cdot t_n + \Delta\phi_{dyn}(t_n))$$

$$COS_{replica}^{(acq)}(t_n) = \cos(2\pi \cdot (f_{IF} + f_k) \cdot t_n + \Delta\phi_{dyn}(t_n)) \quad (1)$$

where
- $t_n = t_{acq_0} + n \cdot \Delta t$; $t_{acq_0}$ is the reacquisition start time, which corresponds to the beginning of the signal integration for the reacquisition; $f_k$ is the Doppler shift from the frequency search space; and $\Delta t$ is the time interval between GPS signal samples.
- $\Delta\phi_{dyn}$ is the carrier dynamic term derived from the dynamic reference trajectory as defined by Equation (2):

$$\Delta\varphi_{dyn}(t_n) = -2\pi \cdot \frac{\Delta R_{LOS}(t_n)}{\lambda_{L_1}} \quad (2)$$

where
- $\lambda_{L_1}$ is the wavelength of the GPS $L_1$ carrier.
- $\Delta R_{LOS}(t_n)$ is the change in the satellite/receiver range (or the Line-Of-Sight (LOS) increment) over the time interval $[t_{acq_0}, t_n]$. The range change is computed from the dynamic reference trajectory, which is comprised of the satellite motion ($\Delta R_{SV}(t_n)$) and receiver motion ($\Delta R_{rcvr}(t_n)$):

$$\Delta R_{LOS}(t_n) = \Delta R_{SV}(t_n) + \Delta R_{rcvr}(t_n) \quad (3)$$

Equation (4) is applied to compute $\Delta R_{SV}(t_n)$:

$$\Delta R_{SV}(t_n) = (e(t_n), r_{SV}(t_n)) - (e(t_{acq_0}), r_{SV}(t_{acq_0})) - \quad (4)$$
$$(r_{rcvr_0} + \Delta r_{rcvr_{INS}-acq_0}, e(t_n) - e(t_{acq_0}))$$

$$e(t_{acq_0}) = \frac{r_{SV}(t_{acq_0}) - r_{rcvr_0} - \Delta r_{rcvr_{INS}-acq_0}}{|r_{SV}(t_{acq_0}) - r_{rcvr_0} - \Delta r_{rcvr_{INS}-acq_0}|},$$

$$e(t_n) = \frac{r_{SV}(t_n) - r_{rcvr_0} - \Delta r_{rcvr_{INS}-acq_0} - \Delta r_{rcvr_{INS}}(t_n)}{|r_{SV}(t_n) - r_{rcvr_0} - \Delta r_{rcvr_{INS}-acq_0} - \Delta r_{INS}(t_n)|}$$

where
- $(.,.)$ is the vector dot product;
- $|.|$ is the vector absolute value;
- $r_{SV}$ is the position vector for the satellite being acquired, $r_{SV}$ is computed from GPS ephemeris using a computational algorithm given in Kaplan, E. D., Editor, "Understanding GPS—Principles and Applications," Artech House Publishers, Boston, 1996;
- $r_{rcvr_0}$ is the receiver position vector at time $t_0$ (initial position vector); and $t_0$ is the initial time of low CNR signal processing, where $t_0 \leq t_{acq_0}$;
- $\Delta r_{rcvr_{INS}\cdot acq_0}$ is the receiver velocity vector integrated over the interval $[t_0, t_{acq_0}]$ using IMU measurements and standard inertial computations, e.g., those shown in Titterton, D. H., and J. L. Weston, "Strapdown Inertial Navigation Technology," IEE Radar, Sonar, Navigation and Avionics Series 5, Peter Peregrinus Ltd., London, 1997; Note that if the receiver is stationary (e.g., dynamic motion of less than 2 cm/s) then $\Delta r_{rcvr_{INS}\cdot acq_0} = 0$ can be used an the usage of IMU measurements is not required.
- $\Delta r_{rcvr_{INS}}(t_n)$ is the receiver velocity vector integrated over the interval $[t_{acq_0}, t_n]$ using IM measurements and standard inertial computations. Note that $\Delta r_{rcvr_{INS}} = 0$ can be used for the stationary receiver case making the usage of IMU measurements unnecessary.

Equation (5) is applied to compute $\Delta R_{rcvr}(t_n)$:

$$\Delta R_{rcvr}(t_n) = -(e(t_n), \Delta r_{rcvr_{INS}}(t_n)) + (C_b^N(t_n) - C_b^N(t_{acq_0})) \cdot L_b \quad (5)$$

where
- $C_b^N$ is the INS direction cosine matrix computed using IMU measurements and standard inertial computations;
- $L_b$ is the lever arm vector pointed from the IMU to the GPS antenna with the vector components given at the IMU-defined body frame.

Replica code samples 2108 are computed using Equation (6):

$$PRN_{replica}^{(acq)}(t_n) = PRN(t_n - \Delta\tau_{dyn}(t_n)) \quad (6)$$

where
- PRN is the CA-code pseudo-random noise for the satellite being acquired;
- $\Delta\tau_{dyn}$ is the code dynamic term derived from the dynamic reference trajectory as defined by Equation (7):

$$\Delta\tau_{dyn}(t_n) = \frac{\Delta R_{LOS}(t_n)}{c} \quad (7)$$

where
- c is the speed of light;
- $\Delta R_{LOS}(t_n)$ is computed using equations (3) through (5).

At 2120 a Fast Fourier Transform (FFT) is applied to 1 ms blocks of the in-phase signals 2104 and quadrature signals 2106 with wiped-off navigation data bits (constructed as described above). Similarly, at 2122 an FFT is applied to 1 ms blocks of replica code that are constructed as described above. Following the FFTs 2120, 2122, the frequency-domain equivalent of the code correlation function 2124 is calculated by multiplying the complex conjugate of the replica code FFT spectrum 2126 by the FFT spectrum of the incoming signal with a wiped-off carrier 2128. The Inverse FFT (IFFT) 2130 applied to the results of the spectrum multiplication 2124 provides a time-domain code correlation function 2132 that corresponds to the carrier frequency Doppler shift $f_k$. This exemplary routine uses the block processing engine 202 to some extent, e.g., the FFTs (2122 and 2120), the IFFT (2130), the complex conjugate (.)*, and the correlators ⊗, (except the one that does the data bit wipe-off using the navigation data bit function) are implemented in the FPGA implementing the block processing engine 202.

The code correlation function 2132 is calculated using the FFT-based approach above for each Doppler shift from the frequency search space $[-f_{max}, f_{max}]$. As a result, the signal energy is computed as a function of code shift and Doppler shift over a 1-ms block of GPS data samples.

1-ms energy functions are accumulated at 2140 over the reacquisition integration interval to improve the relative signal-to-noise energy ratio. A 1.2 second reacquisition integration interval is chosen for the case where GPS signals are processed at a 15 dB-Hz level. Higher CNR signals may have a shorter integration time. During the energy accumulation process 2140, replica code phase and replica carrier phase are adjusted for the relative satellite/receiver motion dynamics using the dynamic reference trajectory as formulated by equation (2) through (5) and equation (7).

Navigation data bit transitions must be accommodated during the energy accumulation process 2140 since the reacquisition integration interval exceeds the bit duration (20 ms). A wipe-off of partially known navigation data bits is performed for the signal reacquisition stage. The reacquisition start time ($t_{acq_0}$) is defined such that the reacquisition integration starts at the beginning of a subframe. The signal is integrated over the partially known data bits in the telemetry word (TLM) and the hand-over word (HOW). A navigation data bit function $\{nav\_message_m\}$, $m=\{1, \ldots, 1200\}$ is applied to partially wipe-off navigation data bits at 2150: each 1-ms energy function is multiplied by a corresponding value of the navigation data bit function. The reacquisition start time and navigation data bit function are defined as functions of the initial time of low CNR signal processing ($t_0$) and the receiver initial position ($r_{0_{rcvr}}$). These functions ($t_{acq_0}(t_0, r_{0_{rcvr}})$ and $\{nav\_message_m(t_0, r_{0_{rcvr}})\}$, correspondingly) are computed using a MATALB routine acq_databits.m, which is disclosed below:

```
acq_databits.m
function [tacq0, nav_message] = acq_databits(t0, r0_rcvr_ECEF, r0_rcvr_LLH);
%INPUTS:
%   t0 is the initial time of low CNR signal processing;
%   r0_rcvr_ECEF is receiver initial position at ECEF;
%   r0_rcvr_LLH = [latitude; longitude; height] of the receiver initial position.
%
%OUTPUS:
%   tacq0 is the acquisition start time;
%   nav_message is the navigation data bit function.
    time_subframe_start=6*floor(t0/6)+6;
    for n=1:7000
    t_c=t0 +(n-1)*1e-3;
    dTOT(1,n)=0;
    [ECEF_SV, s_dt]=getephsatpos(t_c, SVID, ephdat);
        % getephsatpos computes satellite position at the Earth Centered Earth Fixed (WGS84)
        coordinate frame at given time (t_c) for given satellite ID (SVID) and ephemeris data using
        standard computations in Kaplan, E.D., Editor, "Understanding GPS - Principles and
        Applications," Artech House Publishers, Boston, 1996;
    ENU_SV=ec2enu(ECEF_SV,r0_rcvr_ECEF, r0_rcvr_LLH);
    TOT_est=t_c-(1/c)*norm(ENU_SV);
    [ECEF_SV, s_dt]= getephsatpos (TOT_est,SVID,ephdat);
    ENU_SV=ec2enu(ECEF_SV', r0_rcvr_ECEF, r0_rcvr_LLH);
    TOT_est = t_c-(1/c)*norm(ENU_SV);
    TOT_est_m(1,n) = TOT_est;
    dTOT(1,n) = abs(TOT_est -time_subframe_start);
    end
    [dTOT_min, ind_subframe_start]=min(dTOT);
    trans_b= ind_subframe_start;
    tacq0= t0 + (trans_b-1)*1e-3;
    preamble_bin=[1 0 0 0 1 0 1 1];
    preamble_nav=bin2navdata(preamble_bin);
    TOW_count=(1/6)*(round(TOT_est_m(1,ind_subframe_start))+6;
    TOW_count_bin=dec2bin(TOW_count,17);
    TOW_count_nav=bin2navdata(TOW_count_bin);
    subframe_ID=mod(TOW_count,5)
    if subframe_ID==0
    subframe_ID=5
    end
    subframe_ID_bin=dec2bin(subframe_ID,3);
    subframe_ID_nav=bin2navdata(subframe_ID_bin);
    end_HOW_bin=[0 0];
    end_HOW_nav=bin2navdata(end_HOW_bin);
    nav_bits=zeros(1,60);
    nav_bits (1,1:8)=preamble_nav;
    nav_bits (1,31:47)=TOW_count_nav;
    nav_bits (1,50:52)=subframe_ID_nav;
    nav_bits (1,59:60)=end_HOW_nav;
    for k=1:60
            nav_message(1+(k-1)*20:k*20)=nav_bits(1,k); %
    end
Subroutines
ec2enu.m
function [enu] = ec2enu(ece,orgece,orgllh)
difece = ece - orgece;
sla = sin(orgllh(1,1)); cla = cos(orgllh(1,1));
slo = sin(orgllh(2,1)); clo = cos(orgllh(2,1));
enu = [ -slo    clo    0 ; ...
        -sla*clo -sla*slo cla; ...
         cla*clo  cla*slo sla] * difece;
bin2navdata.m
function[x_nav]=bin2navdata(x_bin);
N=length(x_bin);
```

```
for n=1:N
    if x_bin(n)==1
        x_nav(n)=1;
    else
        x_nav(n)=-1;
    end
end
dec2bin.m
function[x_b]=dec2bin(x_d,N_of_bits);
for n=1:N_of_bits
    x_b(1,n)=floor(rem(x_d,2));
    x_d=x_d-round(x_d/2);
end
x_b=round(fliplr(x_b));
```

Finally, at 2160 an energy detector applied to the accumulated energy function determines the code shift ($\tau_{acq}$) and carrier Doppler frequency shift ($f_{D_{acq}}$) that corresponds to the maximum accumulated signal energy. $\tau_{acq}$ and $f_{D_{acq}}$ serve as the reacquired code shift and Doppler frequency shift.

The exemplary deeply integrated GPS/IMU system embodiment 2000 may also acquire very low CNR GPS signals. The reacquisition procedure described above may be modified into an acquisition procedure, which does not require the usage of the initialization phase, by modifying the search space. Methods for the signal accumulation, navigation data bit wipe-off, and code and frequency search are applied as disclosed in the reacquisition section above. The search space may be modified to account for any one or more of the following factors: (1) receiver initial velocity uncertainty; (2) initial time uncertainty; (3) initial position uncertainty; (4) receiver clock frequency offset; (5) usage of almanac instead of ephemeris to compute satellite positions; and (6) inertial acceleration uncertainty. The table below summarizes modifications of the search space that are performed to accommodate the above factors and acquire a very low CNR GPS signals:

| Factor | Modification of the search space* |
|---|---|
| 1) Receiver initial velocity uncertainty ($|\delta V_0|$) | |
| <0.1903 m/s | No impact. |
| ≥0.1903 m/s | Frequency search space is increased by $\pm \left[ \frac{|\delta V_0|}{\lambda_{L_1}} \right]$ Hz**. |
| 2) Initial time uncertainty ($\delta t_0$) | |
| <5 ms | No impact. |
| ≥5 ms | Additional search dimension is used. The maximum accumulated energy is searched through the following time shifts: $\{\delta t_{k_1} = k_1 \cdot 5 \text{ ms}\}$, $k_1 = (-N_{max_1}, \ldots, -1, 0, 1, \ldots, N_{max_1})$, $N_{max_1} = \left[ \frac{\delta t}{5 \text{ ms}} \right]$. For each time shift, the acquisition start time ($t_{acq_0}(t_0 - \delta t_{k_1}, r_{0_{rcvr}})$) and navigation data function ($\{\text{nav\_message}_m(t_0 - \delta t_{k_1}, r_{0_{rcvr}})\}$) are computed using the MATLAB function acq_databits.m disclosed above. The accumulated energy function is computed for ($t_{acq_0}(t_0 - \delta t_{k_1}, r_{0_{rcvr}})$ and $\{\text{nav\_message}_m(t_0 - \delta t_{k_1}, r_{0_{rcvr}})\}$) using the approach disclosed in the reacquisition section above. A set of accumulated energy functions is thus computed: a corresponding accumulated energy function is computed for each time shift from the time shift search space. $\tau_{acq}$ and $f_{D_{acq}}$ that correspond to the maximum energy of the set of 1.2-s accumulated energy functions are used as acquisition results. |
| ≥0.3 s | Search through time shifts as described above and increase in the frequency search space by $\pm \left[ \frac{\delta t}{0.3 \text{ s}} \right]$ Hz. |
| 3) Receiver initial position uncertainty ($|\delta r_{0_{rcvr}}|$) | |
| <2 km | No impact. |
| ≥2 km | Frequency search space is increased by $\pm \left[ \frac{\delta |r_{0_{rcvr}}|}{2 \text{ km}} \right]$ Hz. |
| ≥1500 km | Frequency search space is increased by $\pm \left[ \frac{\delta |r_{0_{rcvr}}|}{2 \text{ km}} \right]$ Hz and additional search dimension is used. Particularly, the maximum accumulated energy is searched through the following position shifts: $\left\{ \delta r_{k_2} = k_2 \cdot 1500 \text{ km} \cdot \frac{(r_{SV}(t_0) - r_{rcvr_0})}{|r_{SV}(t_0) - r_{rcvr_0}|} \right\}$, $k_2 = (-N_{max_2}, \ldots, -1, 0, 1, \ldots, N_{max_2})$, $N_{max_2} = \left[ \frac{\delta |r_{0_{rcvr}}|}{1500 \text{ km}} \right]$. For each position shift, the acquisition start time ($t_{acq_0}(t_0, r_{0_{rcvr}} - \delta r_{k_2})$) and navigation data function ($\{\text{nav\_message}_m(t_0, r_{0_{rcvr}} - \delta r_{k_2})\}$) are computed using the MATLAB function acq_databits.m disclosed above. The accumulated energy function is computed for ($t_{acq_0}(t_0, r_{0_{rcvr}} - \delta r_{k_2})$ and $\{\text{nav\_message}_m(t_0, r_{0_{rcvr}} - \delta r_{k_2})\}$) using the approach disclosed in the reacquisition section above. A set of accumulated energy functions is thus computed: a corresponding accumulated |

| Factor | Modification of the search space* |
|---|---|
| | energy function is computed for each position shift from the position shift search space. $\tau_{acq}$ and $f_{D_{acq}}$ that correspond to the maximum energy of the set of accumulated energy functions are used as acquisition results.<br>Note: for the case where $\delta t \geq 5$ ms and $|\delta r_{0_{rcvr}}| \geq 1500$ km, accumulated energy function is computed for each possible combination of $(k_1, k_2)$ using corresponding time and position shifts:<br>$\left(\{\delta t_{k_1}, \delta r_{k_2} = k_2 \cdot 1500 \text{ km} \cdot \frac{(r_{SV}(t_0 - \delta t_{k_1}) - r_{rcvr_0})}{|r_{SV}(t_0 - \delta t_{k_1}) - r_{rcvr_0}|}\}\right)$, |
| 4) Receiver clock frequency offset ($\delta f_{rcvr}$) | |
| <1 Hz | No impact. |
| ≥1 Hz | Frequency search space is increased by $\pm \left[\frac{\delta f_{rcvr}}{1 \text{ Hz}}\right]$ Hz. |
| 5) Usage of almanac instead of ephemeris to compute satellite positions | Frequency search space is increased by ±1 Hz. |
| 6) Inertial acceleration uncertainty | Additional search dimension is used. Particularly, the maximum accumulated energy is searched through the following acceleration shifts:<br>$\pm \frac{\lambda_{L_1}}{2 \cdot t_{acm}^2} \cdot k_3$,<br>$k_3 = (-N_{max_3}, \ldots, -1, 0, 1, \ldots, N_{max_3})$,<br>$N_{max_3} = \left[\frac{2|\Delta a_N| \cdot t_{acm}^2}{\lambda_{L_1}}\right]$,<br>where $\Delta a_N$ is the navigation frame acceleration uncertainty and $t_{acm}$ is the accumulation time interval. |

*The search space is modified such that the energy loss for the worst-case scenario is 3 dB.
**The function [a] indicates the whole part of a.

Low CNR Signal Tracking

Figure 22:
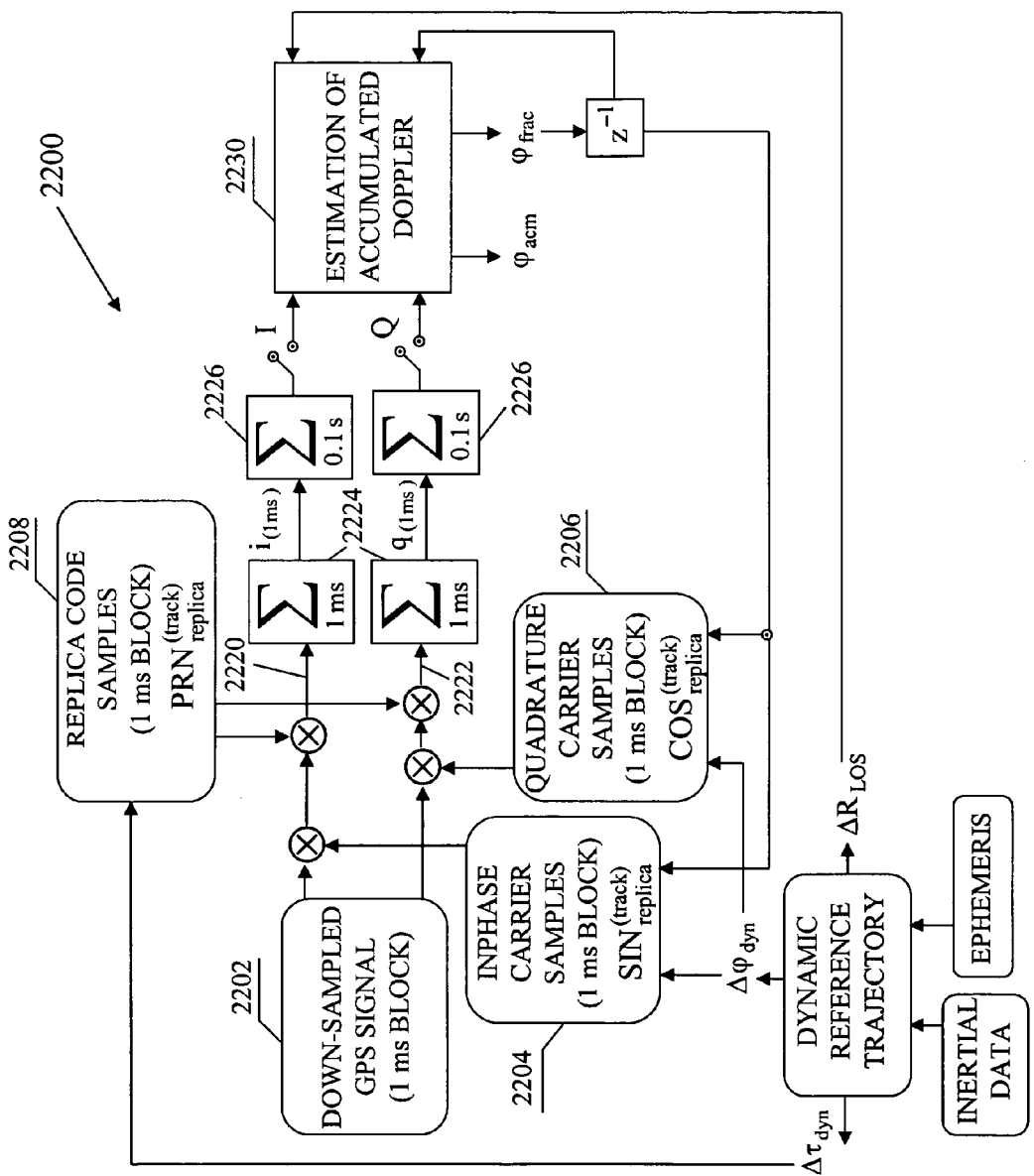
FIG. 22 is a high level data flow diagram showing an exemplary carrier phase tracking methodology.

The tracking stage of the exemplary deeply integrated GPS/IMU system embodiment 2000 for low CNR GPS signals focuses on carrier phase tracking, which can be more demanding than code phase tracking. FIG. 22 illustrates an exemplary methodology 2200 for low CNR signal carrier phase tracking.

Similar to the low CNR signal acquisition routine above, the tracking routine operates with 1-ms blocks 2202 of the down-converted GPS signal. Down-converted signal blocks are first multiplied by the in-phase replica carrier (SIN) 2204 and quadrature replica carrier (COS) 2206 that are defined by Equation (8).

$$SIN_{replica}^{(track)}(t_n) = \sin(2\pi \cdot (f_{IF} + f_{D_{acq}}) \cdot t_n + \varphi_{frac}(t_{m-1}) + \Delta\varphi_{dyn}(t_n)) \quad (8)$$
$$COS_{replica}^{(track)}(t_n) = \cos(2\pi \cdot (f_{IF} + f_{D_{acq}}) \cdot t_n + \varphi_{frac}(t_{m-1}) + \Delta\varphi_{dyn}(t_n))$$

where $t_{m-1} = t_0 + (m-1) \cdot \Delta t_{track}$; and $\Delta t_{track}$ is the tracking integration interval;

$\phi_{frac}(t_{m-1})$ is the fractional carrier phase estimated at the previous measurement epoch;

$\Delta\phi_{dyn}$ is the carrier dynamic term derived from the dynamic reference trajectory using Equation (2).

The code component is then stripped of the incoming signal using the replica code 2208 defined below:

$$PRN_{replica}^{(track)}(t_n) = PRN(t_n - \tau_{acq} - \Delta\tau_{dyn}(t_n)) \quad (9)$$

where

PRN is the CA-code pseudo-random noise for the satellite being tracked;

$\Delta\tau_{dyn}$ is the code dynamic term derived from the dynamic reference trajectory using Equation (4).

For those cases where the receiver is stationary (e.g., receiver motion dynamic is less than 2 cm/s), a zero receiver motion compensation term can be used in Equation (4). As a result, the usage of IMU measurements is not required.

The incoming GPS signal subsequently multiplied by the in-phase replica carrier and replica code is generally referred to as the in-phase signal 2220. The incoming GPS signal subsequently multiplied by the quadrature replica carrier and replica code is generally referred to as the quadrature signal 2222. The in-phase signal 2220 and quadrature signal 2222 are integrated at 2224 over the block duration thus obtaining i and q for the current 1-ms data block. 1-ms i's and q's are then accumulated at 2226 over the tracking integration interval. Code and carrier dynamic terms ($\Delta\tau_{dyn}$ and $\Delta\phi_{dyn}$) enable adjustments of the replica signal parameters for the motion dynamic present during the i and q accumulation processes. Finally, the inphase and quadrature signals accumulated over the tracking integration interval (I and Q) are applied to estimate the accumulated Doppler at 2230.

The accumulated Doppler at the current measurement epoch ($\phi_{acm}(t_m)$) is estimated as follows. A temporary carrier phase value ($\phi_{temp}(t_m)$) is first computed:

$$\delta\varphi(t_m) = \arctan\left(\frac{Q(t_m)}{I(t_m)}\right) \quad (10)$$

$$\varphi_{temp}(t_m) = \varphi_{frac}(t_m) + \delta\varphi(t_m) + 2\pi \cdot \left(f_{D_{acq}} \cdot \Delta t_{track} - \frac{\Delta R_{LOS}(t_m) - \Delta R_{LOS}(t_{m-1})}{\lambda_{L_1}}\right)$$

where $\Delta R_{LOS}(t_m) - \Delta R_{LOS}(t_{m-1})$ is the change in the satellite/receiver range between successive measurement epochs. The range change is derived from the dynamic reference trajectory, as specified by the equations (3) through (5) above.

Next, the fractional carrier phase estimate ($\phi_{frac}(t_m)$) and the integer number of accumulated carrier cycles ($N_\phi(t_m)$) are updated:

$\phi_{frac}(t_m)$=fractional part of $\phi_{temp}(t_m)$ $N_{100}(t_m) = N_\phi(t_{m-1})$+whole part of $\phi_{temp}(t_m)$ (11)

Finally, the accumulated Doppler is computed:

$\phi_{acm}(t_m) = 2\pi \cdot N_\phi(t_m) + \phi_{frac}(t_m)$ (12)

Navigation data bit treatment for continuous tracking of low CNR GPS signals

The above approach used in the exemplary system 2000 for the continuous carrier tracking of low CNR GPS signals does not require the knowledge of navigation data. An energy-based bit estimation algorithm is applied to account for possible bit transitions during signal integration. The algorithm searches for the bit combination that maximizes the signal energy over the tracking integration interval. The search is performed in two steps: (1) exhaustive search through possible bit combinations over 0.1-s intervals, without resolving combination sign polarity and (2) energy-based sign polarity resolution.

The exhaustive search through possible bit combinations over a 0.1-s interval in this exemplary routine is based on the following successive steps:

1) In-phase and quadrature signals (i and q, correspondingly) are accumulated over 20-ms time intervals with no bit transition. For a 0.1-s interval, there are 5 20-ms accumulated is and 5 20-ms accumulated qs.

2) 20-ms accumulated is and qs are used to compute signal energy for all possible bit combinations for a 0.1-s interval. The energy computation is, however, insensitive to the sign polarity of a bit combination, i.e. bit combinations with an opposite sign (e.g. [1 1 1 1 −1] and [−1 −1 −1 −1 1]) have the same signal energy. The maximum energy bit combination is thus computed for the bit combinations where no opposite sign combinations are present. The total number of such combinations is 16. Energy computation for 16 navigation data bit combinations is performed through a single matrix multiplication and does not require the usage of additional correlators for different bit combinations. Particularly, the following matrix multiplication is applied:

$$\begin{bmatrix} I_1 \\ \cdots \\ I_{16} \end{bmatrix} = B \cdot \begin{bmatrix} i_{(20ms)_1} \\ \cdots \\ i_{(20ms)_5} \end{bmatrix}, \begin{bmatrix} Q_1 \\ \cdots \\ Q_{16} \end{bmatrix} = B \cdot \begin{bmatrix} q_{(20ms)_1} \\ \cdots \\ q_{(20ms)_5} \end{bmatrix} \quad (13)$$

where $i_{(20\ ms)_s}, s=1, \ldots, 5$ and $q_{(20\ ms)_s}, s=1, \ldots, 5$ are i and q accumulated over the duration of the $s^{th}$ data bit inside the 0.1-s tracking integration interval;

B is the data bit matrix, which contains 16 possible bit combinations. Each row of the B matrix corresponds to a particular bit combination:

$$B = \begin{bmatrix} 1 & 1 & 1 & 1 & 1 \\ 1 & 1 & 1 & 1 & -1 \\ 1 & 1 & 1 & -1 & -1 \\ \cdots & \cdots & \cdots & \cdots & \cdots \\ 1 & -1 & -1 & -1 & -1 \end{bmatrix} \quad (14)$$

3) Bit combinations are sorted in the descending energy order.

4) In-phase and quadrature signals accumulated over a 0.1-s interval for the first M bit combinations are saved. M can be chosen in the range from 1 to 16.

The energy-based sign polarity resolution of this exemplary methodology is based on the exhaustive search through possible sign combinations of 0.1-s accumulated is and qs. Energy-based sign polarity is resolved through the following steps:

1) Signal energy accumulated over the tracking integration interval is computed for possible sign combinations by using Equation (15):

$$E_{kn} = \left( I_P^2 + \sum_{l=1}^{L} s_{kl} \cdot I_{m_{nl}} \right)^2 + \left( Q_P^2 + \sum_{l=1}^{L} s_{kl} \cdot Q_{m_{nl}} \right)^2 \quad (15)$$

$$k = 1, \ldots, 2^L$$

$$n = 1, \ldots, M^L$$

where:

subscript l is the number of 0.1-s interval within the current tracking integration interval;

L is the total number of 0.1-s intervals within the tracking integration interval;

subscript k denotes the $k^{th}$ sign combination, with the total number of sign combinations equal to $2^L$;

$\{S_{kl}\}_{l=1}^{L}$ is the $k^{th}$ sign combination;

m is the number of a bit combination among bit combinations kept by the exhaustive bit search through a 0.1-s interval, note that $m=1, \ldots, M$;

$\{m_{nl}\}_{l=1}^{L}$ is the $n^{th}$ sequence of bit combinations kept by exhaustive searches through 0.1-s intervals;

$I_{m_{nl}}$ and $Q_{m_{nl}}$ are the in-phase and quadrature signals accumulated over the $l^{th}$ 0.1-s interval using the bit combination $m_{nl}$ for the data bit wipe-off;

$I_p$ and $Q_p$ are the in-phase and quadrature signals accumulated over the previous tracking integration interval using the energy based bit estimation algorithm;

$E_{kn}$ is the signal energy for the $k^{th}$ sign combination and the $n^{th}$ sequence of bit combinations.

2) A sign combination and a sequence of bit combinations that maximizes the signal energy over the tracking integration interval are chosen:

$$E_{ind_1,ind_2} = \max(E_{kn}), k=1, \ldots, 2^L, n=1, \ldots, L^M \quad (16)$$

3) Maximum energy sign combination is then applied to compute I and Q accumulated over the current tracking interval:

$$I_c = \sum_{l=1}^{L} s_{ind_1 l} \cdot I_{m_{ind_2 l}}, \quad Q_c = \sum_{l=1}^{L} s_{ind_1 l} \cdot Q_{m_{ind_2 l}} \quad (17)$$

Note that Equation (15) utilizes a recursive formulation employing $I_p$ and $Q_p$ from the previous tracking interval. $I_p=0$ and $Q_p=0$ are used to initialize recursive energy computations for the sign polarity resolution.

Navigation data bits estimated using the energy-based bit guessing algorithm can be applied to decode the navigation data message. A high bit error rate is however anticipated for low CNR GPS signals. According to Sklar, B., Digital Communications, Prentice Hall, 1988, the bit error rate for coherent decoding of the binary phase shift is expressed as follows:

$$ber_0 = Q\left( \sqrt{2 \cdot 10^{\frac{CNR}{10}} \cdot 20ms} \right) \quad (18)$$

where $ber_0$ is the bit error rate;

Q is the complimentary error function defined by Equation (19):

$$Q(x) = \frac{1}{\sqrt{2\pi}} \int_x^{+\infty} e^{-\frac{z^2}{2}} dz \qquad (19)$$

Equation (18) is applied to estimate the bit error rate of the energy-based bit guessing algorithm, which coherently detects binary navigation data modulating the GPS signal carrier phase. Using Equation (18), the bit error rate for a 15 dB-Hz GPS signal case was estimated as 0.1304. This bit error rate is too high to decode the navigation data message reliably.

The data bit repeatability in the navigation message can be used to decrease the bit error rate. Particularly, most of the data bits (e.g. ephemeris bits) generally repeat themselves every 30 s, which is the duration of a navigation message frame. The following approach is thus applied:

1) Repeating bits are first estimated using the energy-based scheme disclosed above.
2) Next, estimated bit values ($\{\tilde{d}\}$) are summed over different frames:

$$s_k = \sum_{p=M_1}^{M_2} \tilde{d}_{kp} \qquad (20)$$

where:
$\tilde{d}_{kp}$ is the energy-based estimate of the $k^{th}$ bit of the $p^{th}$ frame;
summation is performed over frames M1 through M2.

3) The final bit value is calculated by taking the sign of the bit sum defined by Equation (21):

$$\hat{d}_k = \text{sign}(s_k) \qquad (21)$$

Navigation data words in different frames can however have different sign polarity. I.e. data bits in a word (with the exception of parity bits) repeat with an opposite sign for different frames. The following steps are applied to resolve the sign polarity of navigation data words:

1) Bits are detected using the energy-based scheme disclosed above;
2) A correlation coefficient is computed between data bits of a word in a given subframe and data bits of the same word in the first subframe that is used for the navigation message decoding;
3) A sign of a word in a given frame is estimated as a sign of the correlation coefficient.

For the bit decoding approach described above the bit error rate is evaluated as follows:

$$\text{bit error rate} = \sum_{k=M-K_M}^{M} C_M^{M-k} \cdot ber_0^k \cdot (1-ber_0)^{M-k} \qquad (22)$$

where:
M is the number of frames used for the bit detection;

$$K_M = \text{full part of} \left[\frac{M}{2}\right];$$

$$C_M^{M-k} = \frac{M!}{k!(M-k)!}.$$

Examples of the bit error rate for the low CNR signal bit decoding disclosed herein are given below:
Example 1: 15 dB-Hz case, 5 frames are used for the bit detection; the bit error rate is 0.018;
Example 2: 15 dB-Hz case, 10 frames are used for the bit detection; the bit error rate is 0.0054;
Example 3: 15 dB-Hz case, 20 frames are used for the bit detection; the bit error rate is $7.47 \cdot 10^{-5}$;
Example 3: 15 dB-Hz case, 40 frames are used for the bit detection; the bit error rate is $1.97 \cdot 10^{-8}$.

It is noted that Equation (22) does not consider the influence of word sign polarity resolution errors. The sign error rate is however negligible as compared to the bit error rate of the energy-based bit guessing. Specifically, sign error rate is computed as follows:

$$\text{sign error rate} = p \cdot (1-p) + p^2 \qquad (23)$$

$$p = \sum_{k=12}^{24} C_{24}^{24-k} \cdot ber_0^k \cdot (1-ber_0)^{24-k}$$

where 24 is the number of bits in the word excluding parity bits.

The corresponding frame sign error rate for a 15 dB-Hz case is $1.4095 \cdot 10^{-5}$ whereas the bit error rate of the energy-based bit guessing (bero) equals 0.1304. Thus, frame sign errors serve as high-order effects and do not have to be considered to estimate the bit error rate of the bit decoding approach described above.

Listings of the MATLAB source code that implement the energy-based bit estimation methodology and tracking methodology are provided below.

---

Main function: tracking.m;
Subroutines: phase_est_aided.m; sign_sequence.m; bit_matrix.m; IQ_matrix.m;
matrix_to_column.m; integration.m; double_integration.m.
Main function

```
tracking.m
function[N_c, frac, intDoppler, I_c, Q_c, dR_c, frac_p, trans_b, ca_peak] = tracking
(sv_data, ca_code, ca_peak, f_acq, f_IF, N_c, frac, intDoppler_p, N, M_track, trans_b,
R_block_IMU, V_block_IMU, V_SV_ref, A_SV_ref, I_p, Q_p, dR_p, frac_p, M_comb);
% INPUTS:
%      sv data - sampled GPS signal;
%      ca_code - unshifted replica CA code;
%      ca_peak, f_acq -code shift in samples of GPS signal (initialized at the acquisition
stage using      %    acquired code phase) and
%      acquired frequency;
```

```
%       f_IF - intermediate frequency;
%       N_c, frac - full and fractional number of carrier cycles from the previous tracking
interval;
%       intDoppler_p - accumulated Doppler measurement from the previous tracking
interval;
%       N - number of GPS signal samples in a 1 ms block;
%       M_track - number of 0.1-s intervals in a tracking integration interval;
%       trans_b - time interval from the beginning of the current tracking interval till the first
bit       % transition; trans_b is expressed in a number of 1 ms blocks and is initialized
at the acquisition    %stage;
%       R_block_IMU,V_block_IMU - receiver position changes and velocity derived from
IMU data;
%       V_SV_ref,A_SV_ref - satellite Line-Of-Site (LOS) velocity and LOS acceleration
derived from        % ephemeris;
%       I_p, Q_p - accumulated in-phase and quadrature signals for the previous tracking
interval;
%       dR_p - LOS distance change over the previous tracking interval computed from IMU
data and     %     satellite ephemeris;
%       frac_p - fractional number of carrier cycles from the previous previous tracking
interval;
%       M_comb - number of bit combinations kept by exhaustive search over 0.1-s intervals.
%
% OUTPUTS:
%       N_c, frac - full and fractional number of carrier cycles for the current tracking
interval;
%       intDoppler - accumulated Doppler measurement;
%       I_c, Q_c - - accumulated in-phase and quadrature signals for the current tracking
interval;
%       dR_c - LOS distance change over the current tracking interval computed from IMU
data and     %     satellite ephemeris;
%       frac_p - fractional number of carrier cycles for the previous tracking interval;
%       trans_b for the next tracking interval;
%       ca_peak for the next tracking interval.
c=299792458;
f_L1=1575.42*10.^6
liamda_L1=c/f_L1;
dt=1e-3/N;
t_block=N*dt;
M_acm_red=100;
t_block_acm_red=M_acm_red*dt;
M_start=1;
M_start=1;
m_index=(M_start+(n-1)*M_acm_red:M_start+n*M_acm_red-1);
ind=find(mod((m_index(1,:)-trans_b_mod),20)==0);
N1=ind(1,1);
N2=ind(1,2);
N3=ind(1,3);
N4=ind(1,4);
N5=ind(1,5);
if M_acm_red-N5>N1
    bit_sequences=[0 1 1 1 1 1;
                   0 1 1 1 1 -1;
                   0 1 1 1 -1 1;
                   0 1 1 1 -1 -1;
                   0 1 1 -1 1 1;
                   0 1 1 -1 1 -1;
                   0 1 1 -1 -1 1;
                   0 1 1 -1 -1 -1;
                   0 1 -1 1 1 1;
                   0 1 -1 1 1 -1;
                   0 1 -1 1 -1 1;
                   0 1 -1 1 -1 -1;
                   0 1 -1 -1 1 1;
                   0 1 -1 -1 1 -1;
                   0 1 -1 -1 -1 1;
                   0 1 -1 -1 -1 -1];
else
    bit_sequences=[1 1 1 1 1 0;
                   1 1 1 1 -1 0;
                   1 1 1 -1 1 0;
                   1 1 1 -1 -1 0;
                   1 1 -1 1 1 0;
                   1 1 -1 1 -1 0;
                   1 1 -1 -1 1 0;
                   1 1 -1 -1 -1 0;
                   1 -1 1 1 1 0;
                   1 -1 1 1 -1 0;
                   1 -1 1 -1 1 0;
                   1 -1 1 -1 -1 0;
                   1 -1 -1 1 1 0;
```

-continued

```
                1 -1 -1 1 -1 0;
                1 -1 -1 -1 1 0;
                1 -1 -1 -1 -1 0];
    end
sign_sequences=sign_sequence(M_track);
H_bit=bit_matrix(M_comb,M_track);
dR_code=0;
dR_carrier0=0;
dR_carrier1=dR_p;
t_init=M_acm*N*dt;
if trans_b>0
        trans_b_mod=mod(floor(trans_b),20);
else
        trans_b_mod=mod(ceil(trans_b),20);
end
for n=1:M_track
  sv_data2=sv_data((n-1)*N*M_acm_red+1:n*N*M_acm_red);
  t2=((n-1)*N*M_acm_red:n*N*M_acm_red-1)*dt;
  shift_ref=(1/dt)*dR_code/c;
  peak_shifted=mod(round(ca_peak+shift_ref),N);
  if peak_shifted>0
         ca_code2=[ca_code(N-peak_shifted+1:N) ca_code(1:N-peak_shifted)];
  else
       if shift_ref<0
             ca_code2=[ca_code(abs(peak_shifted)+1:N) ca_code(1:abs(peak_shifted))];
       else
             ca_code2=ca_code;
       end
  end
  V0_ref2=V_SV_ref((n-1)*M_acm_red+1);
  A_ref_block2=A_SV_ref((n-1)*M_acm_red+1:n*M_acm_red);
  dR_block_IMU=R_block_IMU((n-1)*M_acm_red+2:n*M_acm_red+1)-
             R_block_IMU((n-1)*M_acm_red+1);
  V_block_IMU_c=V_block_IMU((n-1)*M_acm_red+1:n*M_acm_red);
  t2_2=t_init*ones(1,N*M_acm_red)+((n-1)*N*M_acm_red:(n)*N*M_acm_red-1)*dt;
  [i_1ms_0, q_1ms_0] = phase_est_aided (sv_data2, ca_code2, f_acq, f_IF, frac, t2, N,
M_acm_red, dt,
                    V0_ref2, A_ref_block2, dR_block_IMU, V_block_IMU_c,
dR_carrier0);
  i_m0=[sum(i_1ms_0(1:N1)); sum(i_1ms_0(N1:N2)); sum(i_1ms_0(N2:N3));
sum(i_1ms_0(N3:N4));
        sum(i_1ms_0(N4:N5)); sum(i_1ms_0(N5:M_acm_red))];
  q_m0=[sum(q_1ms_0(1:N1)); sum(q_1ms_0(N1:N2)); sum(q_1ms_0(N2:N3));
sum(q_1ms_0(N3:N4));
        sum(q_1ms_0(N4:N5)); sum(q_1ms_0(N5:M_acm_red))];
  [i_1ms_1, q_1ms_1] = phase_est_aided(sv_data2, ca_code2, f_acq, f_IF, frac_p, t2_2, N,
M_acm_red, dt,
                    V0_ref2, A_ref_block2, dR_block_IMU, V_block_IMU_c,
dR_carrier1);
  i_m1=[sum(i_1ms_1(1:N1)); sum(i_1ms_1(N1:N2)); sum(i_1ms_1(N2:N3));
sum(i_1ms_1(N3:N4));
        sum(i_1ms_1(N4:N5)); sum(i_1ms_1(N5:M_acm_red))];
  q_m1=[sum(q_1ms_1(1:N1)); sum(q_1ms_1(N1:N2)); sum(q_1ms_1(N2:N3));
sum(q_1ms_1(N3:N4));
        sum(q_1ms_1(N4:N5)); sum(q_1ms_1(N5:M_acm_red))];
  I0=bit_sequences*i_m0;
  Q0=bit_sequences*q_m0;
  I1=bit_sequences*i_m1;
  Q1=bit_sequences*q_m1;
  E1=I0.^2+Q0.^2;
  [E1_sorted, ind_IQ_sorted]=sort(E1);
  E_max_c=max(E1)
  for j=1:M_comb1
    ind_IQ=ind_IQ_sorted(length(ind_IQ_sorted)-(j-1));
    I_m1(j,n)=I1(ind_IQ);
    Q_m1(j,n)=Q1(ind_IQ);
    I_m0(j,n)=I0(ind_IQ);
    Q_m0(j,n)=Q0(ind_IQ);
  end
  V2=V0_ref2*ones(1,M_acm_red)+integration(A_ref_block2,M_acm_red,t_block);
  dR3=double_integration
(A_ref_block2,V2,M_acm_red,t_block)+R_block_IMU(n*M_acm_red+1)-
        R_block_IMU((n-1)*M_acm_red+1);
  dR_code=dR_code+dR3;
  dR_carrier0=dR_carrier0+dR3;
  dR_carrier1=dR_carrier1+dR3;
end
H_I_temp1=IQ_matrix(I_m1,H_bit);
H_Q_temp1=IQ_matrix(Q_m1,H_bit);
H_I_temp0=IQ_matrix(I_m0,H_bit);
```

```
H_Q_temp0=IQ_matrix(Q_m0,H_bit);
H_I1=[I_p*ones(length(H_I_temp1(:,1)),1) H_I_temp1];
H_Q1=[Q_p*ones(length(H_Q_temp1(:,1)),1) H_Q_temp1];
H_I0=[zeros(length(H_I_temp0(:,1)),1) H_I_temp0];
H_Q0=[zeros(length(H_Q_temp0(:,1)),1) H_Q_temp0];
I_temp1=sign_sequences*H_I1';
Q_temp1=sign_sequences*H_Q1';
I_temp0=sign_sequences*H_I0';
Q_temp0=sign_sequences*H_Q0';
I2_1=matrix_to_column(I_temp1);
Q2_1=matrix_to_column(Q_temp1);
I2_0=matrix_to_column(I_temp0);
Q2_0=matrix_to_column(Q_temp0);
E2=I2_1.^2+Q2_1.^2;
[E2_max ind_max]=max(E2);
I_c=I2_0(ind_max);
Q_c=Q2_0(ind_max);
ang_est = atan2(Q_c,I_c);
frac_p=frac;
frac=frac-(f_L1/c)*dR_carrier0+( M_track*t_block_acm_red*2*pi*(f_acq-
f_IF)+ang_est)/(2*pi);
if frac>0
    N_c=N_c+floor(frac);
    frac=frac-floor(frac);
else
    N_c=N_c+ceil(frac);
    frac=frac-ceil(frac);
end
intDoppler=-liamda_L1*(N_c+frac);
dR_c=dR_carrier0;
ca_peak =ca_peak+(1/(c*dt))*(intDoppler-intDoppler_p);
trans_b =trans_b+(1/(c*t_block))*(intDoppler-intDoppler_p);
Subroutines phase_est_aided.m
function[i_1ms, q_1ms] = phase_est_aided(sv_data, ca_code, f_acq, f_IF, frac, t, N, M_acm,
dt, V_SV,
                        A_ref_block, dR_block_IMU, V_block_IMU, dR);
yc=0;
ys=0;
t2=(0:N-1)*dt;
c=299792458;
f_L1=1575.42*10.^6;
t_block=N*dt;
dR_code=0;
dR_code2=0;
for m=1:M_acm
    t_c=t((m-1)*N+1:m*N);
    if m==1
        dR_ref=dR+V_block_IMU(m)*t2+V_SV*t2+0.5*A_ref_block(m)*t2.^2;
    else
        dR_ref=dR+dR_block_IMU(m-
1)+V_block_IMU(m)*t2+V_SV*t2+0.5*A_ref_block(m)*t2.^2;
    end
    dphi_ref_c=-2*pi*(f_L1/c)*dR_ref;
    shift_ref=round((1/dt)*dR_code2/c);
    dR=dR+V_SV*t_block+0.5*A_ref_block(m)*t_block.^2;
    dR_code=dR_code+V_SV*t_block+0.5*A_ref_block(m)*t_block.^2;
    dR_code2=dR_code+dR_block_IMU(m);
    V_SV=V_SV+A_ref_block(m)*t_block;
    if shift_ref>0
            ca_code_shifted=[ca_code(N-shift_ref+1:N) ca_code(1:N-shift_ref)];
    else
            if shift_ref<0
                ca_code_shifted=[ca_code(abs(shift_ref)+1:N) ca_code(1:abs(shift_ref))];
            else
                ca_code_shifted=ca_code;
            end
    end
    syn_s = sin (2 * pi * f_IF * t_c + 2 * pi *(f_acq-f_IF)* t_c + dphi_ref_c + 2*pi*frac);
    syn_c = cos (2 * pi * f_IF * t_c + 2 * pi *(f_acq-f_IF)* t_c + dphi_ref_c + 2*pi*frac);
    i_1ms(1,m) = sum (sv_data((m-1)*N+1:m*N) .* ca_code_shifted.* syn_s );
    q_1ms(1,m) = sum (sv_data((m-1)*N+1:m*N) .* ca_code_shifted.* syn_c );
end
sign_sequence.m
function[seq]=sign_sequence(M);
seq=zeros(2.^M,M+1);
seq(:,1)=1;
for k1=1:2^M
    for k2=1:M
```

```
        seq(k1,k2+1)=(-1)^(floor((k1-1)/(2.^(k2-1))));
    end
end
bit_matrix.m
function[H_bit]=bit_matrix (M_comb,M_track);
H_bit=zeros(M_comb ^ M_track, M_track);
for k1=1: M_comb ^ M_track
    for k2=1: M_track
        H_bit(k1,k2)=1+mod(floor((k1-1)/ M_comb ^(k2-1)), M_comb);
    end
end
IQ_matrix.m.m
function[H_I]=IQ_matrix(I_m,H_bit);
K1=length(H_bit(1,:));
K2=length(H_bit(:,1));
for k1=1:K1
    for k2=1:K2
        H_I(k2,k1)=I_m(H_bit(k2,k1),k1);
    end
end
matrix_to_column.m
function[H_col]=matrix_to_column(H);
L=length(H(:,1));
M=length(H(1,:));
H_col=zeros(L*M,1);
for l=1:L
    H_col(1+(l-1)*M:1*M,1)=H(1,:)';
end
integration.m
function[V]=integration4(A,N,dt);
V=zeros(1,N);
for n=2:N
    V(n)=V(n-1)+A(n-1)*dt;
end
double_integration.m
function[X]=double_integration(A,V,N,dt);
X=0;
for n=1:N
    X=X+V(n)*dt+0.5*A(n)*dt.^2;
end
```

A cm/s accurate inertial aiding of the GPS signal integration is required for a consistent carrier phase tracking of very low CNR GPS signals. To achieve a cm/s accurate inertial aiding, a low-cost inertial system is calibrated using carrier phase measurements derived from GPS block estimators. The calibration procedure is based on a complimentary Kalman filter methodology Brown, R. G., Hwang, P. Y. C., *Introduction to Random Signals and Applied Kalman Filtering* (*Third Edition*), John Wiley & Sons, Inc., New York, 1997, which employs differences between INS and GPS observables as filter measurements. Changes in accumulated Doppler measurements are used to form GPS observables. INS observables are based on the integrated velocity derived from JMU measurement data. GPS observables of the Kalman filter are formulated as follows:

$$\Delta r_{j_{GPS}}(t_m) = -\frac{\lambda_{L_1}}{2\pi}(\tilde{\varphi}(t_m) - \tilde{\varphi}(t_{m-1})) + (e_j(t_m), r_{SV_j}(t_m)) - (e_j(t_{m-1}), r_{SV_j}(t_{m-1})) - (r_{rcvr_{GPS}}(t_{m-1}), e_j(t_m) - e_j(t_{m-1})) \quad (24)$$

where
  $\lambda_{L_1}$ is the GPS Link 1 (L1) wavelength;
  $(.,.)$ is the vector dot product;
  $t_m=t_0+m\cdot\Delta t_{GPS}$ is the discrete time of GPS measurement update;
  $\Delta t_{GPS}$ is the GPS measurement update interval;
  $\tilde{\varphi}$ is the Accumulated Doppler (AD) measurement derived from GPS block estimators;
  $r_{SV_j}$ is the satellite j position vector;
  $e_j$ is the line-of-sight unit vector for the satellite j;
  $r_{rcvr_{GPS}}$ is the receiver position vector derived from GPS measurements (code phase and/or carrier phase);
  $(e_j(t_m),r_{SV_j}(t_m))-(e_j(t_0),r_{SV_j}(t_0))$ is the satellite motion term created by satellite motion along the line-of-sight;
  $(r_{rcvr_{GPS}}(t_0),e_j(t_m)-e_j(t_0))$ represents geometry changes that occur due to the fact that the line-of-sight vector changes its orientation.

Equation (25) defines inertial observables of the Kalman filter:

$$\Delta r_{j_{INS}}(t_m)=(e_j(t_m),\Delta r_{rcvr_{INS}}(t_m)+(C_b^N(t_m)-C_b^N(t_{m-1}))\cdot L_b) \quad (25)$$

where
  $\Delta r_{rcvr_{INS}}(t_m)$ is the receiver velocity vector integrated over the interval $[t_{m-1},t_m]$ using inertial measurements;
  $C_b^N$ is the INS direction cosine matrix.
  $L_b$ is the lever arm vector pointed from the IMU to the GPS antenna with the vector components given at the IMU-defined body frame.

Filter measurements are defined as differences between inertial and GPS observables:

$$y_j(t_m)=\Delta r_{j_{INS}}(t_m)-\Delta r_{j_{GPS}}(t_m) \quad (26)$$

The Kalman filter state vector (X) includes:
a. 3 integrated velocity error states;
b. 3 velocity error states;
c. 3 attitude error states;
d. 3 gyro bias states;
e. 3 accelerometer bias states;

f. 3 integrated gyro error states;
g. receiver clock bias state;
h. receiver clock drift state;
i. $N_{sat}$ states for AD biases, where $N_{sat}$ is the number of visible satellites; and
j. $N_{sat}$ states for AD drifts.

The filter matrices are defined below:

State transition matrix (F)

$$F(t_k) = \begin{bmatrix} I_{3\times3} & I_{3\times3}\cdot\Delta t_{INS} & & & 0_{3\times(14+2N_{sat})} \\ 0_{3\times3} & I_{3\times3} & SF_N\times(t_k)\cdot\Delta t_{INS} & 0_{3\times3} & C_b^N(t_k)\cdot\Delta t_{INS} & 0_{3\times(5+2N_{sat})} \\ 0_{3\times6} & I_{3\times3} & C_b^N(t_k)\cdot\Delta t_{INS} & & & 0_{3\times(8+2N_{sat})} \\ 0_{3\times9} & I_{3\times3} & & & & 0_{3\times(8+2N_{sat})} \\ 0_{3\times12} & I_{3\times3} & & & & 0_{3\times(5+2N_{sat})} \\ 0_{3\times9} & C_b^N(t_k)\cdot\Delta t_{INS} & 0_{3\times3} & I_{3\times3} & & 0_{3\times(2+2N_{sat})} \\ 0_{1\times18} & 1 & \Delta t_{INS} & & & 0_{1\times2N_{sat}} \\ 0_{1\times19} & 1 & & & & 0_{1\times2N_{sat}} \\ 0_{N_{sat}\times20} & I_{N_{sat}\times N_{sat}} & I_{N_{sat}\times N_{sat}}\cdot\Delta t_{INS} & & & \\ 0_{N_{sat}\times(20+N_{sat})} & I_{N_{sat}\times N_{sat}} & & & & \end{bmatrix} \quad (27)$$

where
$I_{M\times M}$ is M×M unit matrix;
$O_{L\times M}$ is L×M zero matrix;
$\Delta t_{INS}$ is the INS update interval;
$SF_N\times$ is the skew-symmetric matrix containing navigation frame specific force components that are derived from inertial measurements;
$t_k = t_0 + k\cdot\Delta t_{INS}$ is the discrete time of INS measurement update.

System noise matrix (Q)

$$Q(t_k) = \begin{bmatrix} & & 0_{3\times20+2N_{sat}} & & \\ 0_{3\times3} & I_{3\times3}\cdot\sigma_{accel_{noise}}^2\cdot\Delta t_{INS}^2 & & 0_{3\times14+2N_{sat}} \\ 0_{3\times6} & I_{3\times3}\cdot\sigma_{gyro_{noise}}^2\cdot\Delta t_{INS}^2 & & 0_{3\times11+2N_{sat}} \\ 0_{3\times9} & I_{3\times3}\cdot 2\cdot\beta_{gyro_{bias}}\cdot\Delta t_{INS}\cdot\sigma_{gyro_{bias}}^2 & & 0_{3\times8+2N_{sat}} \\ 0_{3\times12} & I_{3\times3}\cdot 2\cdot\beta_{accel_{bias}}\cdot\Delta t_{INS}\cdot\sigma_{accel_{bias}}^2 & & 0_{3\times5+2N_{sat}} \\ 0_{3\times15} & I_{3\times3}\cdot\sigma_{gyro_{noise}}^2\cdot\Delta t_{INS} & & 0_{3\times2+2N_{sat}} \\ & & 0_{1\times20+2N_{sat}} & & \\ 0_{1\times19} & 2\cdot\beta_{clock_{drift}}\cdot\Delta t_{INS}\cdot\sigma_{clock_{drift}}^2 & & 0_{1\times2N_{sat}} \\ & & 0_{N_{sat}\times20+2N_{sat}} & & \\ 0_{N_{sat}\times20+N_{sat}} & I_{N_{sat}\times N_{sat}}\cdot 2\cdot\beta_{AD_{drift}}\cdot\Delta t_{INS}\cdot\sigma_{AD_{drift}}^2 & & \end{bmatrix}$$

(28)

where
$\sigma_{accel_{noise}}$ is the standard deviation of the accelerometer noise;
$\sigma_{gyro_{noise}}$ is the standard deviation of the gyro noise;
$\sigma_{gyro_{bias}}^2$ is the mean squared value of the gyro in-run bias;

$1/\beta_{gyro_{bias}}$ is the time constant of the first-order Gauss-Markov process, which models the gyro in-run bias;
$\sigma_{accel_{bias}}^2$ is the mean squared value of the accelerometer in-run bias;
$1/\beta_{accel_{bias}}$ is the time constant of the first-order Gauss-Markov process, which models the accelerometer in-run bias;

$\sigma_{clock_{drift}}^2$ is the mean squared value of the GPS receiver clock drift;
$1/\beta_{clock_{drift}}$ is the time constant of the first-order Gauss-Markov process, which models the GPS receiver clock drift;
$\sigma_{AD_{drift}}^2$ is the mean squared value of the AD drift;
$1/\beta_{AD_{drift}}$ is the time constant of the first-order Gauss-Markov process, which models the AD drift.

Measurement noise matrix $$R = \text{diag}(\sigma_{AD_1}^2, \ldots, \sigma_{AD_{N_{sat}}}^2) \quad (29)$$

where
diag denotes a diagonal matrix;
$\sigma_{AD_j}^2$ is the standard deviation of the AD noise for the satellite j.

Observation matrix (H):

$$H(t_k) = \begin{bmatrix} -e_1^T(t_m) & 0_{1\times3} & (e_1(t_m)\times(C_b^N(t_m)-C_b^N(t_{m-1}))\cdot L_b)^T & 0_{1\times6} & (e_1(t_m)\times C_b^N(t_{m-1})\cdot L_b)^T & -v_{light} & 0 & 1 & 0_{1\times2N_{sat}-1} \\ -e_2^T(t_m) & 0_{1\times3} & (e_2(t_m)\times(C_b^N(t_m)-C_b^N(t_{m-1}))\cdot L_b)^T & 0_{1\times6} & (e_2(t_m)\times C_b^N(t_{m-1})\cdot L_b)^T & -v_{light} & 0_{1\times2} & 1 & 0_{1\times2N_{sat}-2} \\ \vdots & \vdots & \vdots & \vdots & \vdots & \vdots & \vdots & \vdots & \vdots \\ -e_{N_{sat}}^T(t_m) & 0_{1\times3} & (e_{N_{sat}}(t_m)\times(C_b^N(t_m)-C_b^N(t_{m-1}))\cdot L_b)^T & 0_{1\times6} & (e_{N_{sat}}(t_m)\times C_b^N(t_{m-1})\cdot L_b)^T & -v_{light} & 0_{1\times N_{sat}-1} & 1 & 0_{1\times N_{sat}} \end{bmatrix} \quad (30)$$

where
superscript T denotes a transpose matrix;
$v_{light}$ is the speed of light in vacuum.

With the filter measurements defined by Equations (24) through (26), filter states listed above, and the filter matrices defined by Equations (27) through (30), the IMU calibration procedure implements a standard Kalman filter recursive computation routine (Kalman filter propagation and estimation equations) for the estimation of the inertial error states. Recursive filter computations are initialized at time $t_0$. Following the estimation of the state vector at time $t_m$, the filter is re-initialized to account for the re-initialization of INS integrated velocity. Equations (31) and (32) are applied for the filter initialization at time $t_0$:

Initialization of the estimated state vector ($\hat{X}$):

$$\hat{X}(t_0) = O_{2N_{sat} \times 1} \quad (31)$$

Initialization of the covariance matrix (P):

$$P(t_0) = \begin{bmatrix} & & 0_{3 \times 20 + 2N_{sat}} & & \\ 0_{3\times3} & P_{V_0} & & 0_{3\times 14+2N-sat} \\ 0_{3\times6} & P_{\alpha_0} & & 0_{3\times 11+2N_{sat}} \\ 0_{3\times9} & I_{3\times3} \cdot \sigma^2_{0_{gyro_{bias}}} & & 0_{3\times 8+2N_{sat}} \\ 0_{3\times12} & I_{3\times3} \cdot \sigma^2_{0_{accel_{bias}}} & & 0_{3\times 5+2N_{sat}} \\ & 0_{4\times 20+2N_{sat}} & & \\ 0_{1\times19} & \sigma^2_{clock_{drift}} & & 0_{1\times 2N_{sat}} \\ & 0_{N_{sat}\times 20+2N_{sat}} & & \\ 0_{N_{sat}\times 20+N_{sat}} & I_{N_{sat}\times N_{sat}} \cdot \sigma^2_{AD_{drift}} & & \end{bmatrix} \quad (32)$$

where
$P_{V_0}$ is the initial velocity covariance matrix;
$P_{\alpha_0}$ is the initial attitude covariance matrix;
$\sigma^2_{0_{gyro_{bias}}}$ is the mean squared value of the gyro turn-to-turn bias;
$\sigma^2_{0_{accel_{bias}}}$ is the mean squared value of the accelerometer turn-to-turn bias;
$\sigma^2_{clock_{bias}}$ is the mean squared value of the GPS receiver clock bias.

Following the estimation of the state vector at time $t_m$, integrated velocity error states, integrated gyro error states and corresponding elements of the covariance matrix P are re-initialized using Equation (33) and Equation (34):

State vector re-initialization:

$$\hat{X}_{l,1}(t_m) = 0, l = 1, \ldots, 3, 16, \ldots, 18, 19, 21, \ldots, 20+N_{sat} \quad (33)$$

where
$\hat{X}_{l,1}$ is the $l^{th}$ element of the estimated state vector.

Covariance matrix re-initialization:

$$\begin{cases} P_{l,n}(t_m) = 0 \\ P_{n,l}(t_m) = 0 \end{cases}, l = 1, \ldots, 3, 16, \ldots, 18, 19, \quad (34)$$

$$21, \ldots, 20+N_{sat}, n = 1, \ldots, 20 + 2N_{sat}$$

where
$P_{l,n}$ is the $n^{th}$ element of the $l^{th}$ row of the P matrix.

Figure 23:
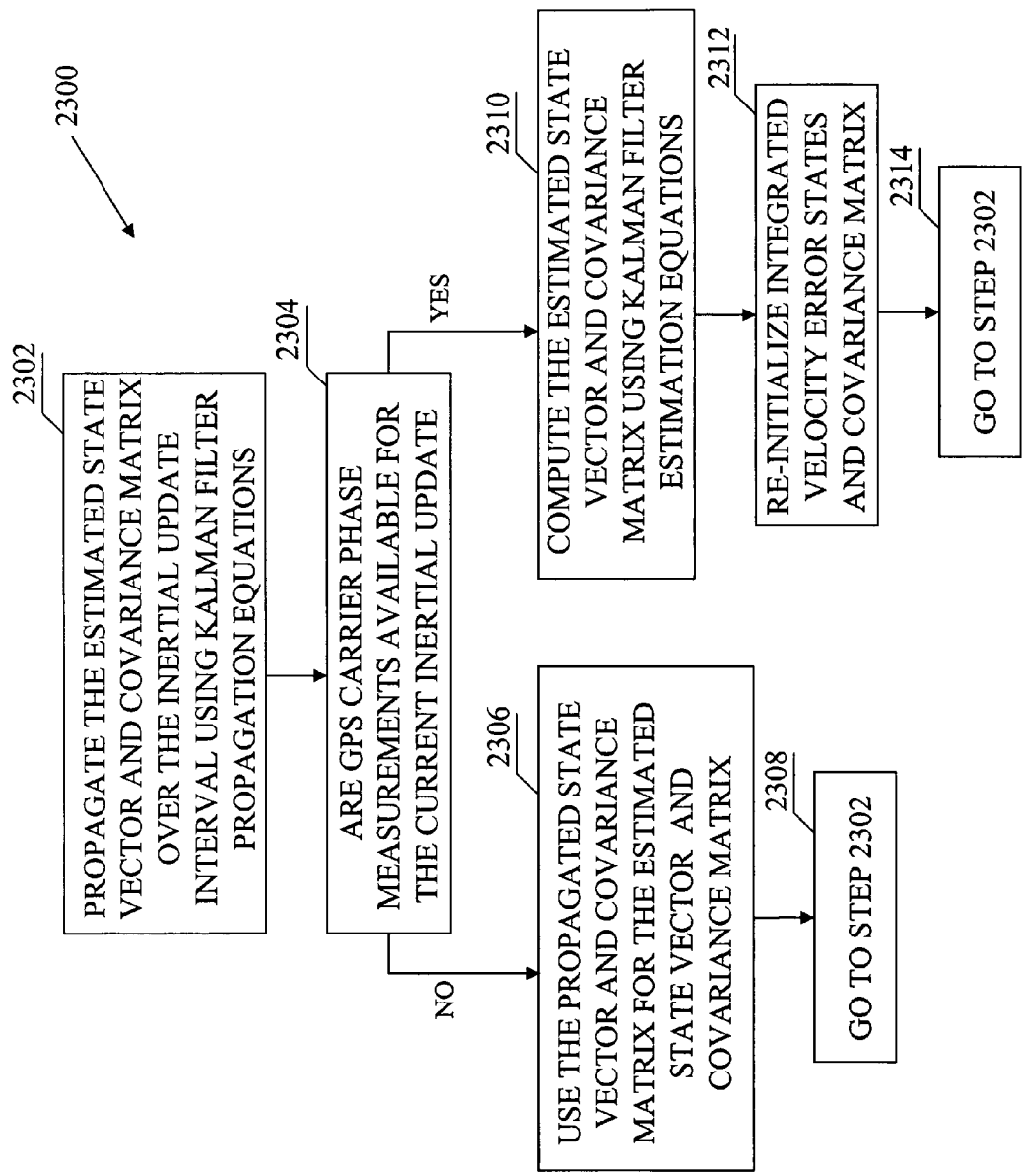
FIG. 23 is a high-level flow chart of the Kalman filter processing.

FIG. 23 is a high-level flow chart 2300 of the Kalman filter processing routine 1144b. First, at 2302, the estimated state vector and covariance matrix are propagated over the inertial update interval using Kalman filter propagation equations. Next, at 2304, the code tests whether GPS carrier phase measurements are available for the current inertial update. If not, the code branches to 2306 where the propagated state vector and propagated covariance matrix are used for the estimated state vector and covariance matrix, and the code branches back to 2302. If so, the estimated state vector and covariance matrix are computed using Kalman filter estimation equations, at 2310, and the integrated velocity error states and the covariance matrix are re-initialized, at 2312, and the code branches back to 2302.

Figure 24:
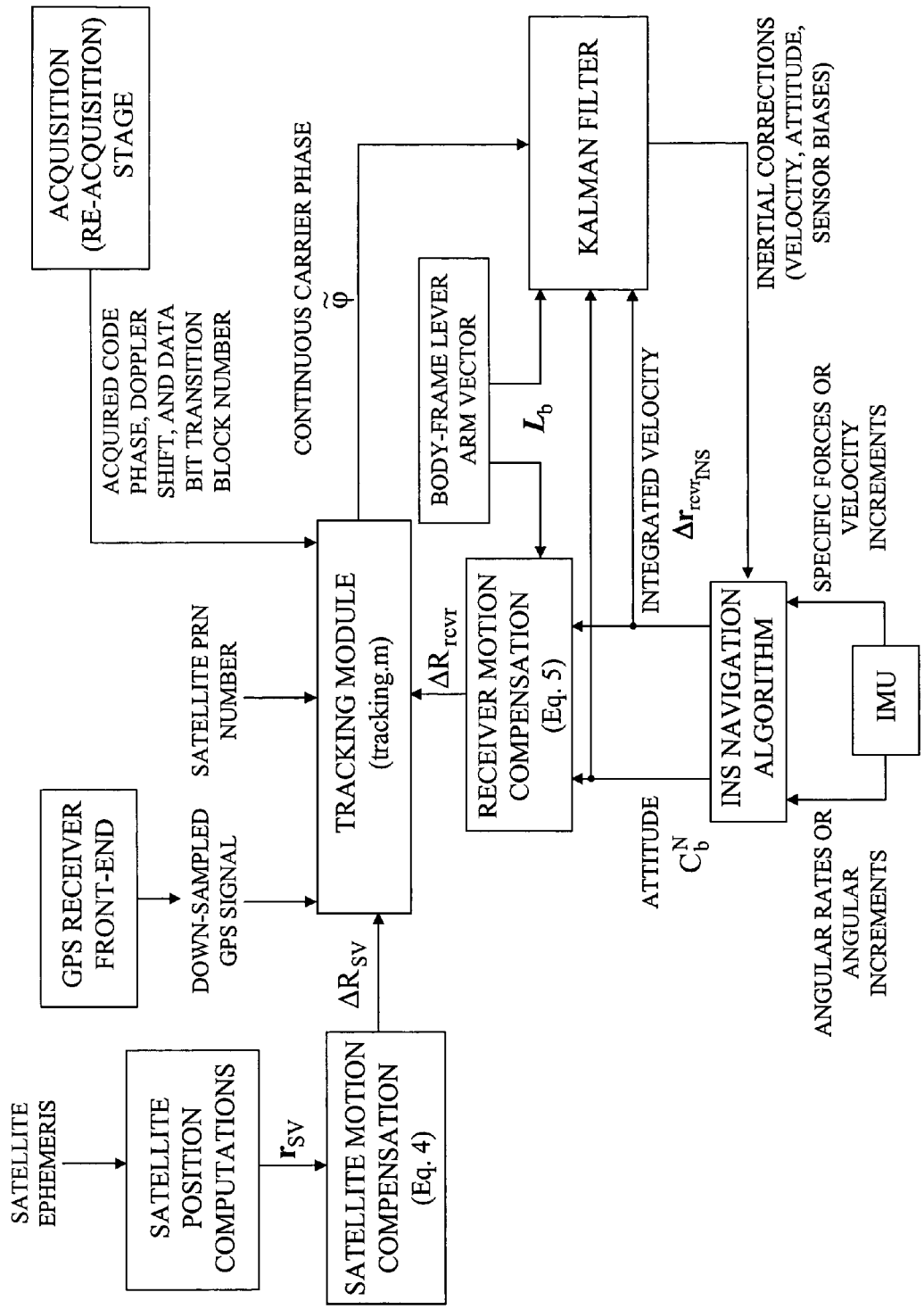
FIG. 24 is a high-level data flow diagram that shows some of the interaction of many of the routines discussed herein.

FIG. 24 is a high-level data flow diagram that shows the interaction of many of the routines discussed herein during low CNR continuous carrier phase tracking. During acquisition (or re-acquisition) the tracking.m block is replaced with the acquisition (or re-acquisition) routine discussed above, and the Kalman filter block is not used.

Figure 25:
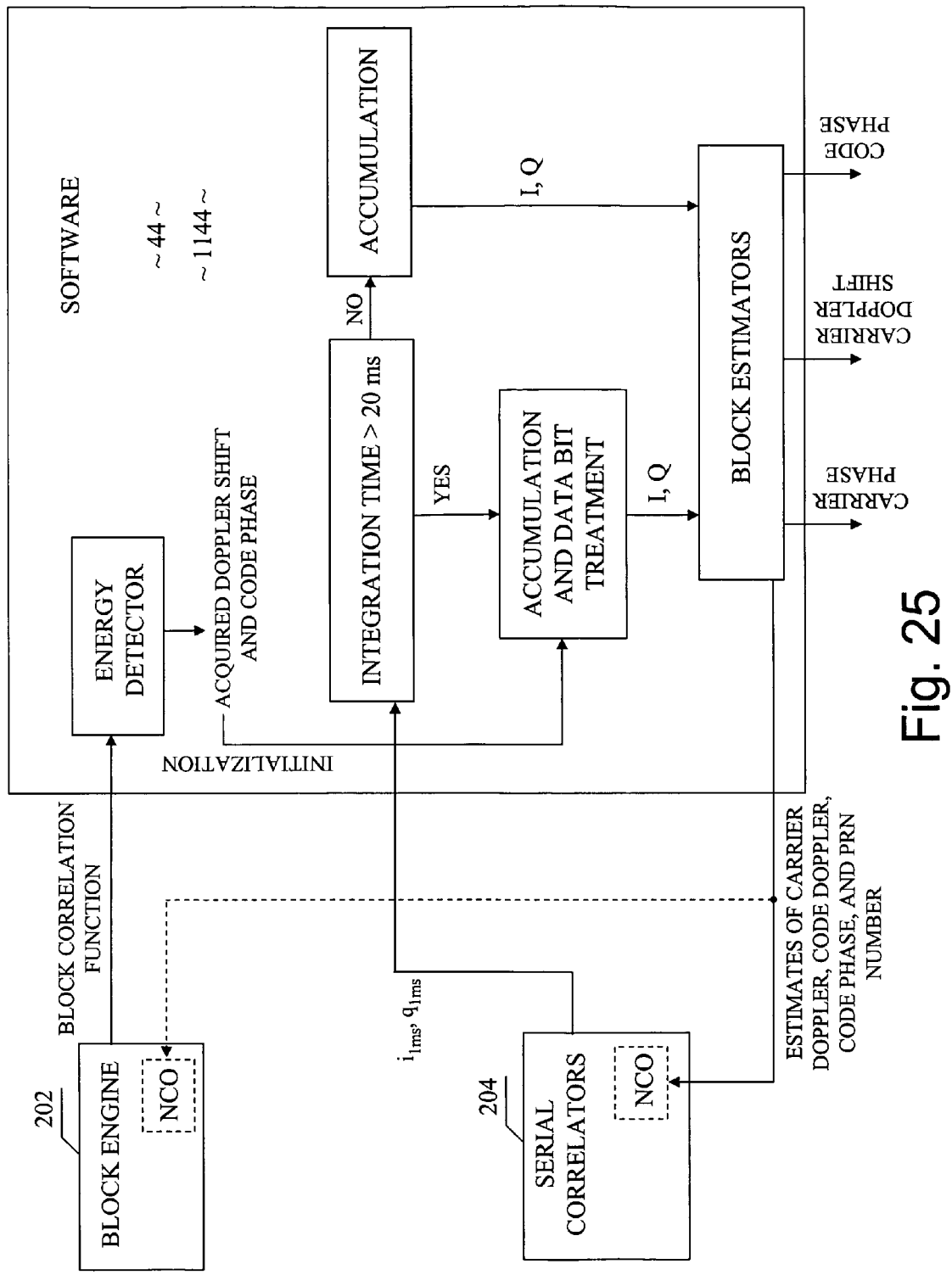
FIG. 25 is a high-level data flow diagram that shows some of the interaction between the hardware and software in an exemplary embodiment.

Similarly, FIG. 25 is a high-level data flow diagram that shows some of the interaction between some of the hardware 202, 204 and the software 44, 1144 in an exemplary embodiment. On the one hand, the block processor 202 can be thought of as "zooming back" on the code offset, permitting one to find a peak 1400 (FIG. 14) indicative of the code offset, but the peak itself is a very coarse estimation of code offset that may be off by about 150 meters. Multipath reflections may show up as an additional peak from the block processor 202. This additional peak would not be observable by the serial correlators 204. Incidentally, these multipath reflections can be tracked to maintain tracking performance; e.g., by locking on to an SV and a reflection (either simultaneously or subsequently), if the SV signal is lost, knowing the offset between the SV and the reflection, the reflection can be tracked and the offset used to correct for the error. On the other hand, the serial correlators can be thought of as "zooming in" on the correlation peak, trying to keep locked at the prompt signal with high accuracy.

The block processor 202 and the serial correlators 204 cooperate differently under various circumstances. For example, during acquisition the system may not have any indication about the location of any of the satellites. Accordingly, the block processor 202 may be used to very quickly find peaks 1400 (FIG. 14) corresponding to code offsets. Once a peak is identified, the corresponding frequency and code offset bin for that peak is passed to one of the serial correlators, which is instructed to initialize at those parameters. In this example, the block processor 202 passes information to the serial correlators 204. Under certain circumstances, the serial correlators 204 may pass information back to the block processor 202. For example, if a correlator loses track of a signal, uncertainties about the location of the satellite grow and the correlator may pass its most recent estimates of frequency and code offset to the block processor 202 and have the block processor 202 begin searching the frequency domain starting at or near those most recent for a peak. Once the block processor finds a peak, it will pass the frequency and code offset back to the correlator; thus, the block processor 202 and the serial correlators may pass data back and forth between them, with one aiding the other. In other circumstances, the the block processor 202 may be used in parallel with a correlator. For example, if a correlator is tracking and gets jammed, the CNR will drop (a background process is always determining CNR for each correlator) and uncertainties about whether that correlator is actually tracking the satellite will grow. Accordingly, the processor 40, 1140 may take information from the correlator and pass it to the block processor 202, which in the background and in parallel will determine if the correlator is tracking a block processor peak as a double-check.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A receiver for tracking of low carrier-to-noise ratio ("CNR") signals from a plurality of radio navigation satellites while the receiver is moving, comprising:
   (a) a radio frequency (RF) front-end that provides satellite data corresponding to signals received from the plurality of radio navigation satellites; and
   (b) an inertial measurement unit (MU) that provides inertial data; and
   (c) a processor circuit in circuit communication with the RF front end and the IMU, the processor circuit being capable of using satellite data from the RF front-end and inertial data from the IMU to perform continuous carrier phase tracking of low CNR radio navigation satellite signals having a CNR at a 20 dB-Hz level, while the receiver is moving.

2. The receiver according to claim 1 wherein the processor circuit is capable of using satellite data from the RF front-end and inertial data from the IMU to acquire, and perform continuous carrier phase tracking of, low CNR satellite signals having a CNR at a 20 dB-Hz level, while the receiver is moving.

3. The receiver according to claim 1 wherein the processor circuit is capable of using satellite data from the RF front-end and inertial data from the IMU to perform continuous carrier phase tracking of low CNR satellite signals having a CNR at a 15 dB-Hz level, while the receiver is moving.

4. The receiver according to claim 1 wherein the processor circuit is capable of using satellite data from the RF front-end and inertial data from the IMU to acquire, and perform continuous carrier phase tracking of, low CNR satellite signals having a CNR at a 15 dB-Hz level, while the receiver is moving.

5. The receiver according to claim 1 wherein:
   (a) the radio frequency (RF) front-end comprises a GPS front-end that provides GPS data corresponding to signals received from a plurality of GPS radio navigation satellites; and
   (b) the processor circuit is in circuit communication with the GPS front end and the IMU and is capable of using GPS data from the GPS front-end and inertial data from the IMU to perform continuous carrier phase tracking of low CNR GPS satellite signals having a CNR at a 20 dB-Hz level, while the receiver is moving.

6. The receiver according to claim 5 wherein the processor is capable of using GPS data from the GPS front-end and inertial data from the IMU to perform continuous carrier phase tracking of low CNR GPS satellite signals having a CNR at a 15 dB-Hz level, while the receiver is moving.

7. The receiver according to any of claims 1-6 wherein the processor processes inertial data from the IMU so that the receiver appears to be stationary during satellite signal integration to increase satellite signal integration time.

8. The receiver according to any of claims 1-6 wherein the processor uses a Kalman filter to process inertial data from the IMU so that the receiver appears to be stationary during satellite signal integration to increase satellite signal integration time.

9. The receiver according to any of claims 1-6 wherein the processor is capable of continuously determining and outputting navigation data determined from the received low CNR satellite signals.

10. The receiver according to any of claims 5-6 wherein the processor is capable of continuously determining and outputting GPS code and carrier phase measurements determined from the received low CNR GPS satellite signals.

11. The receiver according to any of claims 1-6 wherein the processor is capable of continuously determining and outputting navigation data determined from the received low CNR satellite signals in the presence of broadband radio frequency interference at a 30 dB/MHz level above the received satellite signal strength.

12. The receiver according to any of claims 5-6 wherein the processor is capable of continuously determining and outputting GPS code and carrier phase measurements determined from the received low CNR GPS satellite signals in the presence of broadband radio frequency interference at a 30 dB/MHz level above the received GPS satellite signal strength.

13. The receiver according to claim 1 wherein the processor is capable of tracking and/or acquiring low CNR satellite signals having a CNR at a 15 dB-Hz level, without using the actual values of navigation data bits broadcast by the radio navigation satellites.

14. The receiver according to claim 1 wherein the processor is capable of tracking and/or acquiring low CNR satellite signals having a CNR at a 15 dB-Hz level, including using an energy-based bit estimation algorithm to determine values of navigation data bits broadcast by the radio navigation satellites, the estimation algorithm searching for a navigation data bit combination that maximizes signal energy over a tracking integration interval, without using the actual values of navigation data bits broadcast by the radio navigation satellites.

15. The receiver according to any of claims 1-6 wherein the processor is capable of decoding navigation data bits broadcast by the radio navigation satellites using the energy-based bit estimation, beat repeatability over frames, and compensating for sign reversals.

16. The receiver according to any of claims 1-6 further comprising a data sample interleaver to interleave received satellite data with inertial data from the IMU to permit association of the inertial data to the received satellite data without requiring the inertial data to be time-tagged to GPS time.

17. The receiver according to any of claims 1-6 further comprising a data sample interleaver to interleave received satellite data with other data received from at least one other source to permit association of the other data to the received satellite data without requiring the other data to be time-tagged to GPS time.

18. The receiver according to any of claims 1-6 wherein the low CNR radio navigation satellite signals are received with an antenna and there is a lever arm between the antenna and the IMU and further wherein the processor compensates for the lever arm between the antenna and the IMU.

19. The receiver according to any of claims 1-6 wherein the processor uses integrated velocity to calibrate the IMU.

20. The receiver according to any of claims 1-6 wherein the processor is capable of using carrier phase of low CNR radio navigation satellite signals to calibrate the IMU without resolving the integer ambiguities.

21. The receiver according to any of claims 1-6 wherein the processor comprises a split sum correlator permitting numerically controlled oscillators corresponding to satellites being tracked to be updated at a receiver epoch rather than a satellite signal epoch.

22. The receiver according to any of claims 1-6 wherein the processor comprises a split sum correlator permitting numerically controlled oscillators corresponding to all satellites being tracked to be updated at common receiver time epochs rather than non-common satellite time epochs, thereby simplifying the measurement computation process by eliminating the need to convert measurements that would otherwise have been made at satellite time epochs into a common receiver time epoch.

23. The receiver according to any of claims 1-6 wherein the processor comprises a split sum correlator that breaks the correlation result into two parts, corresponding to partial correlations about satellite time epochs, with respect to the receiver time epochs, thereby preventing destructive correlation due to navigation data bit sign changes.

24. The receiver according to claim 23 wherein the processor sends both parts of the correlation result to baseband processing software in unmodified form, where the baseband processing software compensates for the destructive energy correlation due to navigation bit sign changes.

25. The receiver according to claim 23 wherein the satellite time epochs are obtained from a G1 register of a C/A code generator.

26. The receiver according to any of claims 1-6 wherein the processor uses a frequency domain-based circular correlation operation and further uses a code Doppler compensation method in the frequency domain-based circular correlation operation.

27. The receiver according to any of claims 1-6 wherein the processor is capable of using satellite data from the RF front-end and inertial data from the IMM without using differential satellite signals based on data from a stationary receiver site to perform said continuous carrier phase tracking of low CNR radio navigation satellite signals while the receiver is moving.

28. The receiver according to any of claims 1-6 wherein the processor compensates for motion of a correlation peak by:
(a) performing fine motion compensation to correct for sub-bin energy fading of the correlation peak by matching a conjugated FFT of a local C/A code (CAF) vector in a corresponding block engine to a corresponding code offset of an incoming satellite signal; and
(b) performing coarse motion compensation to correct for the bin-to-bin hopping of the fine motion compensated correlation peak by reading-in an associated input memory array in a translated order that compensates for a peak hop.

29. The receiver according to claim 28 wherein the processor:
(a) expresses the receiver's time-of-transmission estimate in units of sub-bin-code-offset to switch (or index) a CAF memory bank that contains an appropriate CAF vector for performing fine peak motion compensation; and
(b) expresses the receiver's time-of-transmission estimate in units of whole-bin-code-offset to translate a partial block correlation result vector to while performing block addition to increase the satellite signal integration time of the received signal.

30. The receiver according to any of claims 1-6 wherein the processor:
(a) expresses the receiver's time-of-transmission estimate in units of sub-bin-code-offset to switch (or index) a CAF memory bank that contains an appropriate CAF vector for performing fine peak motion compensation; and
(b) expresses the receiver's time-of-transmission estimate in units of whole-bin-code-offset to translate a partial block correlation result vector to while performing block addition to increase the satellite signal integration time of the received signal.

31. The receiver according to any of claims 1-6:
(a) further comprising a data sample interleaver to interleave received satellite data with inertial data from the IMU to permit association of the inertial data to the received satellite data without requiring the inertial data to be time-tagged to GPS time; and
(b) wherein the processor processes inertial data from the IMU so that the receiver appears to be stationary during satellite signal integration to increase satellite signal integration time;
(c) wherein the processor is capable of continuously determining and outputting navigation data determined from the received low CNR satellite signals;
(d) wherein the low CNR radio navigation satellite signals are received with an antenna and there is a lever arm between the antenna and the IMU; and further wherein the processor compensates for the lever arm between the antenna and the IMU;
(e) wherein the processor uses integrated velocity to calibrate the IMU;
(f) wherein the processor comprises a split sum correlator permitting numerically controlled oscillators corresponding to satellites being tracked to be updated at a receiver epoch rather than a satellite signal epoch;
(g) wherein the processor uses a frequency domain-based circular correlation operation; and
(h) wherein the processor is capable of using satellite data from the RF front-end and inertial data from the IMU without using differential satellite signals based on data from a stationary receiver site to perform said continuous carrier phase tracking of low CNR radio navigation satellite signals while the receiver is moving.

32. The receiver according to any of claims 1-6:
(a) further comprising a data sample interleaver to interleave received satellite data with inertial data from the IMU to permit association of the inertial data to the received satellite data without requiring the inertial data to be time-tagged to GPS time; and
(b) wherein the processor uses a Kalman filter to process inertial data from the IMU so that the receiver appears to be stationary during satellite signal integration to increase satellite signal integration time;
(c) wherein the processor uses an energy-based bit estimation algorithm to determine values of navigation data bits broadcast by the radio navigation satellites, the estimation algorithm searching for a navigation data bit combination that maximizes signal energy over a tracking integration interval, without using the actual values of navigation data bits broadcast by the radio navigation satellites;
(d) wherein the processor is capable of using carrier phase of low CNR radio navigation satellite signals to calibrate the IMU without resolving the integer ambiguities;
(e) wherein the low CNR radio navigation satellite signals are received with an antenna and there is a lever arm between the antenna and the IMM; and further wherein the processor compensates for the lever arm between the antenna and the IMU;

(f) wherein the processor comprises a split sum correlator permitting numerically controlled oscillators corresponding to all satellites being tracked to be updated at common receiver time epochs rather than non-common satellite time epochs, thereby simplifying the measurement computation process by eliminating the need to convert measurements that would otherwise have been made at satellite time epochs into a common receiver time epoch;

(g) wherein the processor uses a frequency domain-based circular correlation operation and further uses a code Doppler compensation method in the frequency domain-based circular correlation operation; and (h) wherein the processor is capable of using satellite data from the RF front-end and inertial data from the IMU without using differential satellite signals based on data from a stationary receiver site to perform said continuous carrier phase tracking of low CNR radio navigation satellite signals while the receiver is moving.

33. The receiver according to claim 31 wherein the processor is capable of decoding navigation data bits broadcast by the radio navigation satellites using the energy-based bit estimation, beat repeatability over frames, and compensating for sign reversals.

34. The receiver according to claim 32 wherein the processor is capable of decoding navigation data bits broadcast by the radio navigation satellites using the energy-based bit estimation, beat repeatability over frames, and compensating for sign reversals.

35. The receiver according to claim 31 wherein the processor compensates for motion of a correlation peak by:
(a) performing fine motion compensation to correct for sub-bin energy fading of the correlation peak by matching a conjugated FFT of a local C/A code (CAF) vector in a corresponding block engine to a corresponding code offset of an incoming satellite signal; and
(b) performing coarse motion compensation to correct for the bin-to-bin hopping of the fine motion compensated correlation peak by reading-in an associated input memory array in a translated order that compensates for a peak hop.

36. The receiver according to claim 32 wherein the processor compensates for motion of a correlation peak by:
(a) performing fine motion compensation to correct for sub-bin energy fading of the correlation peak by matching a conjugated FFT of a local C/A code (CAF) vector in a corresponding block engine to a corresponding code offset of an incoming satellite signal; and
(b) performing coarse motion compensation to correct for the bin-to-bin hopping of the fine motion compensated correlation peak by reading-in an associated input memory array in a translated order that compensates for a peak hop.

37. The receiver according to claim 32 wherein the processor comprises a split sum correlator that breaks the correlation result into two parts, corresponding to partial correlations about satellite time epochs, with respect to the receiver time epochs, thereby preventing destructive correlation due to navigation data bit sign changes.

38. The receiver according to claim 37 wherein the processor sends both parts of the correlation result to baseband processing software in unmodified form, where the baseband processing software compensates for the destructive energy correlation due to navigation bit sign changes.

39. A method of tracking of low carrier-to-noise ratio ("CNR") signals from a plurality of radio navigation satellites while the receiver is moving, comprising the steps of:
receiving signals from the plurality of radio navigation satellites;
providing satellite data corresponding to the signals received from the plurality of radio navigation satellites;
providing inertial data from an inertial measurement unit (IMU); and
using the satellite data and the inertial data to perform continuous carrier phase tracking of low CNR radio navigation satellite signals having a CNR at a 20 dB-Hz level, while the receiver is moving.

40. A receiver for tracking of low carrier-to-noise ratio ("CNR") signals from a plurality of radio navigation satellites while the receiver is stationary (dynamic motion of less than 2 cm/s), comprising:
(a) a radio frequency (RF) front-end that provides satellite data corresponding to signals received from the plurality of radio navigation satellites; and
(b) a processor circuit in circuit communication with the RF front end, the processor circuit being capable of using satellite data from the RF front-end to perform continuous carrier phase tracking of low CNR radio navigation satellite signals having a CNR at a 20 dB-Hz level, while the receiver is stationary.

41. The receiver according to claim 40 wherein the processor circuit is capable of using satellite data from the RF front-end to acquire, and perform continuous carrier phase tracking of, low CNR satellite signals having a CNR at a 20 dB-Hz level, while the receiver is stationary.

42. The receiver according to claim 40 wherein the processor circuit is capable of using satellite data from the RF front-end to perform continuous carrier phase tracking of low CNR satellite signals having a CNR at a 15 dB-Hz level, while the receiver is stationary.

43. The receiver according to claim 40 wherein the processor circuit is capable of using satellite data from the RF front-end to acquire, and perform continuous carrier phase tracking of, low CNR satellite signals having a CNR at a 15 dB-Hz level, while the receiver is stationary.

44. The receiver according to claim 40 wherein:
(a) the radio frequency (RF) front-end comprises a GPS front-end that provides GPS data corresponding to signals received from a plurality of GPS radio navigation satellites; and
(b) the processor circuit is in circuit communication with the GPS front end and is capable of using GPS data from the GPS front-end to perform continuous carrier phase tracking of low CNR GPS satellite signals having a CNR at a 20 dB-Hz level, while the receiver is stationary.

45. The receiver according to claim 44 wherein the processor is capable of using GPS data from the GPS front-end to perform continuous carrier phase tracking of low CNR GPS satellite signals having a CNR at a 15 dB-Hz level, while the receiver is stationary.

* * * * *